United States Patent [19]
Murata et al.

[11] Patent Number: 5,192,189
[45] Date of Patent: Mar. 9, 1993

[54] CAR CARRIER TRUCK USED ALSO AS DUMP TRUCK

[75] Inventors: Masaichi Murata; Hiroaki Kuriyama; Yoshiyuki Maeda; Megumi Yamashita; Kouzou Ueda, all of Hyogo, Japan

[73] Assignee: Kyokuto Kaikatsu Kogyo Co., Ltd., Hyogo, Japan

[21] Appl. No.: 573,131

[22] PCT Filed: Feb. 3, 1989

[86] PCT No.: PCT/JP89/00116
§ 371 Date: Sep. 18, 1990
§ 102(e) Date: Sep. 18, 1990

[51] Int. Cl.$^5$ .............................................. B60P 1/32
[52] U.S. Cl. ................................ 414/477; 298/12; 414/480; 384/42
[58] Field of Search .................... 298/12, 13, 14, 15, 298/16; 414/475, 477, 478, 479, 909; 280/287, 491.2, 638, 35; 296/165, 170, 171, 175, 26, 183, 184; 384/42

[56] References Cited

U.S. PATENT DOCUMENTS

| | | |
|---|---|---|
| 2,717,707 | 9/1955 | Martin ................................. 414/475 |
| 3,454,175 | 7/1969 | Kellaway ............................ 414/478 |
| 3,964,626 | 6/1976 | Arregui . |
| 4,126,357 | 11/1978 | Day . |
| 4,239,275 | 12/1980 | Horneys et al. ..................... 414/478 |
| 4,353,597 | 10/1982 | Shoup ................................... 298/12 |
| 4,660,843 | 4/1987 | Hicks .............................. 414/475 X |
| 4,702,662 | 10/1987 | Marlett ............................... 414/477 |
| 4,929,142 | 5/1990 | Nespor ............................ 414/477 X |

FOREIGN PATENT DOCUMENTS

| | | |
|---|---|---|
| 990762 | 8/1976 | Canada . |
| 194954 | 9/1986 | European Pat. Off. ............. 414/477 |
| 2167718 | 8/1973 | France . |
| 22166 | 6/1977 | Japan . |
| 55-51628 | 12/1980 | Japan . |
| 61-37546 | 10/1986 | Japan . |
| 63-21158 | 2/1988 | Japan . |

Primary Examiner—Frank E. Werner
Attorney, Agent, or Firm—Wenderoth, Lind & Ponack

[57] ABSTRACT

A car carrier truck has a truck body with a chassis and a dump frame pivotably disposed on the chassis. The dump frame includes longitudinally extending beams having top and bottom surfaces. A tilting device is connected between the chassis and the dump frame, and a load carrier platform is slidably mounted on the dump frame. The load carrier platform includes longitudinally extending main girders which have upper, lower and side surfaces. The main girders are slidably engaged with the beams of the dump frame. A slide device is connected between the dump frame and the load carrying platform for sliding the load carrying platform on the dump frame. Moving pads slidable on the beams of the dump frame are fixed to the main girders at longitudinally forward positions on the main girders. The moving pads slidably engage the beams of the dump frame. The fixed pads are longitudinally aligned on and fixed to the top surfaces of the beams of the dump frame at intervals along the beams. The main girders are slidably disposed on the fixed pads, and one of the fixed pads have a longitudinally rearward position on each of the beams as a side surface that projects laterally from the dump frame and contacts the side surface of the main girders.

6 Claims, 43 Drawing Sheets

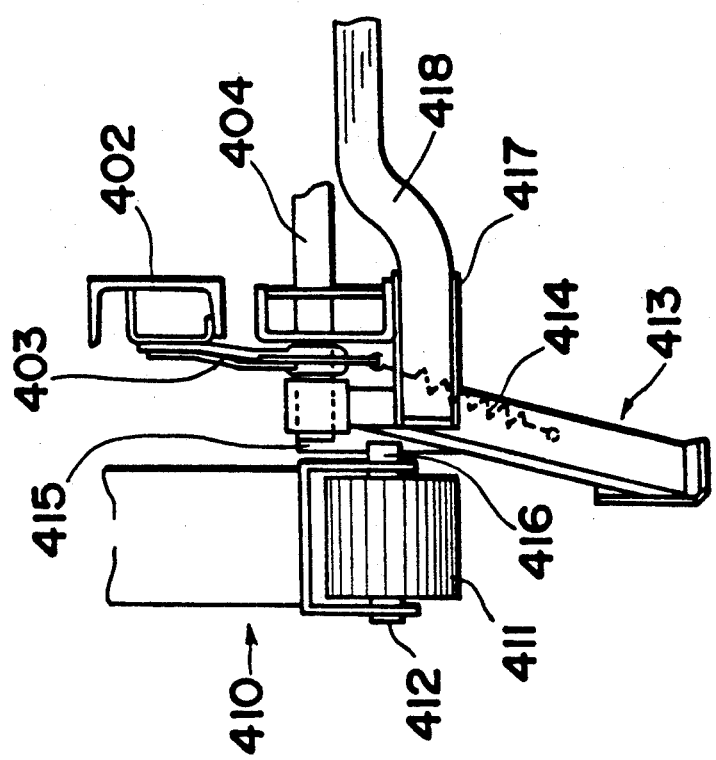
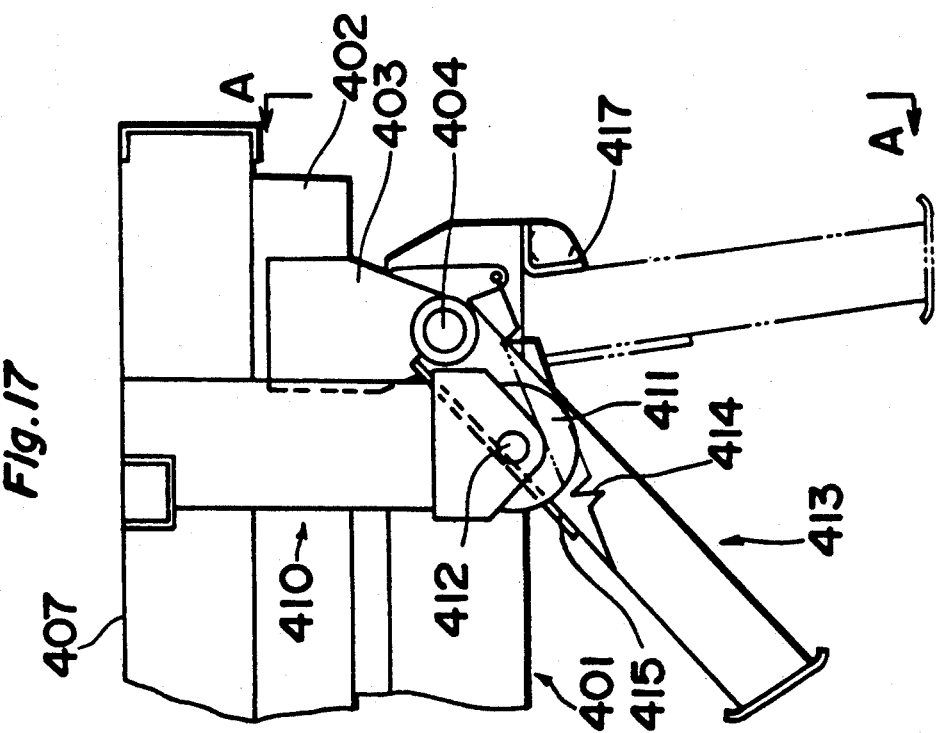

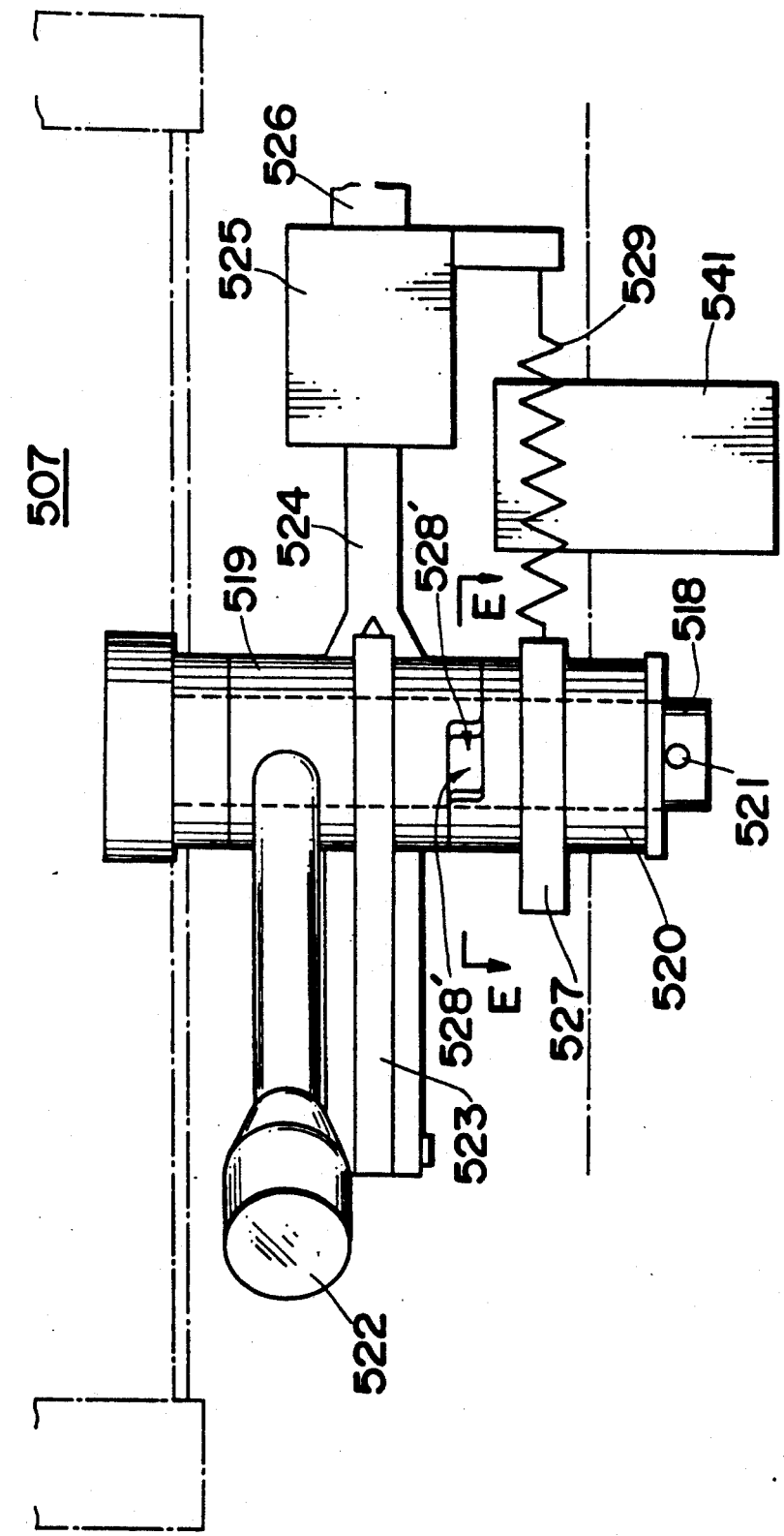

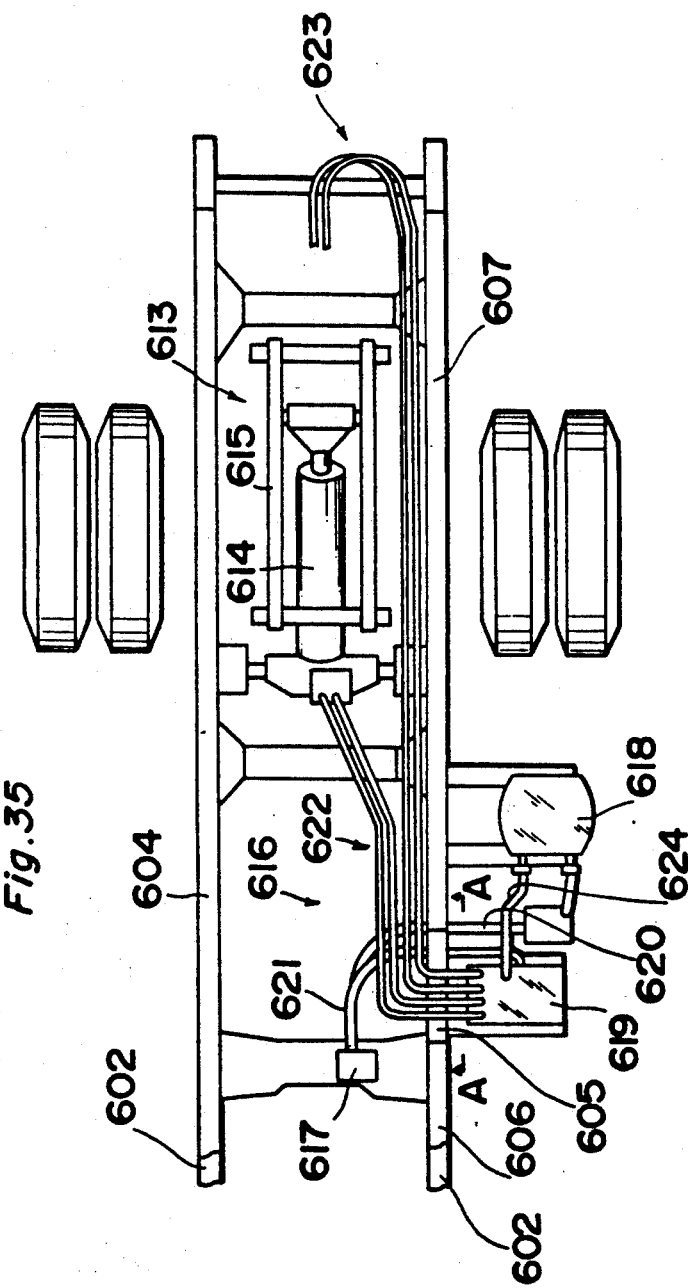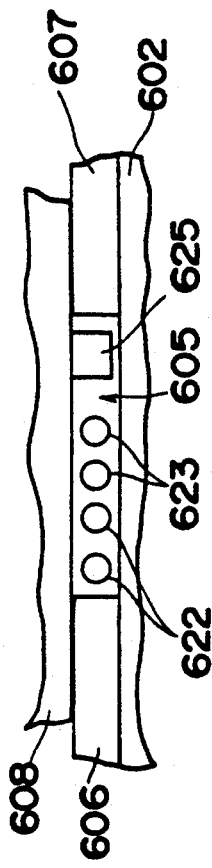
Fig.35
Fig.36

CAR CARRIER TRUCK USED ALSO AS DUMP TRUCK

FIELD OF TECHNOLOGY

The present invention is used in the field of car carrier trucks which are also utilized as dump trucks which fully tilt their load-carrying platforms and which effect loading and unloading of cars by longitudinally moving the load-carrying platform after tilting of load-carrying platform at a predetermined angle.

BACKGROUND OF THE INVENTION

There are generally provided car carrier trucks is described above as shown in FIGS. 50 and 51.

Referring to FIGS. 50 and 51, reference numeral 11 indicates a chassis, and a dump frame 12 is provided on the chassis 11.

At the rear end of the dump frame 12, there is provided a hinge bracket 13. The hinge bracket 13 is pivotably connected to the chassis 11 through a hinge shaft 14. Furthermore, a tilt cylinder 16 is provided between the chassis 11 and the dump frame 12 so that the dump frame 12 is tilted by elongation of the tilt cylinder 16.

On the dump frame 12 is mounted a cargo container 17 for carrying vehicles. A slide cylinder 18 is longitudinally provided between the dump frame 12 and the cargo container 17. Elongation of the slide cylinder 18 slides the cargo container 17 backward.

When the cargo container is slid backward, cargo container support legs 19 for the cargo container reach the ground to support the cargo container 17.

Conventionally, in order to insure that the cargo container 17 smoothly slides on the dump frame 12 without being derailed therefrom, an upper part of the dump frame 12 is inserted, as shown in FIG. 52, between a sectionally U-shaped main girder 22 mounted on the bottom of the cargo container 17 in the longitudinal direction and a subsidiary girder 23 provided inside of the main girder 22. An upper sliding pad 24 and a lower sliding pad 25 are fastened respectively to the upper and lower surfaces of the upper part of the dump frame 12 with bolts so that the subsidiary girder 23 is slidably supported on the upper sliding pad 24 and a lower portion of the main girder 22 slidably rests on the lower sliding pad 25.

In the conventional pad mounting structure, the upper and lower sliding pads 24 and 25 are fastened to the dump frame 12 with bolts. However, because the bolt fastening work for the lower sliding pad 25 is done in a narrow space, the positioning of the bolt holes is difficult and therefore the mounting operation or the replacing operation of the lower sliding pad 25 is difficult, which is a problem.

Therefore, a first object of the present invention is to provide a sliding pad mounting structure of a car carrier truck in which the mounting and replacement of a lower sliding pad is easy.

Furthermore, the above-described conventional car carrier truck has the following problems. Namely, the vertical distance between the load-carrying platform and the dump frame increases by the diameter of the cylinder, and consequently, an increase in the height of the load-carrying platform, taking the form of a cargo container is inevitable. As a result, in tilting the dump frame backward and sliding the load-carrying platform backward to bring it into contact with the ground, the tilt angle becomes large, resulting in that the slope of the load-carrying platform becomes steep and therefore difficult for construction vehicles to go up.

Moreover, although the distance between the load-carrying platform and the dump frame can be shortened by notching a traverse girder at a portion where the cylinder device is located, this causes a problem of lowering the strength of the load-carrying platform.

Therefore, a second object of the present invention is, in a car carrier truck which has a load-carrying platform supported on a sufficiently strong dump frame such that the load-carrying platform can be slid back and forth by a cylinder device, to prevent the tilt angle of the load-carrying platform from being too large when the dump frame is tilted, by making the height of the load-carrying platform from the ground small.

Furthermore, in a car carrier truck which loads vehicles by sliding the cargo container backward, individual support legs are provided on the chassis and the cargo container in order to securely support the chassis and cargo container during the loading and unloading of vehicles. Because these support legs, particularly those provided on the chassis, are an obstacle to the running of the truck if extended, they are conventionally retracted by an operator during the driving.

However, such retraction work has to be performed by going below the cargo container, and thus hard work is forced upon the worker.

Therefore, a third object of the present invention is to effect an automatic extension and retraction of the chassis support legs with the sliding operation of the cargo container, thus eliminating the need for an operator to go below the cargo container and enabling the extension and retraction to be safely and securely performed.

Furthermore, a fourth object of the present invention is to prevent the failure of springs biasing the chassis-supporting legs by prohibiting the springs, even though the load-carrying platform is fully tilted, from being elongated more than the spring elongation when the chassis supporting legs are retracted.

A fifth object of the present invention is to securely fasten the cargo container to the dump frame during travel and also to automatically fasten the cargo container to the dump frame after the completion of loading or unloading of vehicles.

A sixth object of the present invention is to provide a car carrier truck used also as a dump truck which is capable of using a rear hinged door securely as a foot board without dropping the board off when loading or unloading of vehicles, and also capable of fastening the cargo container to the dump frame and securely dumping loaded items without the possibility of turning the truck over in the dumping operation.

A seventh object of the present invention is to secure a clearance between the cargo container and the chassis by providing a stopper member either on a lower surface of the cargo container or on an upper surface of the chassis in order to prevent piping passing through a space between front and rear wooden supports fastened onto the chassis from being damaged.

In the truck as shown in FIGS. 50 and 51, since the main girders 22 extending longitudinally on the bottom face of the cargo container 17 are in direct sliding contact with the dump frame 12, the back and forth movements of the cargo container 17 can not be effected smoothly because of a large sliding resistance. A clearance is provided between respective side surfaces of the dump frame 12 and the main girder 22 so that both side surfaces do not contact each other in order to reduce the sliding resistance. For this reason, rolling takes place during the back or forth movement of the cargo container. Particularly when the cargo container is moved backward, the portion of the main girder 22" supported by the dump frame 12 of the main girder 22 becomes shorter and the rolling becomes larger. There is then a danger that vehicles on the cargo container will slide down on the cargo container by their own weight.

Accordingly, an eighth object of the present invention is to enable smooth back and forth movements of the load-carrying platform with the aid of a moving pad provided on the cargo container, namely, on the load-carrying platform, and a fixed pad provided on the dump frame, and also to prevent rolling of the load-carrying platform at all times with the aid of the moving pad and a rear fixed pad.

Furthermore, there has been known a car carrier truck used also as a dump truck which has a locking device provided between a dump frame and a load-carrying platform. When the truck is used as a dump truck, the locking device is brought into a locking state such that the load-carrying platform is fully tilted integrally with the dump frame. When the truck is used as a car carrier truck, the locking device is brought into an unlocking state such that after the dump frame is tilted by a predetermined angle, the load-carrying platform is moved back and forth for loading or unloading vehicles.

However, in such an arrangement, the locking device must be changed over to the locking or unlocking state in accordance with each job. Particularly when the truck is used as a dump truck, if a full tip is effected without changing over the locking device to the locking state, there is a danger that the load-carrying platform will drop from the dump frame and hurt a worker.

Therefore, a ninth object of the present invention is to provide a car carrier truck used also as a dump truck wherein the locking device is provided with a lock detection device, and a full-tipping operation is allowed only when a locking state of the locking device is detected by the lock detection device.

A tenth object of the present invention is to provide a car carrier truck used also as a dump truck wherein when the tilt of the load-carrying platform is below a predetermined lower limit, back and forth movements of the load-carrying platform are restrained, and when a predetermined upper limit is reached, the load-carrying platform is not allowed to be tilted more. Back and forth moving operation of the load-carrying platform within only a predetermined range of the tilt angle is thereby ensured.

An eleventh object of the present invention is to enable operations to be controlled from inside a cab when the dump and car carrier truck is used as a dump truck and, on the other hand, to enable operations to be controlled from outside the cab, with safety being confirmed, when the truck is used as a car carrier truck.

SUMMARY OF THE INVENTION

In order to achieve the first object, a car carrier truck has a dump frame having a vertical portion and a horizontal portion is tiltably provided on a chassis, and the horizontal portion of the dump frame is sandwiched between a subsidiary girder and a horizontal portion of a main girder having the horizontal portion and a vertical portion and extending on a bottom surface of a cargo container in a longitudinal direction of the cargo container, the cargo container thereby being made slidable backward relative to the chassis. The truck of the present invention is characterized in that an upper sliding pad for slidably supporting the cargo container is fastened to an upper surface of the horizontal portion of the dump frame; and a lower sliding pad slidable relative to a lower surface of the horizontal portion of the dump frame is fitted between stoppers which are fixed on an upper surface of the horizontal portion of the main girder for stopping the lower sliding pad relative to the longitudinal direction.

With the above construction, the following operation is obtained.

The upper sliding pad fastened on the upper surface of the horizontal portion of the dump frame, which has the vertical and horizontal portions and which is tiltably provided on the chassis, supports the cargo container in such a manner that the cargo container can slide on the upper sliding pad. The lower sliding pad fitted between the stoppers fastened on the upper surface of the horizontal portion of the main girder, which longitudinally extends on the bottom surface of the cargo container, is stopped in the longitudinal direction by the stoppers and slides relative to the lower surface of the horizontal portion of the dump frame.

Furthermore, as is clear from the above description, since the lower sliding pad is not fastened with bolts like in the conventional case, but is fitted between stoppers fixed on the lower horizontal portion of the main girder, installation and replacement of the lower sliding pad can be readily done readily.

In order to achieve the second object of the present invention, in a car carrier truck has a dump frame tiltably supported on a chassis frame, and a load-carrying platform supported on the dump frame in such a manner that the load-carrying platform can be slid back and forth by a cylinder device. The car carrier truck comprises a pair of right and left main girders longitudinally extending on a back surface of the load-carrying platform. Traverse girders connected to each of the main girders, intersecting perpendicularly the main girders. A subsidiary girder extends longitudinally connecting center-line end portions of the traverse girders between the main girders. The subsidiary girder has an upward recess portion formed in a central portion of the subsidiary girder and the cylinder device is disposed in the recess portion.

The car carrier truck of the above constitution slides the load-carrying platform backward by extending the cylinder device, and tilts the dump frame till the rear end of the load-carrying platform is put on the ground. In this state, it is possible to load the truck with construction vehicles and the like from the rear end of the load-carrying platform.

In this case, since the center-side end portions of the traverse girders are connected by the subsidiary girder having the recess in its lower portion, and in this recess is arranged the cylinder device for longitudinally moving the load-carrying platform, the distance between the dump frame and the load-carrying platform becomes smaller and therefore an elevation of the load-carrying platform becomes lower. Thereby, a good stability of the truck is obtained, and, moreover the tilt angle of the load-carrying platform becomes smaller when the rear end of the load-carrying platform is contacted with the ground. Furthermore, since strength of the traverse girders does not deteriorate. The strength of the load-carrying platform is not impaired either.

In order to achieve the third object, a car carrier truck has a dump frame tiltably provided on a chassis, and a cargo container slidably provided on the dump frame. The car carrier truck is characterized in that chassis support legs are pivotably supported by the chassis at rear portions of the chassis so as to be able to swing back and forth. Cargo container support legs are provided at rear portions of the cargo container perpendicularly to the cargo container. The chassis support legs are forced at all times by spring members in a protruding direction of the chassis support legs, and are held in a protruding condition by stopper members provided on the chassis. One of the cargo container support leg and the chassis support leg is provided with a guide piece, and the other of the cargo container support leg and the chassis support leg is provided with a control member for engaging with the guide piece and retracting the chassis support leg forward when the cargo container slides forward.

The car carrier truck of the above constitution operates as follows.

When the cargo container is slid backward after being tilted for the loading or unloading of vehicles, the chassis support legs which are held in a retracted state by the cargo container support legs at an initial stage of the sliding movement are released from the retracted state, and become protruded by the force of the spring members.

Thereafter, when the cargo container is slid further backward, the cargo container support legs reach the ground. As a result, the cargo container and the chassis are supported by the respective support legs.

Next, when the cargo container is slid forward, the control members come into contact with the guide pieces at a final stage of the sliding movement and cause the chassis support legs to turn forward and retract against the force of the spring members, whereby the chassis support legs are held in the retracted state.

As described above, according to the present invention, since the protruding and retracting of the chassis support legs is effected automatically by the sliding motion of the cargo container, it becomes absolutely unnecessary for an operator to go below the cargo container for the operation. In addition, the protruding and retracting operation of the support legs can be effected safely and securely.

Furthermore, since the chassis support legs come to a completely protruding state at the initial stage of the cargo container's backward sliding movement and are returned to the retracted state at the final stage of the cargo container's forward movement, it is possible to rotate the chassis support legs in a usual height condition of the chassis in which the chassis rear end does not fall because of vehicles loaded. Accordingly, it is possible to securely make the support legs protrude and retract.

In order to achieve the fourth object, a car carrier truck used also as a dump truck has a dump frame provided on a chassis tiltably through hinge brackets, and a load-carrying platform is provided on the dump frame in such a manner as to be able to move longitudinally. The truck of the present invention is characterized in that chassis support legs are provided at rear portions of the chassis in such a manner that each chassis support leg has the same center of rotation as that of the hinge bracket. The chassis support legs are provided with respective guide pieces and are also provided with respective springs, each of which is provided between each hinge bracket and the dump frame so as to urge the chassis support leg in a direction in which the chassis support leg protrudes. Load-carrying platform support legs are provided at rear portions of the load-carrying platform perpendicularly to the load-carrying platform. The load carrying platform support legs are provided with respective engagement members which are engaged with the respective guide pieces and turn the respective chassis support legs in a direction in which the chassis support legs are retracted. A stopper member is provided at a rear portion of the chassis for restraining the chassis support legs from turning when the chassis support legs are in their protruding positions.

The truck of the above constitution operates as follows.

When loading or unloading of vehicles, after tilting the dump frame by a predetermined angle, the load-carrying platform is moved backward and the load-carrying platform support legs are stood on the ground, so that the loading or unloading of vehicles is effected. Because the load-carrying platform support legs move backward with the movement of the load-carrying platform, the engagement members engaged with the guide pieces on the chassis support legs are disengaged therefrom and turned to their protruding positions, urged by the springs, till the chassis support legs come into contact with the stopper member.

On the other hand, when using the truck as a dump truck, the load-carrying platform is fully tipped with its top forward portion fixed. In this case, though the chassis support legs are rotated farther from the retracted position by the turning of the load-carrying platform support legs, because the hinge brackets or dump frame holding the springs turn integrally, the expansion of the springs is hardly changed.

As described above, according to the present invention, the protruding and retracting actions of the chassis support legs can be automatically effected by the longitudinal movement of the load-carrying platform, and in the case of the full tip of the load-carrying platform, the springs are hardly expanded more than when the chassis support legs are in the retracted state, and thereby spring failure can be prevented.

Also, in order to achieve the fifth object, a car carrier truck has a dump frame tiltably provided on a chassis and a cargo container is slidably provided on the dump frame. The car carrier truck of the present invention is characterized in that the cargo container is provided with a backward slide prevention device and an operation device for releasing the backward slide prevention means device. The dump frame is provided with a control device for changing over the backward slide prevention device to an engagement direction when the cargo container slides forward.

The car carrier truck of the above construction operates as follows.

First, when vehicles are discharged from the cargo container, the control device is operated to release the backward slide prevention device, and under this condition the dump frame is tilted by a predetermined angle. Thereafter, the cargo container is slidingly moved backward. When the sliding movement is finished, the vehicles are driven down to the ground, thereby being unloaded from the cargo container.

On the other hand, when vehicles are loaded into the cargo container, the vehicles are driven into the cargo container in the above final state, and then the cargo container is slid forward. In this case, at a final stage of the forward sliding movement of the cargo container, the operation device is automatically changed over by the control device so that the backward slide prevention device becomes engaged.

When the slide of the cargo container is completed, the dump frame is lowered to bring the cargo container into the retracted state.

As is clear from the above description, since the truck according to the present invention is provided with backward slide prevention device for stopping the backward slide of the cargo container and the operation device for releasing the prevention device from its operation, and is further provided with the control device for bringing the backward slide prevention device back to the original condition from the released condition during the forward sliding movement of the cargo container, it is possible to keep the cargo container securely fastened to the dump frame during the run of the truck. It is also possible to automatically fasten the cargo container to the dump frame after completion of the loading and unloading operation. Thus, accidents due to a failure to fasten the cargo container to the dump frame by mistake can be avoided.

Furthermore, in order to accomplish the sixth object, a car carrier truck used also as a dump truck has a dump frame is tiltably provided on a chassis and a cargo container slidably provided on the dump frame. When the cargo container slides backward, a tailgate of the cargo container can be used as a footboard. It is opened on a lower side by an automatic opening and closing device when the cargo container is tilted by more than a predetermined angle in a dump operation. The truck is characterized in that a backward slide prevention device for preventing the cargo container from sliding backward is provided between the cargo container and the dump frame. The cargo container is provided with a tailgate locking device interlocked with the backward slide prevention device so that when the backward slide prevention device is released from its operation, a lower portion of the tailgate is locked, and that when the backward slide prevention device operates, the lower portion of the tailgate is released from locking.

The truck of the above construction operates as follows.

First, when a loading or unloading of vehicles is effected, the backward slide prevention device is released from its operation and in this state the dump frame is tilted up to a predetermined angle.

Then, the cargo container is slid backward. When the slide is finished, the tailgate is turned. At this time, in connection With the release of the backward slide prevention device, the tailgate locking means locks a lower portion of the tailgate. Therefore, the tailgate can be used as a footboard.

On the other hand, in the case of tipping the cargo container, the dump frame is tilted with the backward slide prevention device being in a locking condition. In this case, because the backward slide prevention device is in the locking state, the tailgate locking device is free from its operation. When the dump frame is tilted more than a predetermined angle, the tailgate is opened by the automatic opening and closing device, so that a load can be discharged.

As described above, the truck according to the present invention is so arranged that the backward slide prevention device is interlocked with the tailgate locking means so that the tailgate locking device is put into operation when the backward slide prevention device is released from its operation, and that the tailgate locking device stops locking when the backward slide prevention device is brought into a locking state. Therefore, it is possible to use the tailgate as a footboard without dropping the tailgate during loading or unloading of vehicles. It is also possible to fix the cargo container to the dump frame during dumping and securely discharge cargoes. Therefore, there is no possibility that the truck should turn over.

Also, in order to accomplish the seventh object, a dump truck has front and rear bearers fastened on a chassis. A bottom surface of a cargo container tiltably supported on the chassis is able to rest on the bearers. A tilting device is provided on an inner side of the chassis for tilting the cargo container, part of a drive device is provided on an outer side of the chassis, and part of piping for communicating the tilting device with the drive device is disposed in a clearance between the front and rear bearers. The dump truck is characterized in that a stopper member which is lower than the height of the bearers is provided on the bottom surface of the cargo container or on a top surface of the chassis so as to confront the top surface of the chassis or the bottom surface of the cargo container between the front and rear bearers so that the piping does not touch the bottom surface of the cargo container.

The dump truck of the above construction operates as follows.

By starting the driving device, the tilting device is operated. By the operation of the tilting device, the cargo container is tilted to effect an unloading operation. After completion of the operation, the cargo container is lowered to rest on the bearers.

In this case, even when the bearers are deformed, a certain clearance between the chassis and the cargo container is ensured due to the presence of the stopper member. In this way, the piping is prevented from being damaged.

As described above, according to the present invention, because the stopper member, which is smaller in height than the bearers, is disposed on the cargo container or on the chassis and caused to contact the chassis or the cargo container when the bearers are deformed, a clearance between the chassis and cargo container is secured even after deformation of the bearers occurs, and thereby damage to the piping can be prevented.

Furthermore, in order to accomplish the eighth object of the present invention, a car carrier truck has a dump frame tiltably supported by a tilting device provided on a chassis and a load-carrying platform moved in a longitudinal direction of the dump frame by a slide device, is provided on the dump frame. The truck is characterized in that a moving pad slidable on the dump frame is fixed to a main girder of the load-carrying platform in a front position of the main girder where it is impossible for the load-carrying platform to be disengaged from the dump frame when the load-carrying platform is moved to a rearmost position. A plurality of fixed pads are aligned on a top surface of the dump frame at appropriate intervals. A side surface of a rear one of the fixed pads which supports the load-carrying platform in movement of the load-carrying platform to the rearmost position projects from the dump frame and contacts a side surface of the main girder so that the load-carrying platform is prevented from rolling by the moving pad and the rear fixed pad.

The car carrier truck with the above construction operates as follows.

The dump frame on the chassis is tilted by a predetermined angle, and in this state the load-carrying platform is moved backward. Vehicles are then loaded on the tilted load-carrying platform by driving them on. After the vehicles are loaded on the load-carrying platform, the load-carrying platform is moved forward. After that, the dump frame is lowered so as to rest on the chassis. In this way, the loading of the vehicles is completed. The truck is then driven to a destination.

As described above, the present invention provides a car carrier truck wherein fixed pads are provided on the dump frame so that the main girders are moved slidingly on the fixed pads, and wherein a moving pad provided in a front portion of the main girder moves slidingly on the dump frame, and at the same time, the rear fixed pads are slidingly contacted with a side face of the main girder. By this arrangement, a smooth longitudinal movement of the load-carrying platform is obtained, and at the same time, the load-carrying platform is prevented from rolling. Accordingly, the loading and unloading operation of vehicles can be effected safely.

Moreover, in order to accomplish the ninth object, a car carrier truck used also as a dump truck has a dump frame mounted on a chassis and a load-carrying platform provided on the dump frame. The load-carrying platform can tilt integrally with the dump frame and can also move longitudinally after the tilting of the dump frame by a predetermined angle. The truck is characterized in that a locking device is provided between the dump frame and the load-carrying platform for locking the load-carrying platform onto the dump frame. A lock detection device is provided in the vicinity of the locking device for detecting a locking state. A controlling device is provided for insuring that a full-tilt operation becomes effective only when the locking state is detected by the lock detection device.

The truck with the above construction operates as follows.

When the truck is used as a dump truck, the locking device is operated and the load-carrying platform is fully tilted integrally with the dump frame.

It is to be noted here that when a fully tilting operation of the dump frame is tried while the locking device is not operated, the operation does not become effective because of the operation of the control device. Thereby, the danger that the load-carrying platform might fall can be avoided.

When the truck is used as a car carrier truck, the load-carrying platform is tilted by a predetermined angle with the lock device out of operation, and then moved back and forth to load or unload vehicles.

As described above, the truck according to the present invention has a locking device for combining the load-carrying platform and the dump frame integrally and a lock detection device for detecting a locking state of the locking device so that the full-tilting operation of the load-carrying platform becomes effective only when the locking state of the locking device is detected by the lock detection device. Therefore, when the truck is used as a dump truck, it is possible to securely avoid the danger that the load-carrying platform might fall off, thereby ensuring the safety of the operation.

In order to accomplish the tenth object, a car carrier truck has a dump frame mounted on a chassis and a load-carrying platform provided on the dump frame. The load-carrying platform is able to be moved longitudinally after tilting of the dump frame by a predetermined angle. The car carrier truck according to the present invention is characterized in that an upper limit detection device and a lower limit detection device are provided on the chassis or on the dump frame for detecting an upper limit angle and a lower limit angle of the dump frame. A controlling device is provided for restricting tilting of the dump frame above the upper limit angle and longitudinal movement of the load-carrying platform with the dump frame at a tilt angle below the lower limit angle, based on what is detected by the upper and lower limit detection device.

The car carrier truck with the above construction operates as follows.

After the load-carrying platform is tilted up to a predetermined angle by the tilting device, the load-carrying platform is moved backward along the dump frame up to the most backward position. Loading or unloading of vehicles is conducted in this state. After completion of the loading or unloading operation, the load-carrying platform is moved to the most forward position and then lowered to the original position.

In this case, when the load-carrying platform is tilted at less than the predetermined lower limit angle, the backward and forward movements of the load-carrying platform are restricted. In addition, when the upper limit angle is reached, the load-carrying platform is made to stop tilting.

As described above, the truck according to the present invention has the lower and upper limit detection devices for detecting, respectively, the lower and upper limit angles for the tilt of the dump frame, so that the longitudinal movements of the load-carrying platform are restricted when the tilt angle of the dump frame is below the lower limit, and so that when the upper limit angle is reached the tilting of the dump frame is stopped. Therefore, the operation of moving the load-carrying platform longitudinally can be effected securely within a predetermined range of the tilt angle of the dump frame. Thus, fenders or other things can be prevented from being damaged and vehicles can be prevented from dropping or sliding under their own weight.

Furthermore, in order to accomplish the eleventh object, a car carrier truck used also as a dump truck has a dump frame provided on a chassis, the dump frame being able to be tilted by a tilting device. A load-carrying platform is provided on the dump frame, the load-carrying platform being able to be moved longitudinally by a slide device. The truck is characterized in that a dump operation switch device, constituted by a tilt switch for actuating the tilting device, is provided inside of a cab of the truck. A slide operation switch device constituted by a tilt switch for actuating the tilting device and a slide switch for actuating the slide device, is provided outside of the cab. A select switch capable of selecting only one of the dump operation switch devices and the slide operation switch devices is also provided.

The truck with the above construction operates as follows.

When the truck is used as a dump truck, the select switch is changed over to a dump-operation side, and the dumping operation is carried out by operating the dump operation switch device in the cab.

When the truck is used as a car carrier truck, the select switch is changed over to a slide-operation side, and the vehicle loading or unloading operation is carried out by operating the slide operation switch device outside the cab.

As described above, the truck according to the present invention has the dump operation switch device inside of its cab and the slide operation switch device outside of the cab. The truck also has the select switch capable of selecting only one of the switch devices. Therefore, during a dumping operation an operator can operate the truck inside of the cab like a normal dump truck, during the loading and unloading operations of vehicles the operator can operate the truck outside of the cab to move the load-carrying platform forward or backward, confirming safety around the truck. Work positions can thus be taken in accordance with respective operation modes. Moreover, because the select switch allows use of only one of the switch devices, even when the other of the switch devices is operated by mistake during the operation of the one switch device, it does not become operative. Thus safety is secured during operation.

THE BRIEF DESCRIPTION OF THE DRAWINGS

FIG. 17 is an enlarged view of a portion including a support leg of the truck shown in FIG. 14;

FIG. 18 is a view taken in the direction of the arrows along line A—A in FIG. 17;

FIG. 29 is an enlarged front view of the operation

Figure 31A:
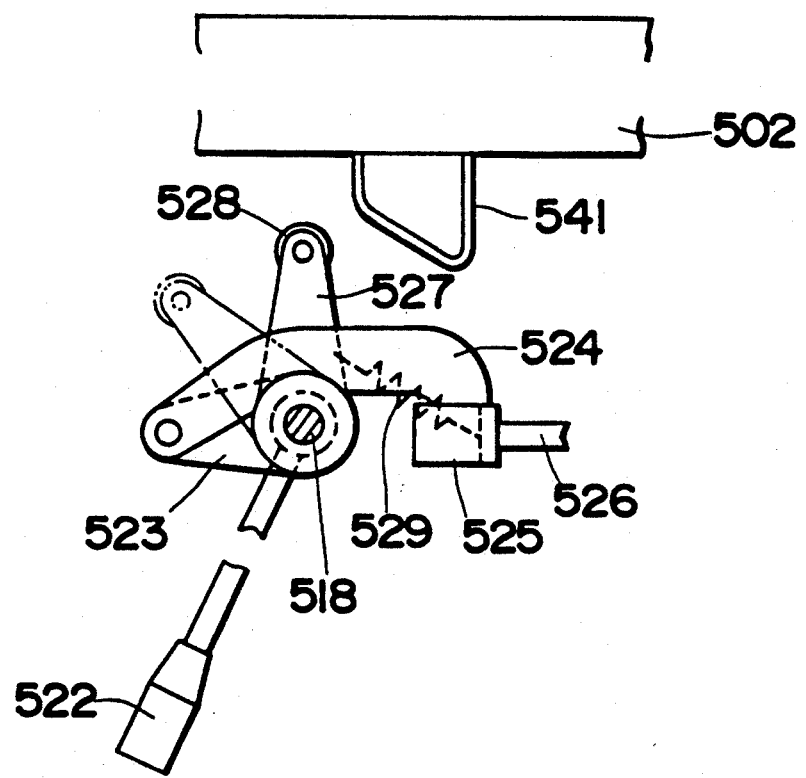
Figure 31B:
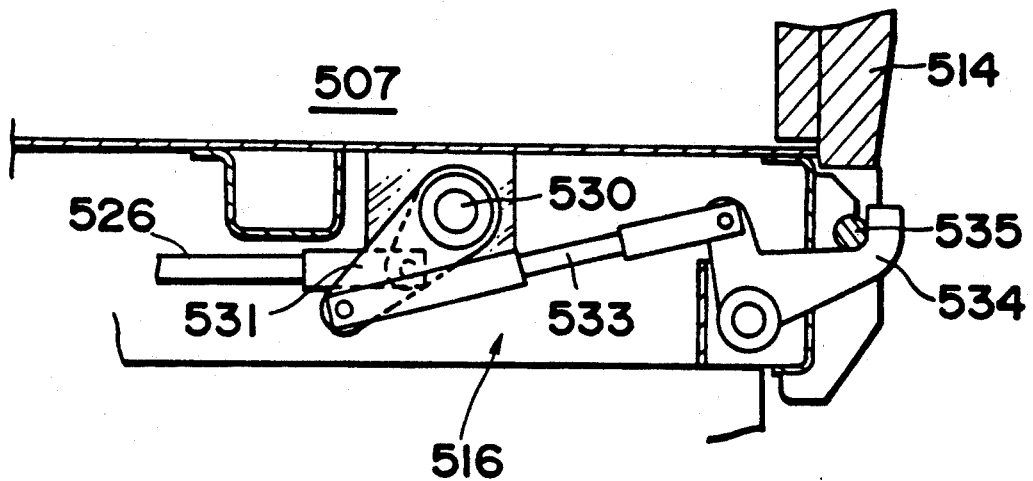
Figure 31C:
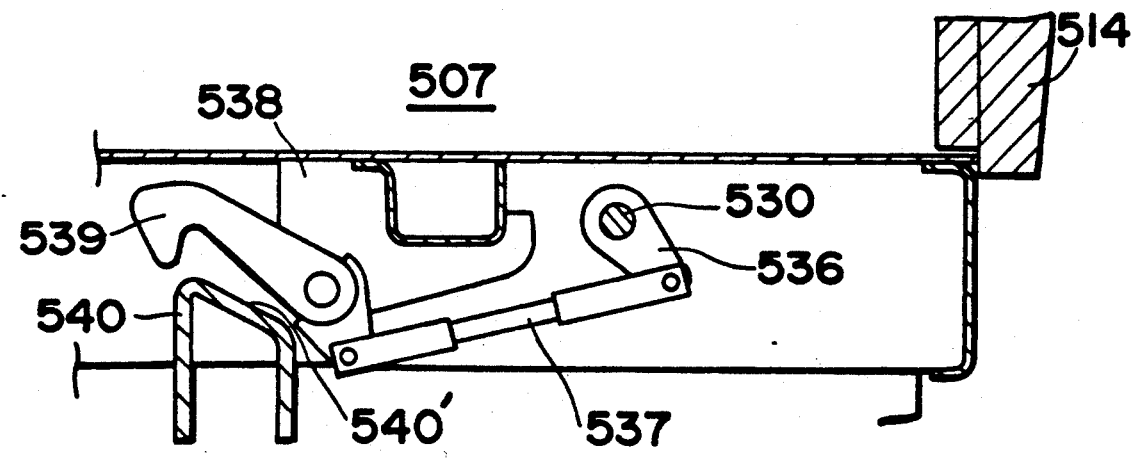
Figure 32:
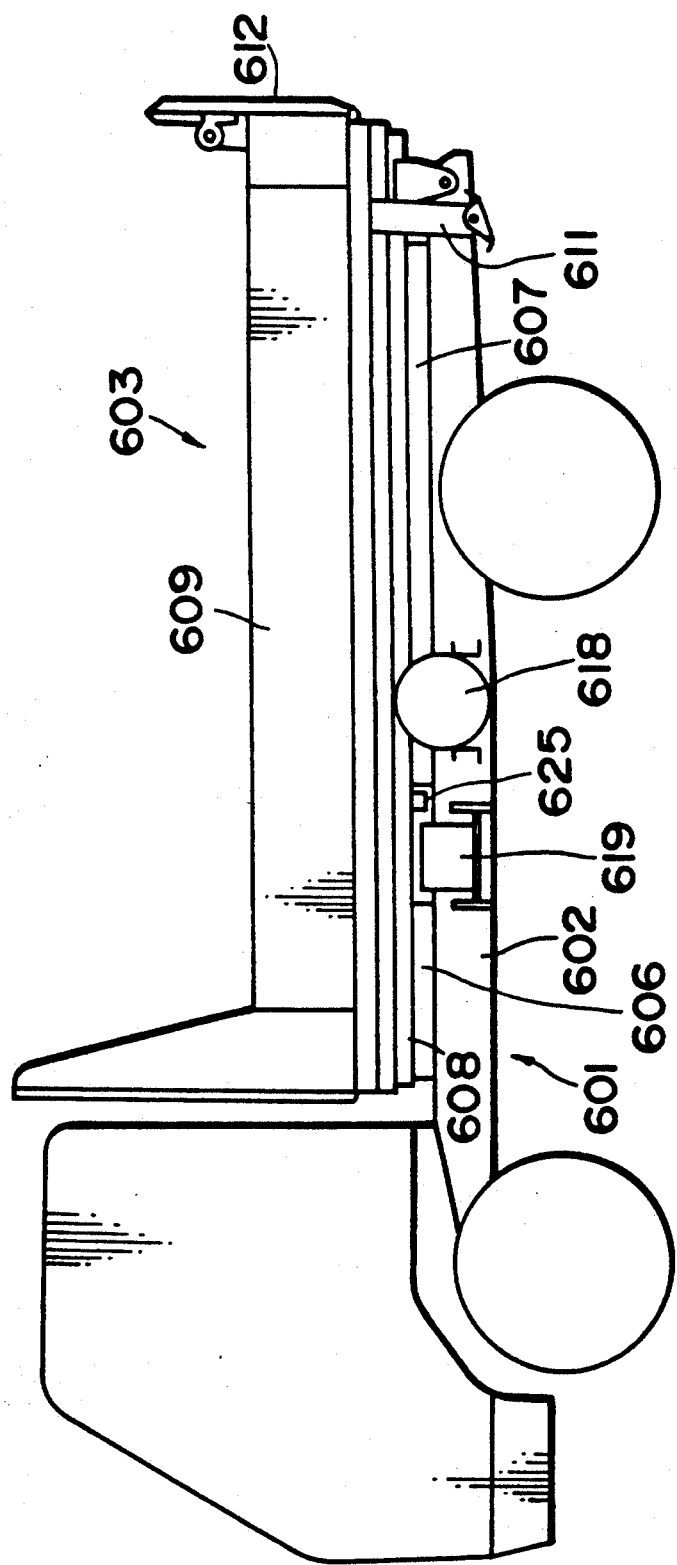
Figure 33:
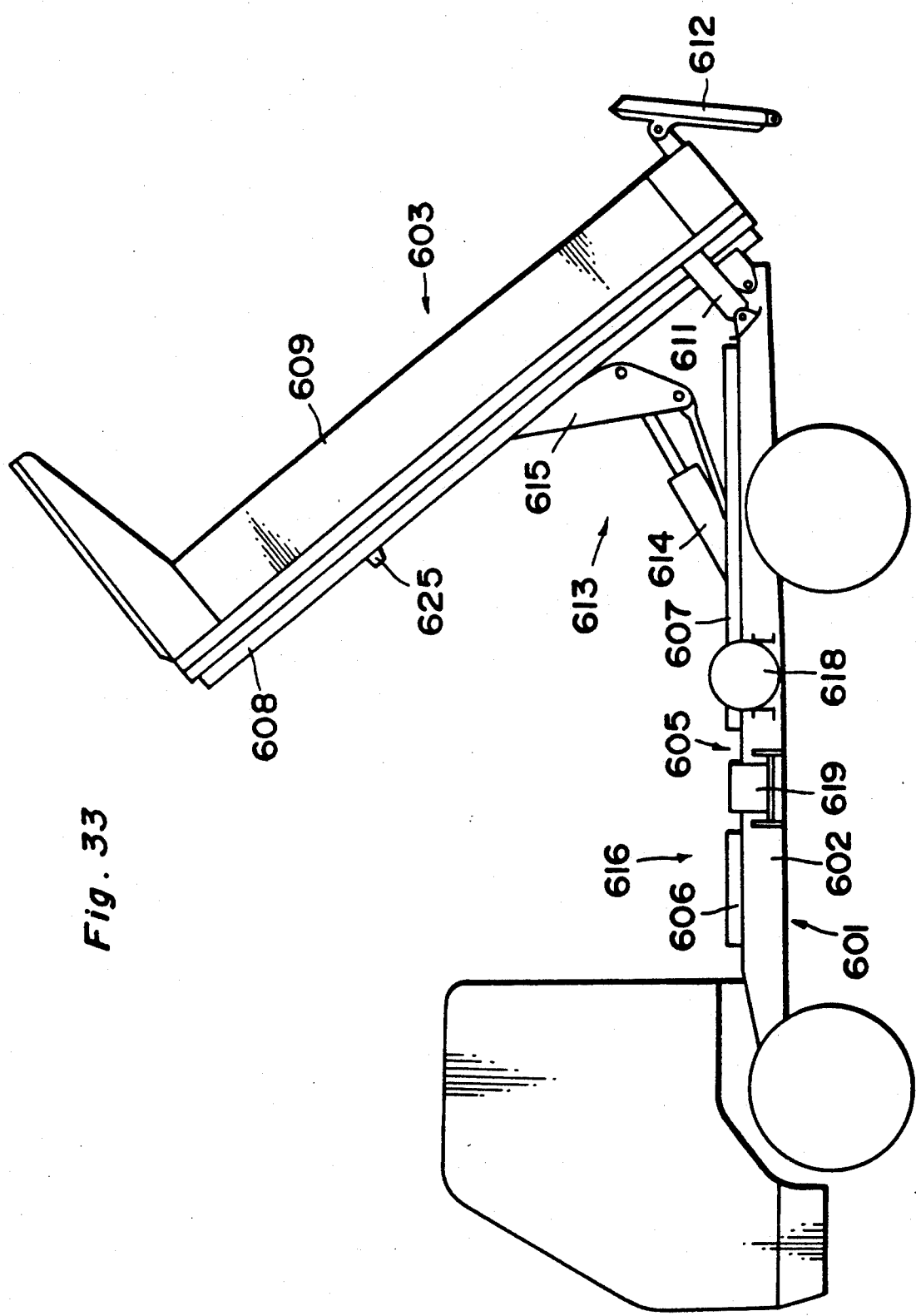
Figure 34:
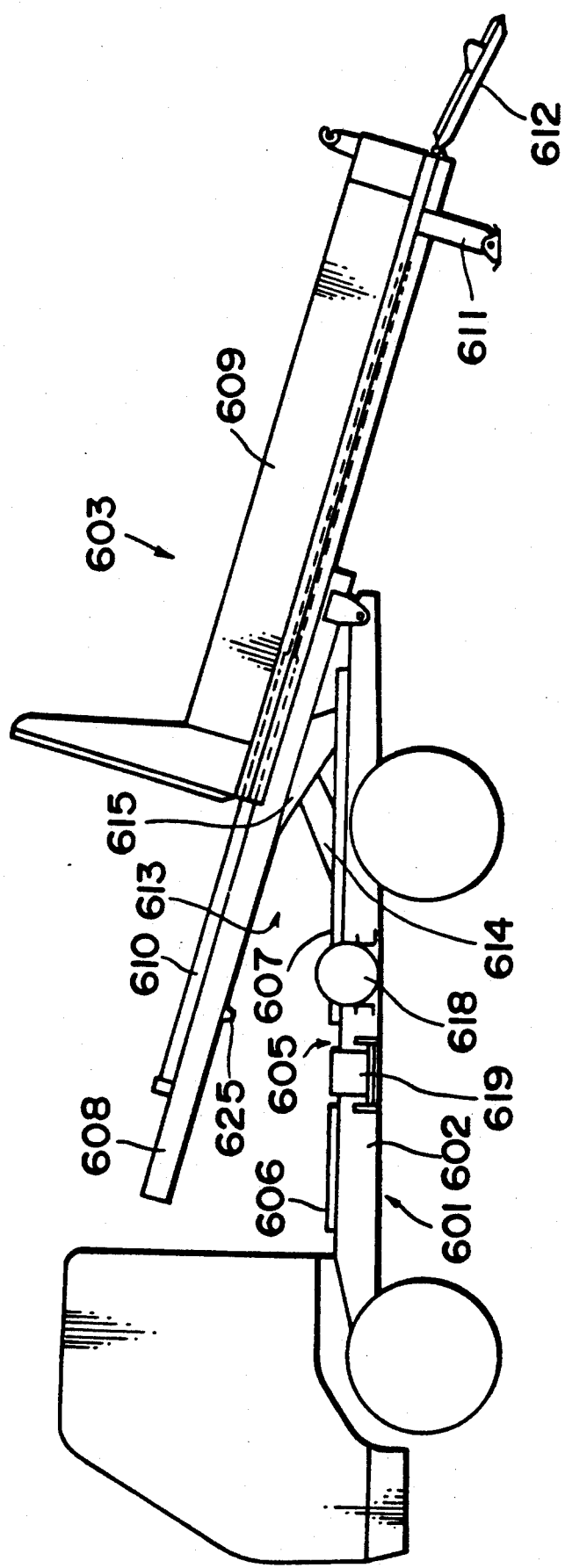
Figure 37:
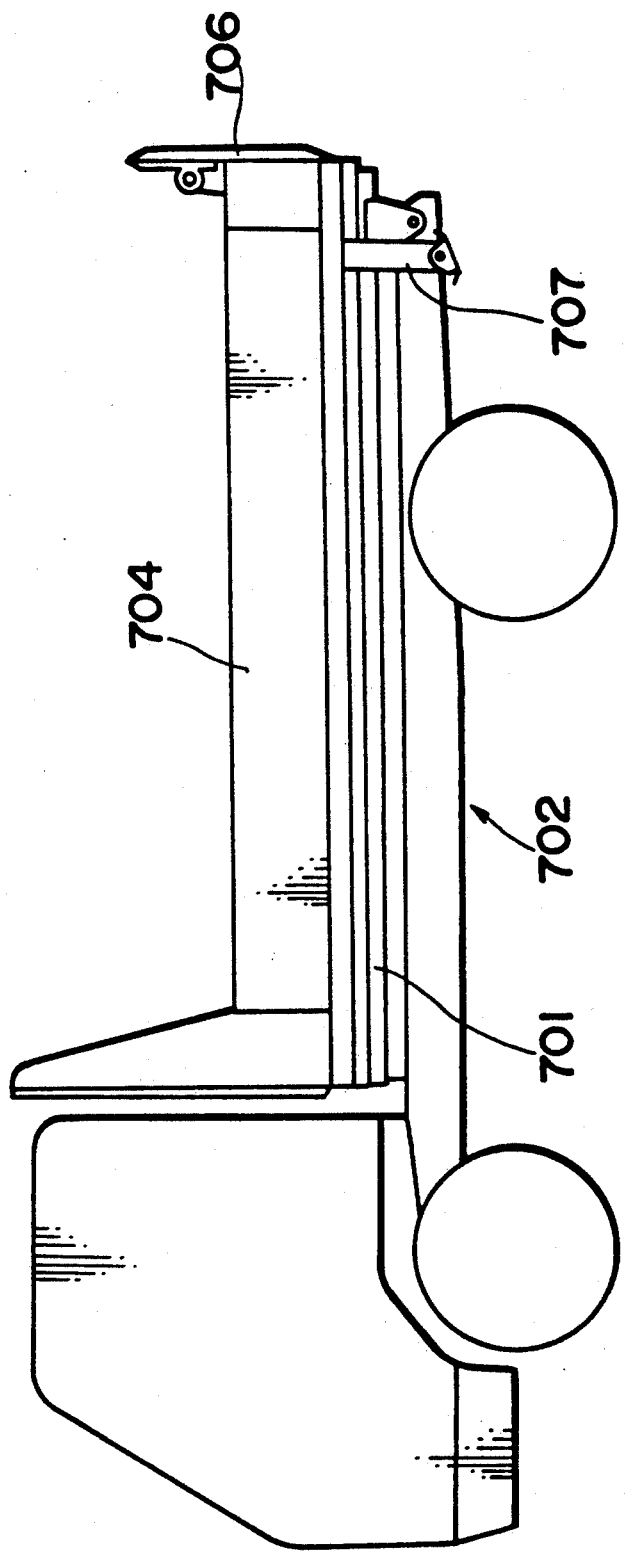
Figure 38:
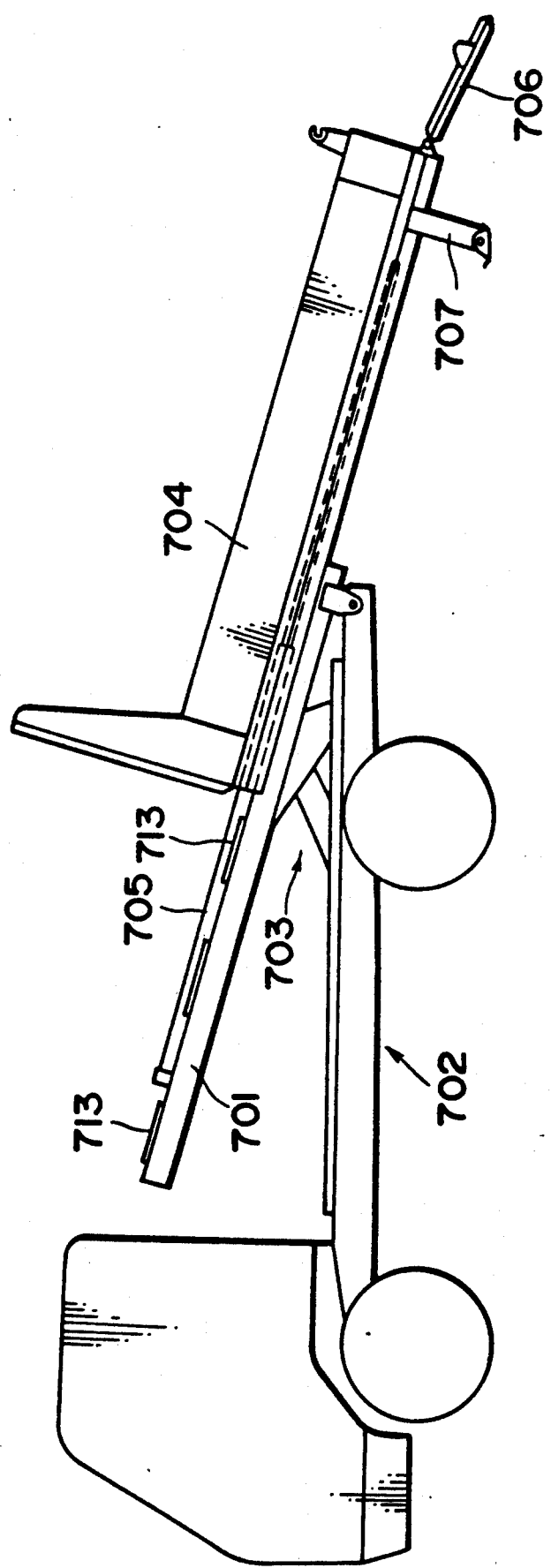
Figure 39:
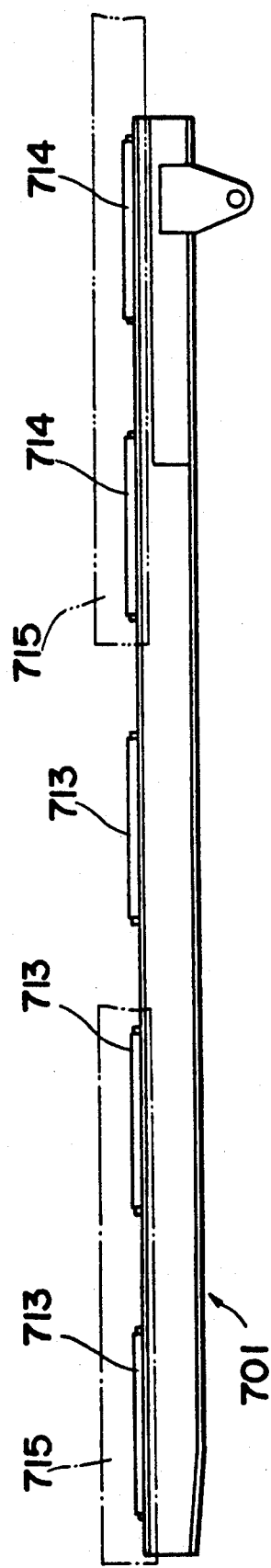
Figure 40:
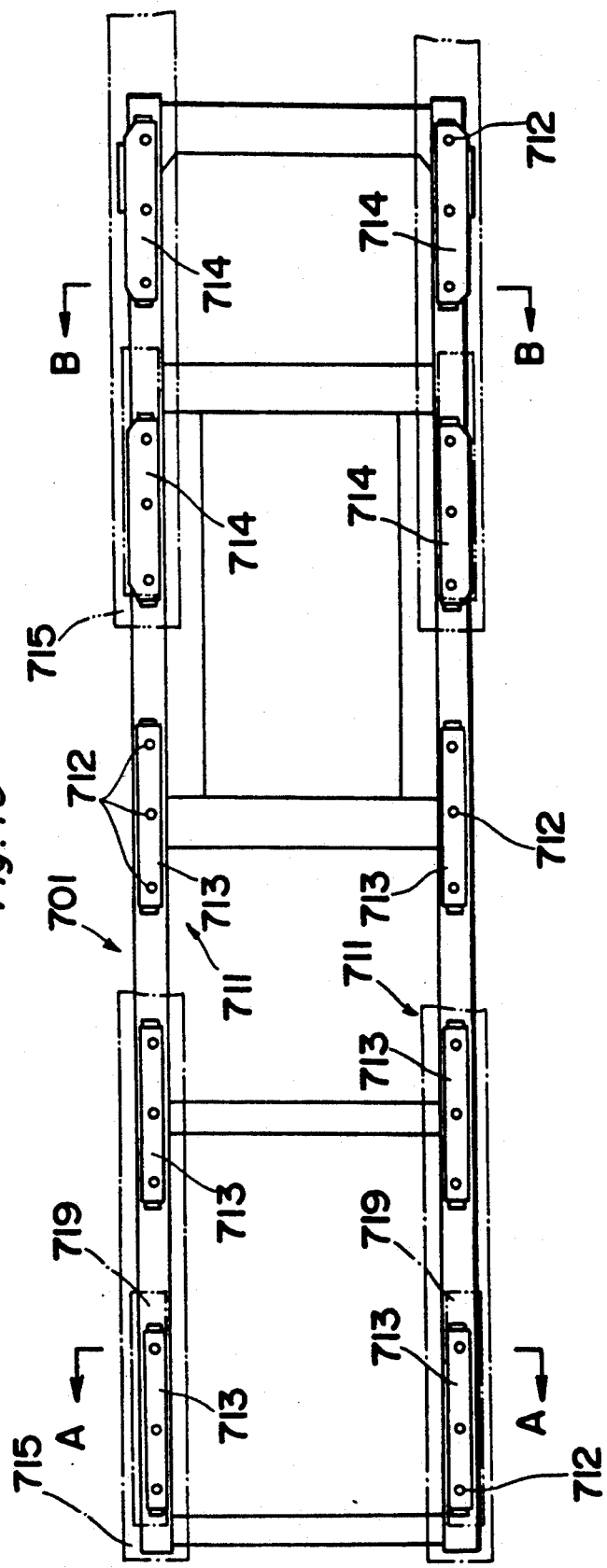
Figure 41:
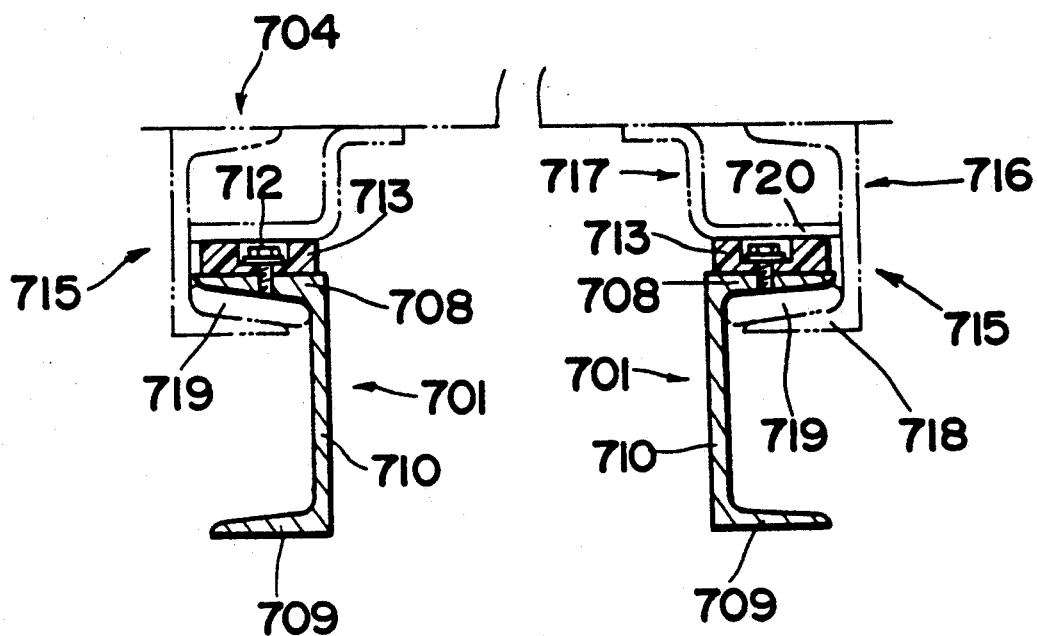
Figure 42:
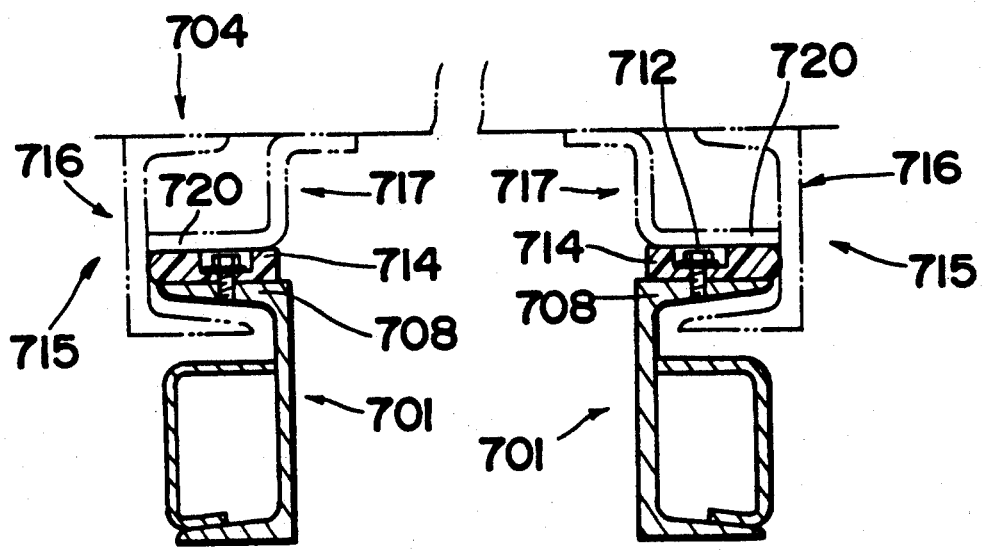
Figure 43:
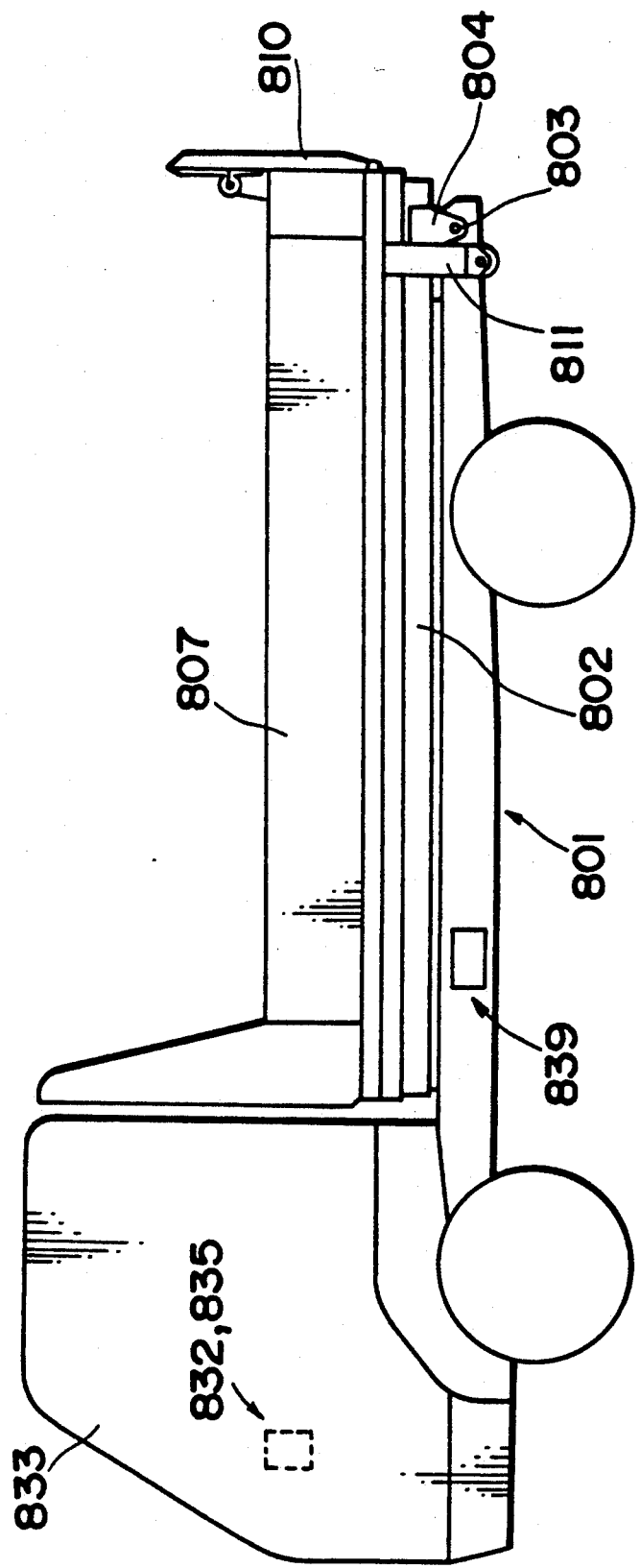
Figure 44:
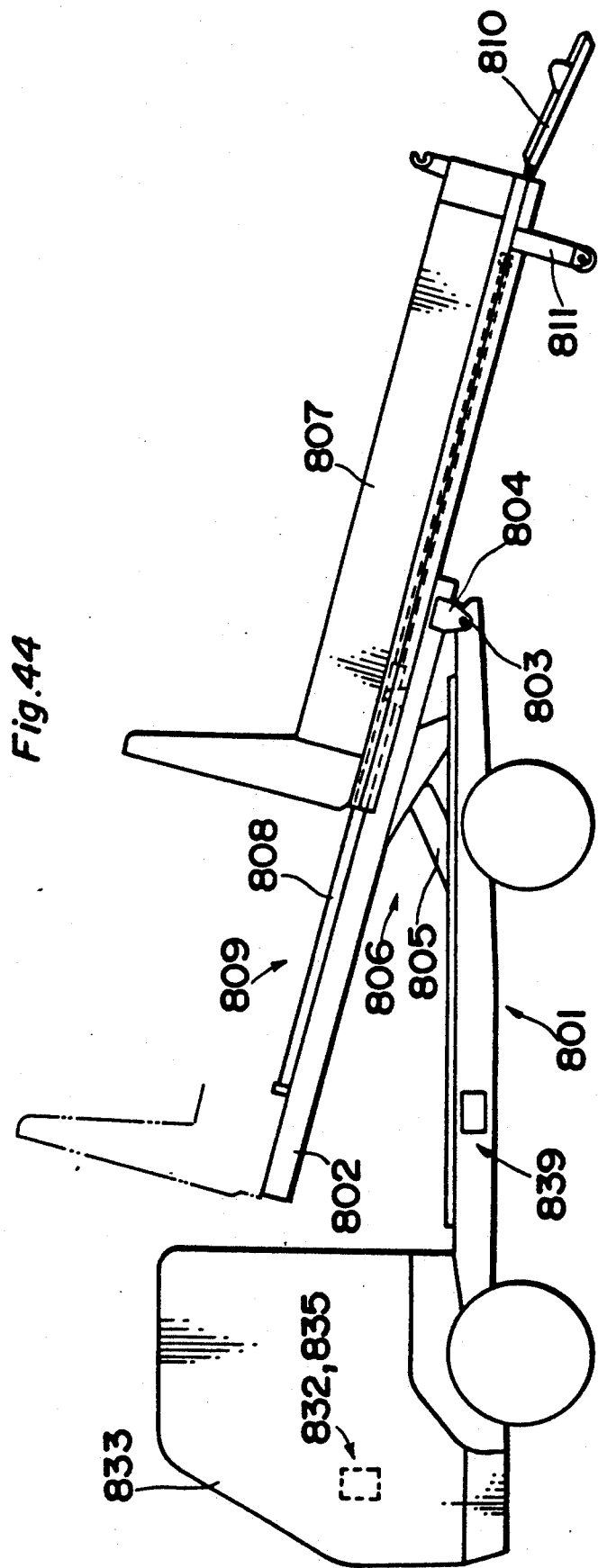
Figure 45:
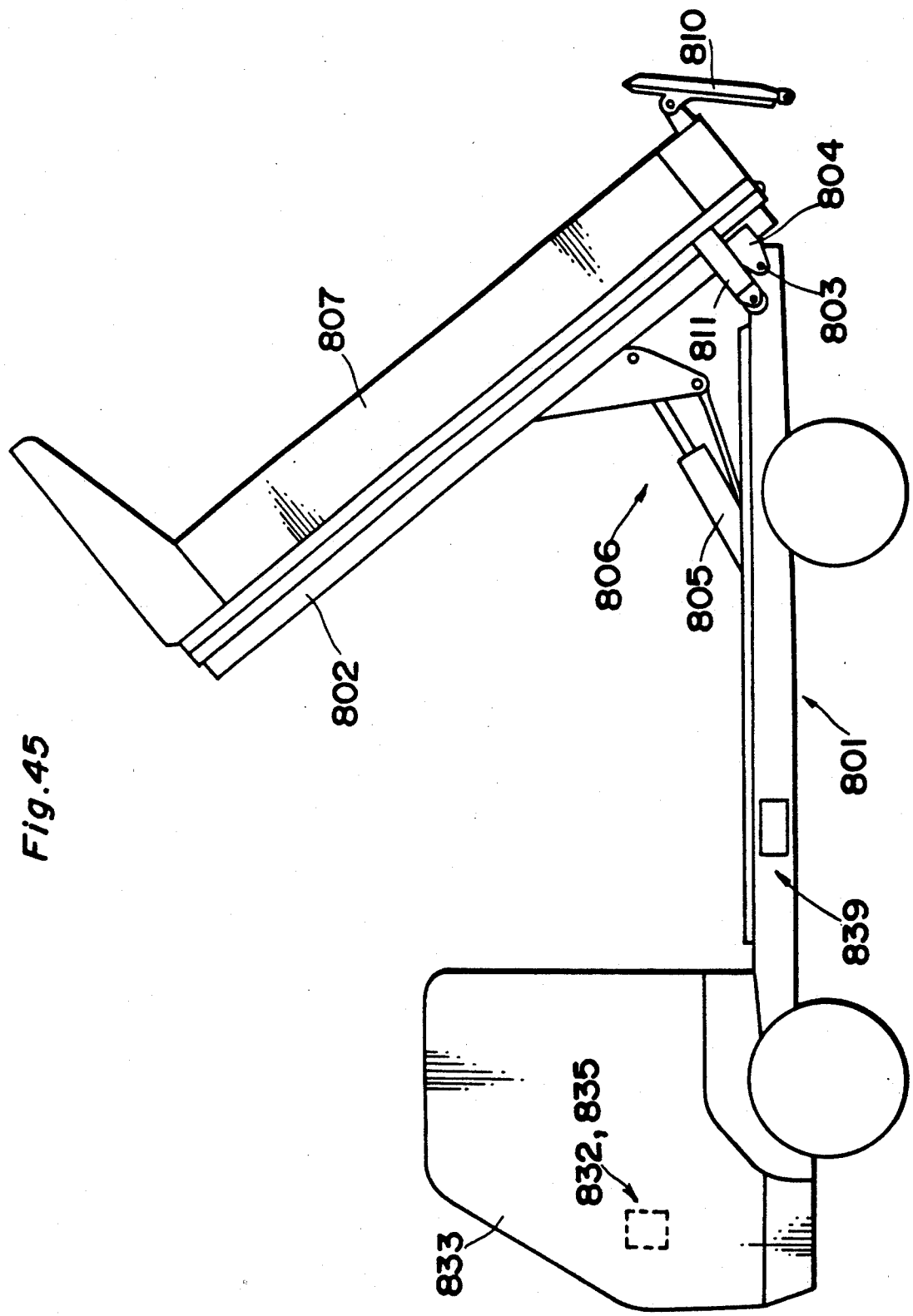
Figure 46:
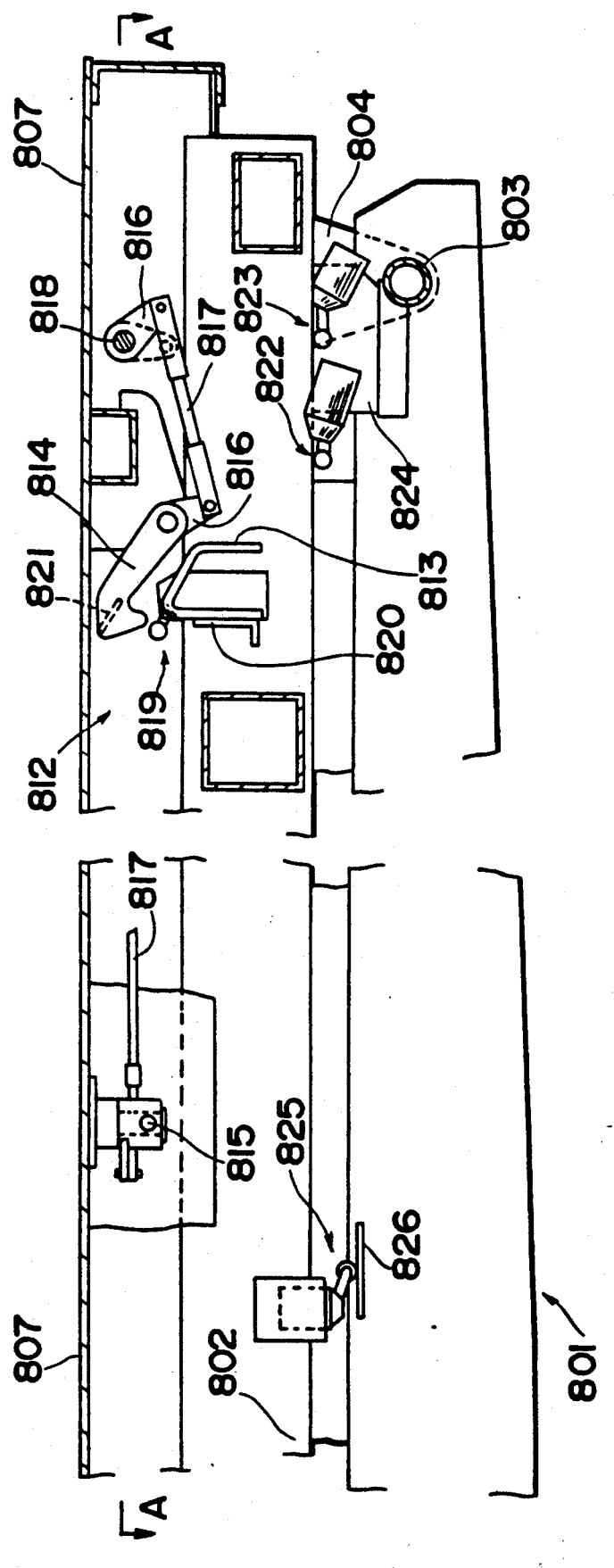
Figure 47:
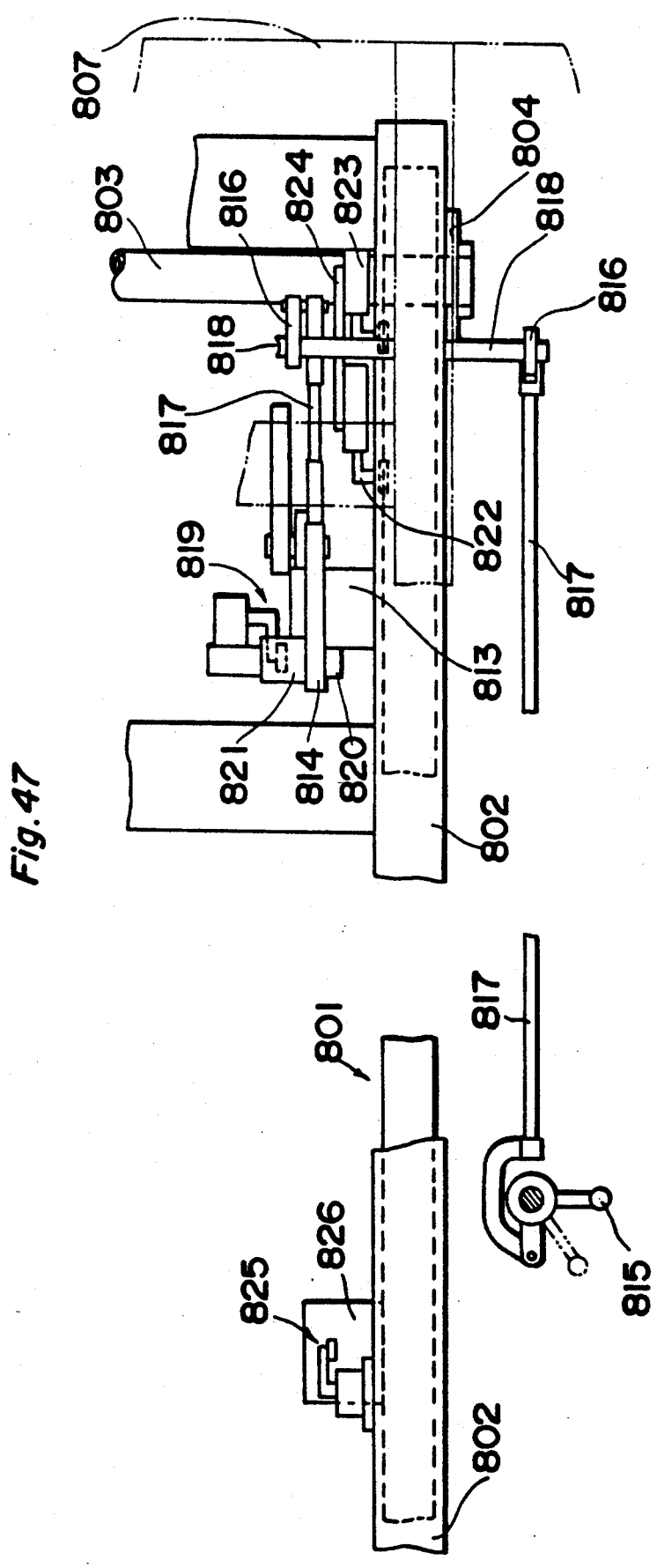
Figure 48:
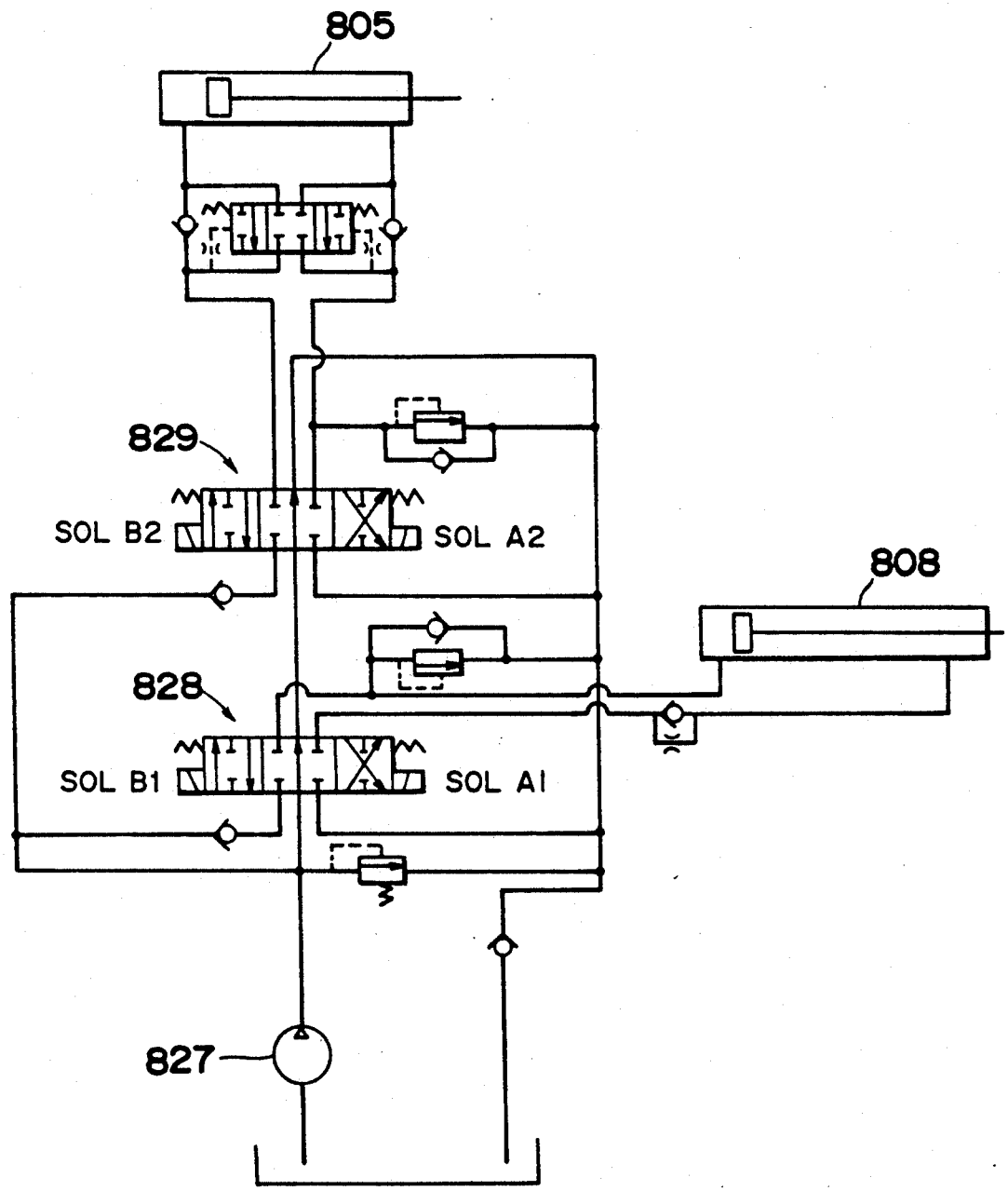
Figure 49:
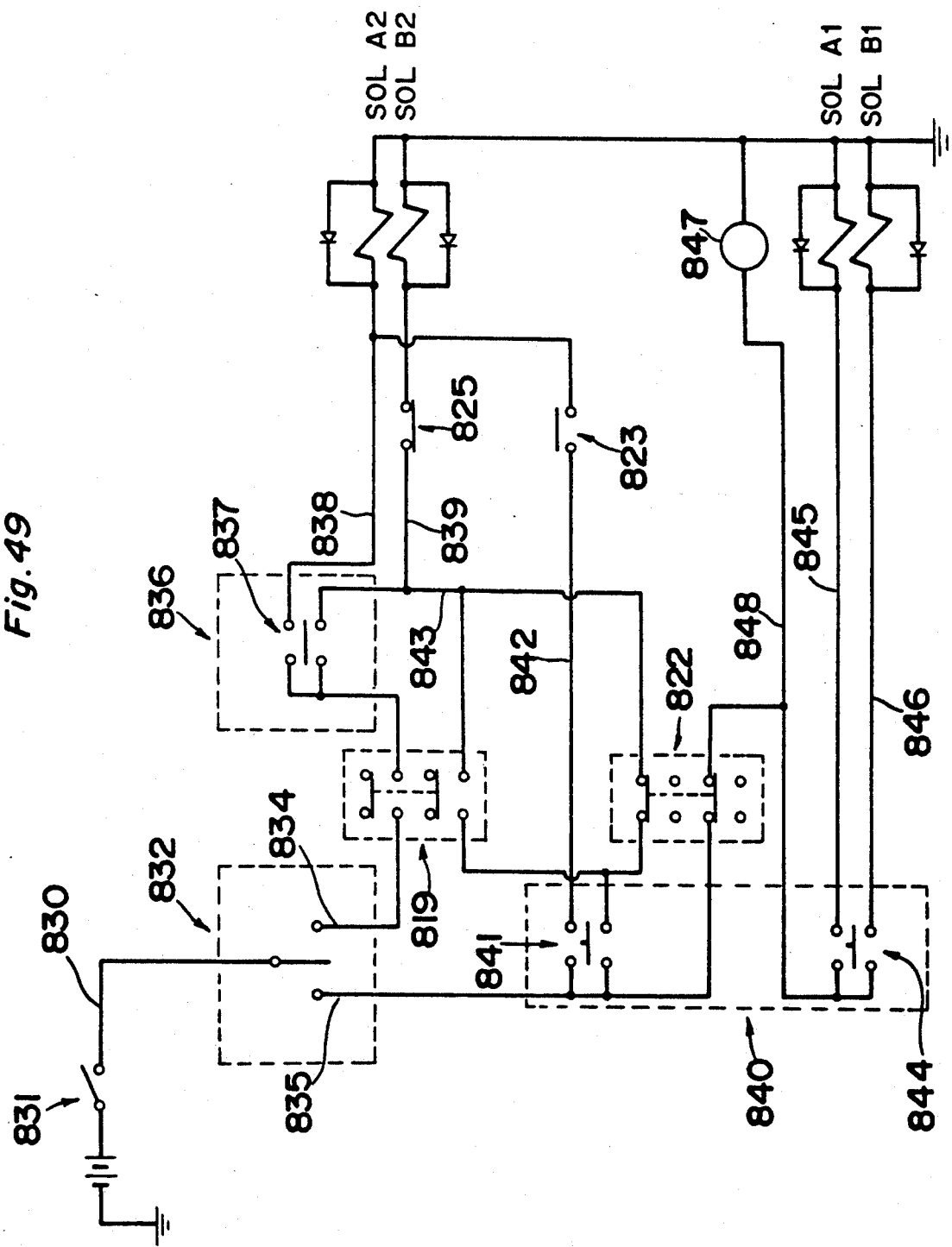
Figure 50:
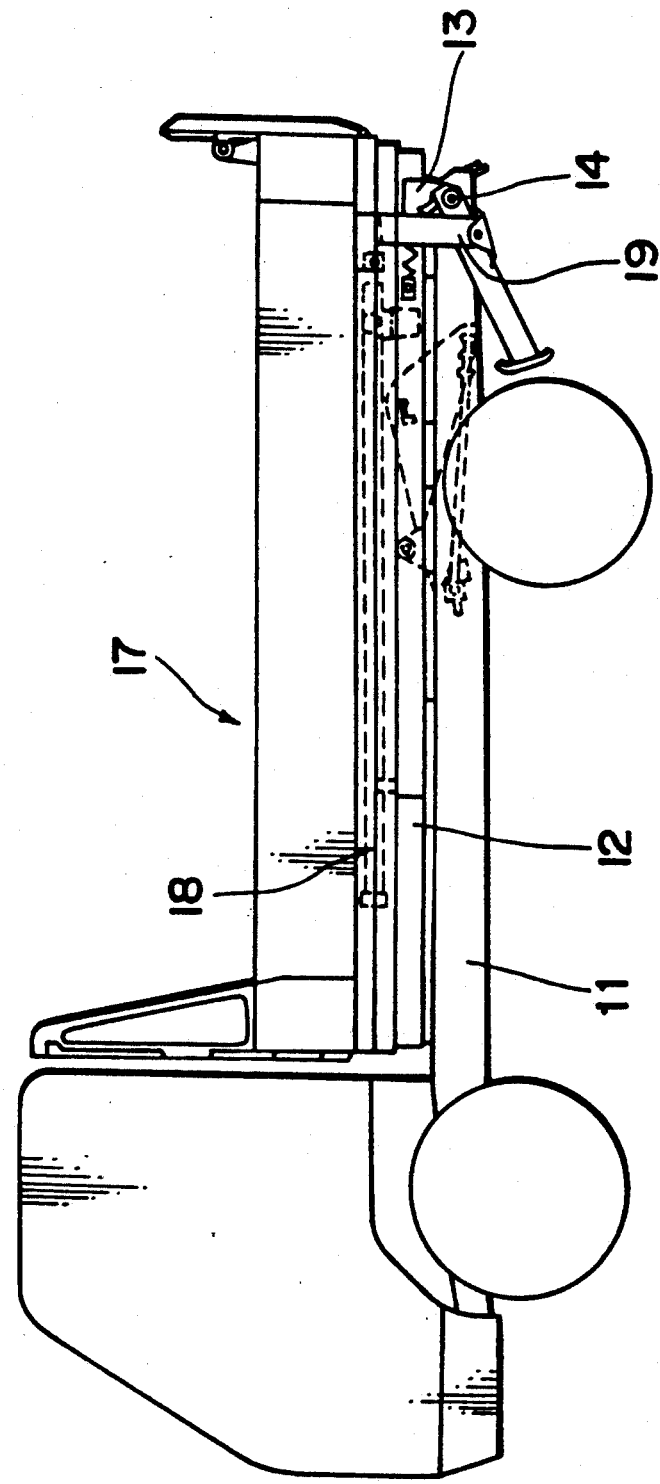
Figure 51:
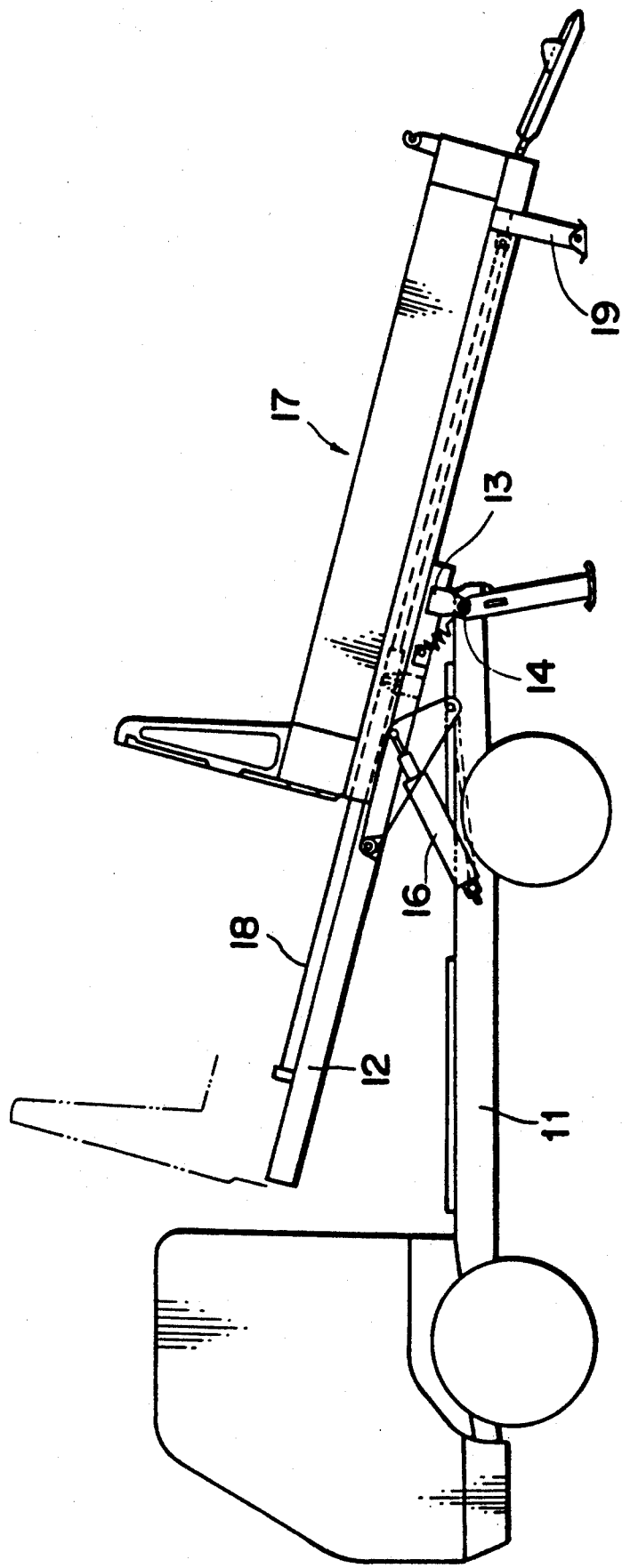

FIGS. 31(a), 31(b), and 31(c) are, respectively, operational views of the operation means, the tailgate locking means and the backward slide prevention means;

FIG. 32 is a general view of a car carrier truck used also as a dump truck according to a sixth embodiment of the present invention;

FIG. 33 is a general view of the truck of FIG. 32 in a fully tilted state;

FIG. 34 is a general view of the truck of FIG. 32 during a sliding operation of a cargo container;

FIG. 35 is a top view of a chassis of the truck of FIG. 32;

FIG. 36 is a sectional view taken along the line A—A in FIG. 35;

FIG. 37 is a general view of a car carrier truck according to a seventh embodiment of the present invention;

FIG. 38 is an illustration showing an operational state of the seventh embodiment;

FIG. 39 is a side view of a dump frame of the car carrier truck of FIG. 37;

FIG. 40 is a top view of the dump frame of FIG. 39;

FIG. 41 is a sectional view taken along the line A—A in FIG. 40;

FIG. 42 is a sectional view taken along the line B—B in FIG. 40;

FIG. 43 is a general view of a car carrier truck used also as a dump truck according to an eighth preferred embodiment of the present invention;

FIGS. 44 and 45 are views showing operational states of the truck of FIG. 43;

FIG. 46 is a fragmentary enlarged view showing a lock detection means, an upper limit detection means, and a lower limit detection means;

FIG. 47 is a sectional view taken along the line A—A in FIG. 46;

FIG. 48 is an oil circuit diagram according to the eighth embodiment;

FIG. 49 is an electric circuit diagram according to the eighth embodiment;

FIGS. 50 and 51 are views of a common car carrier truck; and

Figure 52:
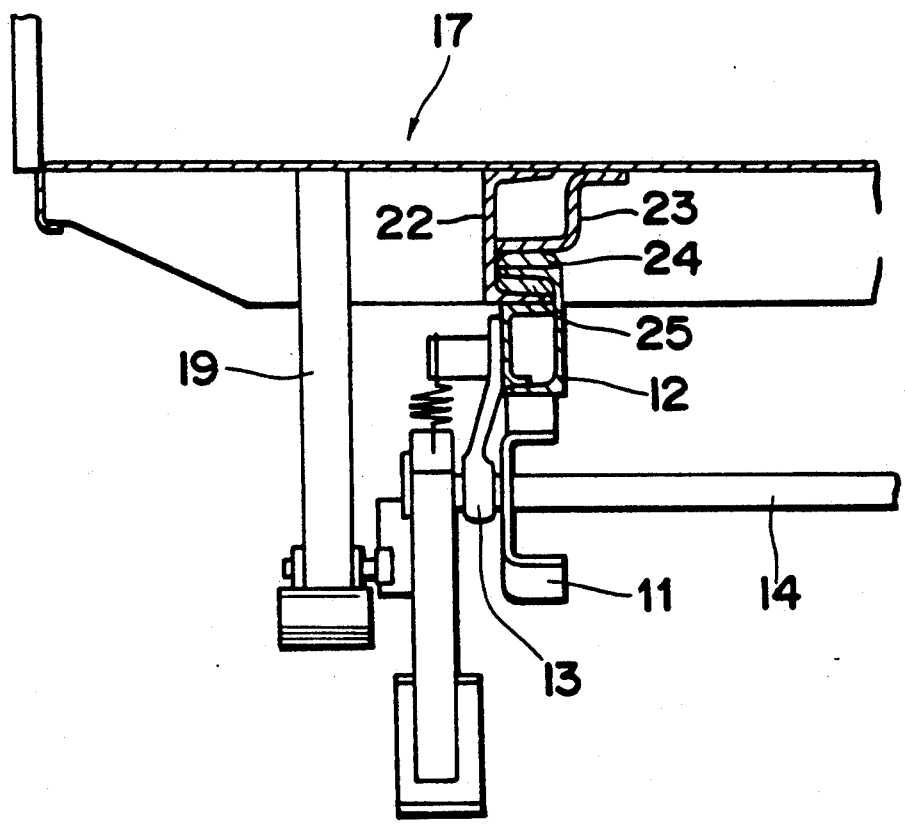

FIG. 52 is a sectional view of a prior art

DETAILED DESCRIPTION OF THE PREFERRED EMBODIMENTS OF THE INVENTION

Hereinbelow, the present invention will be described in detail with respect to the embodiments illustrated in the accompanying drawings.

First Embodiment

Figure 1:
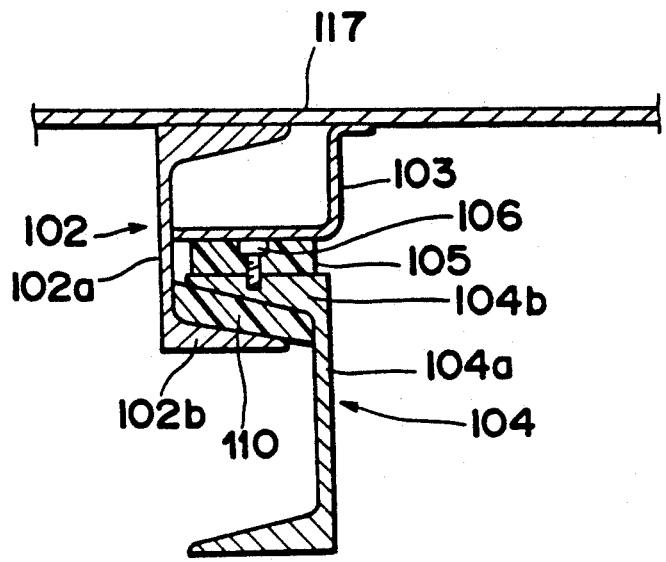
FIG. 1 is a sectional view of a first embodiment according to the present invention.

FIG. 1 shows a sliding pad installation structure according to a first embodiment according to the present invention, and this sliding pad installation structure is applicable to a common car carrier truck as shown in FIGS. 50 and 51.

In FIG. 1, a reference numeral 102 indicates a main girder having a U-shaped section extending in the longitudinal direction at the bottom of a cargo container 117. Numeral 103 indicates a subsidiary girder installed on an inner side of a vertical portion 102a of the main girder 102. Numeral 104 indicates a dump frame which has a U-shaped section and whose upper horizontal portion 104b is inserted between a lower horizontal portion 102b of the main girder 102 and the subsidiary girder 103.

An upper sliding pad 105 of a resin such as nylon is fixed on an upper surface of the upper horizontal portion 104b of the dump frame 104 with bolts 106. The upper sliding pad 105 supports the subsidiary girder 103 in such a manner that the subsidiary girder can slidingly move.

Figure 2:
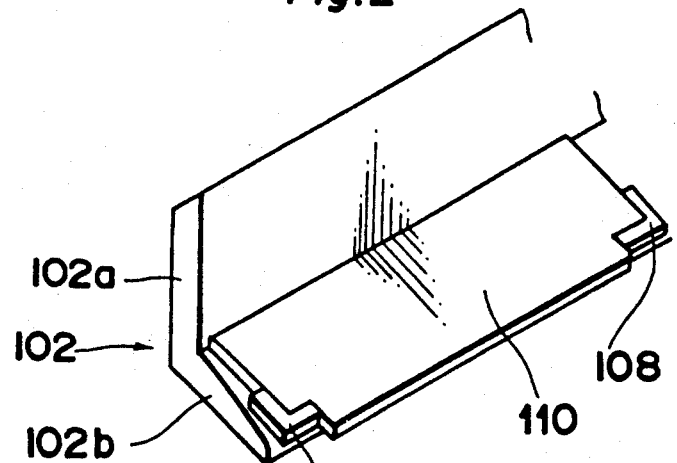
FIG. 2 illustrates how a lower sliding pad is installed in the first embodiment.

On an upper surface of the lower horizontal portion 102b of the main girder 102 are fixed stoppers 107 and 108, as shown in FIG. 2. A lower sliding pad 110 made of a resin such as nylon is fitted between the stoppers 107 and 108 and the vertical portion 102a of the main girder 102. The lower sliding pad 110 is prevented from moving in its longitudinal direction by the stoppers 107 and 108, and in a horizontal direction perpendicular to the longitudinal direction by the stoppers 107 and 108 and the vertical portion 102a of the main girder 102.

The lower sliding pad 110 is also in contact with a vertical portion 104a of the dump frame 104 so as to prevent the cargo container 117 from moving in a horizontal direction perpendicular to the longitudinal direction relative to the dump frame 104. Furthermore, the lower sliding pad 110 is of a planar form with the upper and lower surfaces thereof being in contact with, respectively, a lower surface of the upper horizontal portion 104b of the dump frame 104 and an upper surface of the lower horizontal portion 102b of the main girder 102, and thereby restricts vertical movement of the cargo container 117. In order that the flat planar lower sliding pad can be used, a shape steel beam common to the main girder 102 and the dump frame 104 is used.

Figure 3:
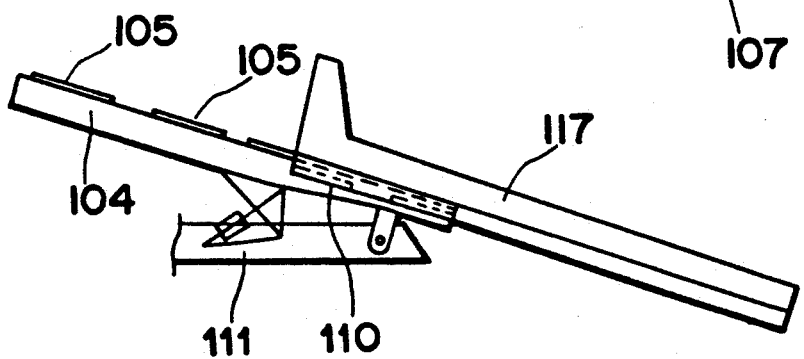
FIG. 3 is an explanatory schematic illustration of a car carrier truck of the first embodiment in a state in which a cargo container is being slidingly moved on a dump frame.

A plurality of upper sliding pads 105 and a plurality of lower sliding pads 110 are mounted at appropriate intervals in the longitudinal direction, as shown in FIG. 3. The cargo container 117 moves slidingly on the upper sliding pad 105 fastened onto the dump frame 104. Vertical and lateral movements of the cargo container 117 are restricted by the lower sliding pad 110 between the dump frame 104 and the main girder 102, so that the cargo container 117 can be smoothly slid, in a tilted condition, on the dump frame 104 in the longitudinal direction relative to a chassis 111.

In this case, the lower sliding pad 110 is in contact with the dump frame 104 and is subjected to a force in the longitudinal direction by the dump frame 104. However, the stoppers 107 and 108 prevent the lower sliding pad 110 from being disengaged. The stoppers 107 and 108 also function so as to prevent the lower sliding pad 110 from moving in a horizontal direction perpendicular to the longitudinal direction. But, because the lower sliding pad 110 is in contact with the vertical portion 102a of the main girder 102 and the vertical portion 104a of the dump frame 104, as shown in FIG. 1, the lower sliding pad 110 would not get out of place in the horizontal direction even if the stoppers did not have engagement portions for stopping the movement in this horizontal direction.

As described above, because the lower sliding pad 110 is not fastened with bolts, unlike the prior art examples but fitted between stoppers 107 and 108 fastened on the lower horizontal portion 102b of the main girder 102, the installation and replacement of the lower sliding pad becomes easy.

Second Embodiment

FIGS. 4 to 8 show a truck of a second embodiment of the present invention.

Figure 4:
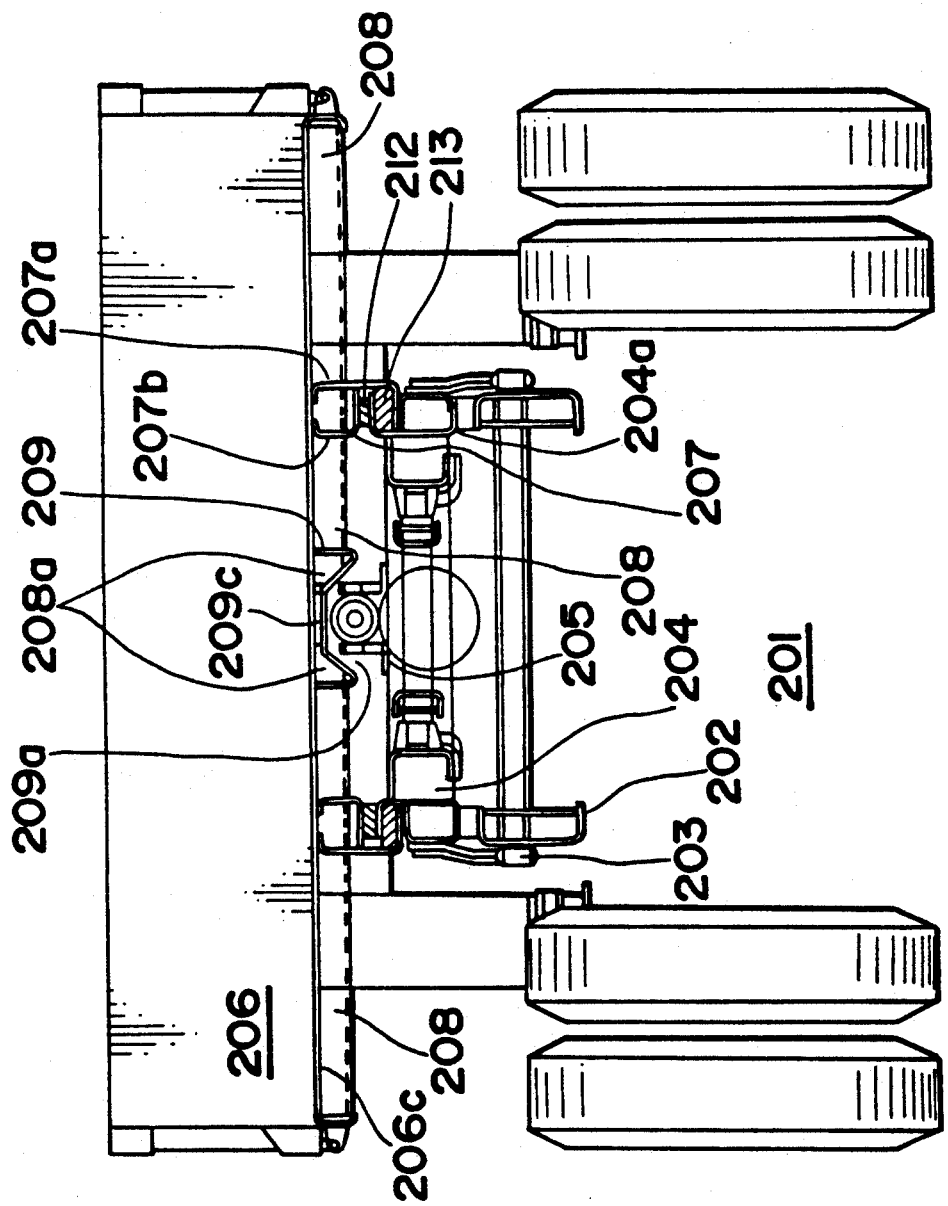
FIG. 4 is a rear elevation of a truck of a second preferred embodiment.

As shown in FIG. 4, the car carrier truck 201 according to the present invention is essentially constituted from a chassis frame 202, a sub-frame, namely a dump frame 204, supported on a pivotal shaft 203 tiltably relative to the chassis frame 202, a load-carrying platform 206 supported on the dump frame 204 so that the platform can be longitudinally slidingly moved by a cylinder device 205, a pair of right and left main girders 207 extending on the load-carrying platform 206 in the longitudinal direction thereof, a plurality of traverse girders 208 intersecting each main girder 207 at right angles and connected thereto in a lateral direction, and a subsidiary girder 209 connecting center-side end portions 208a of the traverse girders 208 located between the main girders 207.

The subsidiary girder 209 is provided with an upward recess 209a at a central lower portion thereof. A cylinder device 205 is disposed in the recess 209a.

Figure 5:
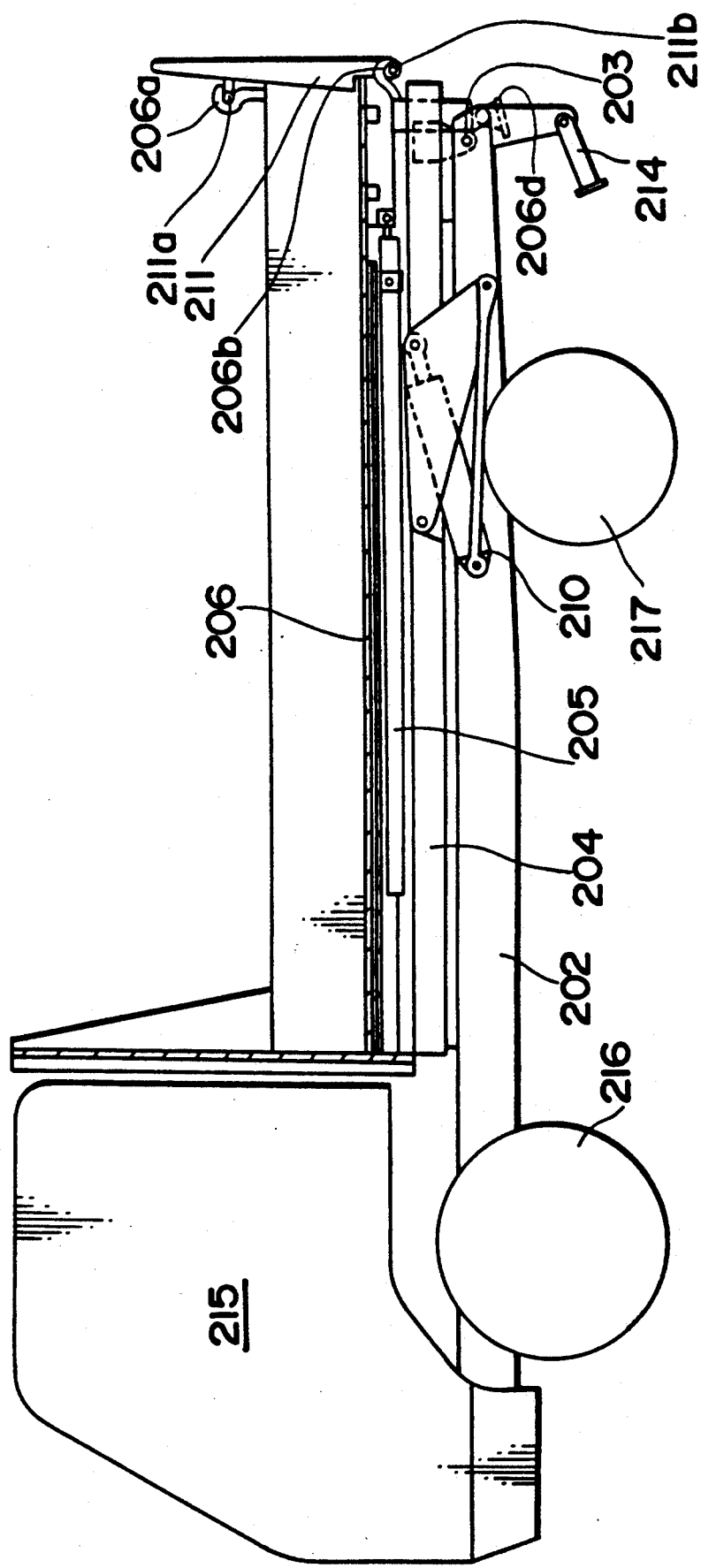
FIG. 5 is a side elevation of the truck shown in FIG. 4.
Figure 6:
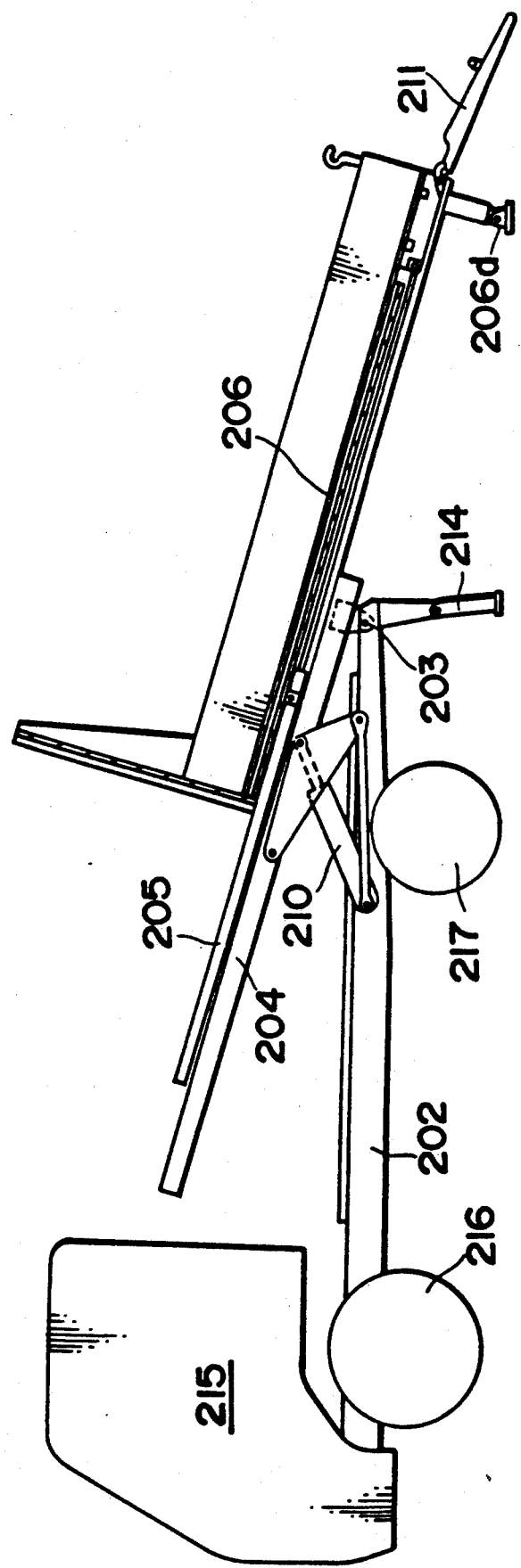
FIG. 6 is a side elevation of the truck of the second embodiment in a state in which a load-carrying platform is tilted and placed on the ground.
Figure 7:
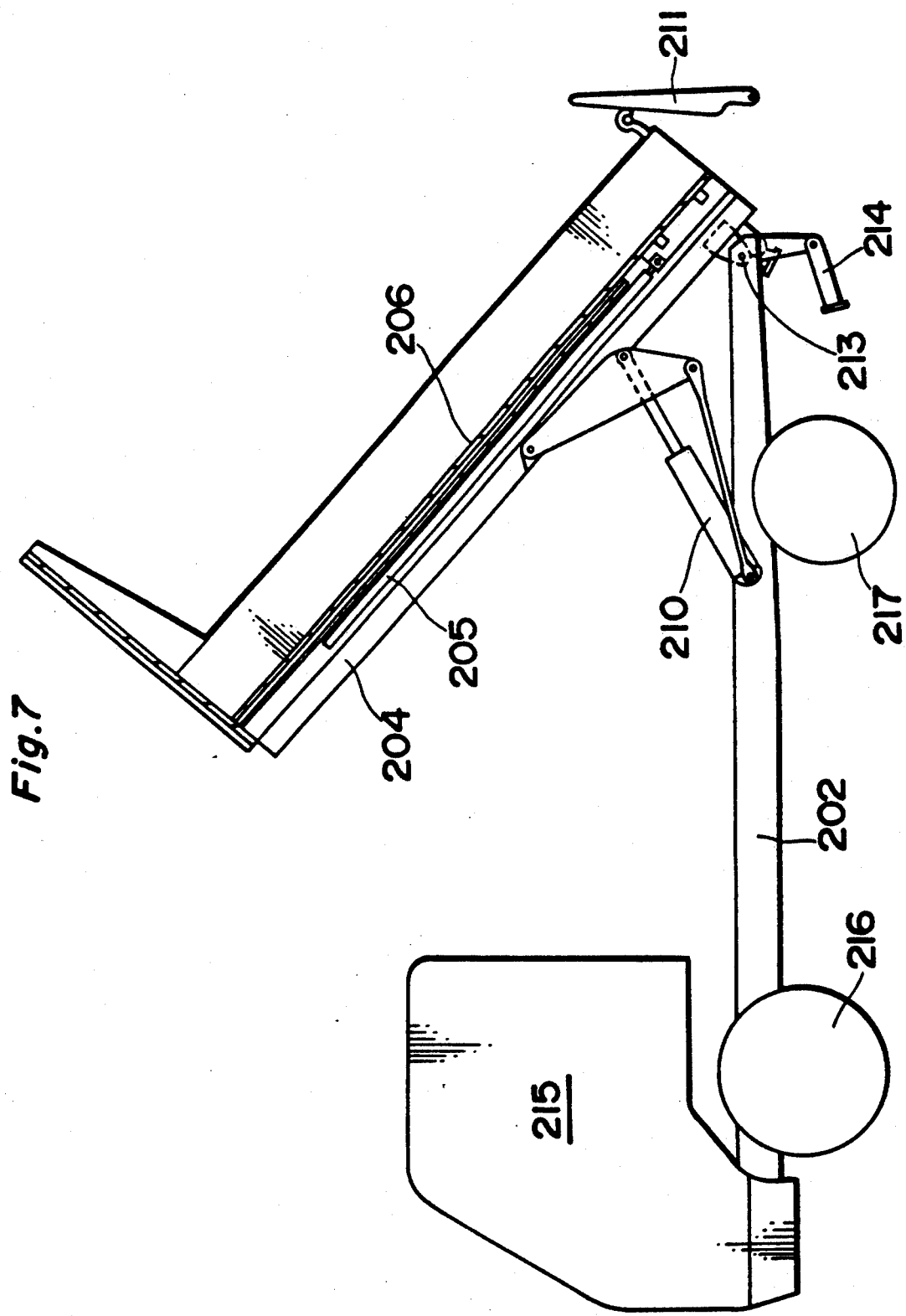
FIG. 7 is a side view of the second embodiment in a state in which the load-carrying platform is tilted without being placed on the ground.

Referring to FIG. 5, a reference numeral 210 designates a cylinder device used for a tilting operation. The cylinder device 210 is interposed as part of a tilting means between the chassis frame 202 and the dump frame 204. The dump frame 204 is tilted through the extension of the tilt cylinder device 210, as shown in FIGS. 6 and 7. The load-carrying platform 206 is formed as a cargo container, at a rear end portion of which is provided a tailgate 211. The tailgate 211 is provided with upper hinge pins 211a and lower hinge pins 211b, as shown in FIG. 5. The hinge pins 211a can be detachably engaged with hooks 206a fitted to the load-carrying platform 206. Similarly, lower hinge pins 211b can be also detachably engaged with hooks 206b fitted to the load-carrying platform 206.

In the case that the dump frame 204 is tilted, if only the hooks 206b are disengaged, the tailgate 211 becomes rotatable around the upper hinge pins 211a. Accordingly, by tilting the load-carrying platform 206 backward, cargoes such as soil and sand, for example, can be made to slidingly fall (see FIG. 7).

On the other hand, when only the hooks 206a are disconnected, the tailgate 211 becomes rotatable around the lower hinges 211b. Thus, the tailgate 211 makes a footboard connecting the rear end of the load-carrying platform 206 and the ground when the load-carrying platform 206 is slid backward and tilted (see FIG. 6). Therefore, vehicles such as construction vehicles can ascend the footboard, as described above. At this time, the support legs 206d in the rear of the load-carrying platform 206 are brought into a ground-contact.

Figure 8:
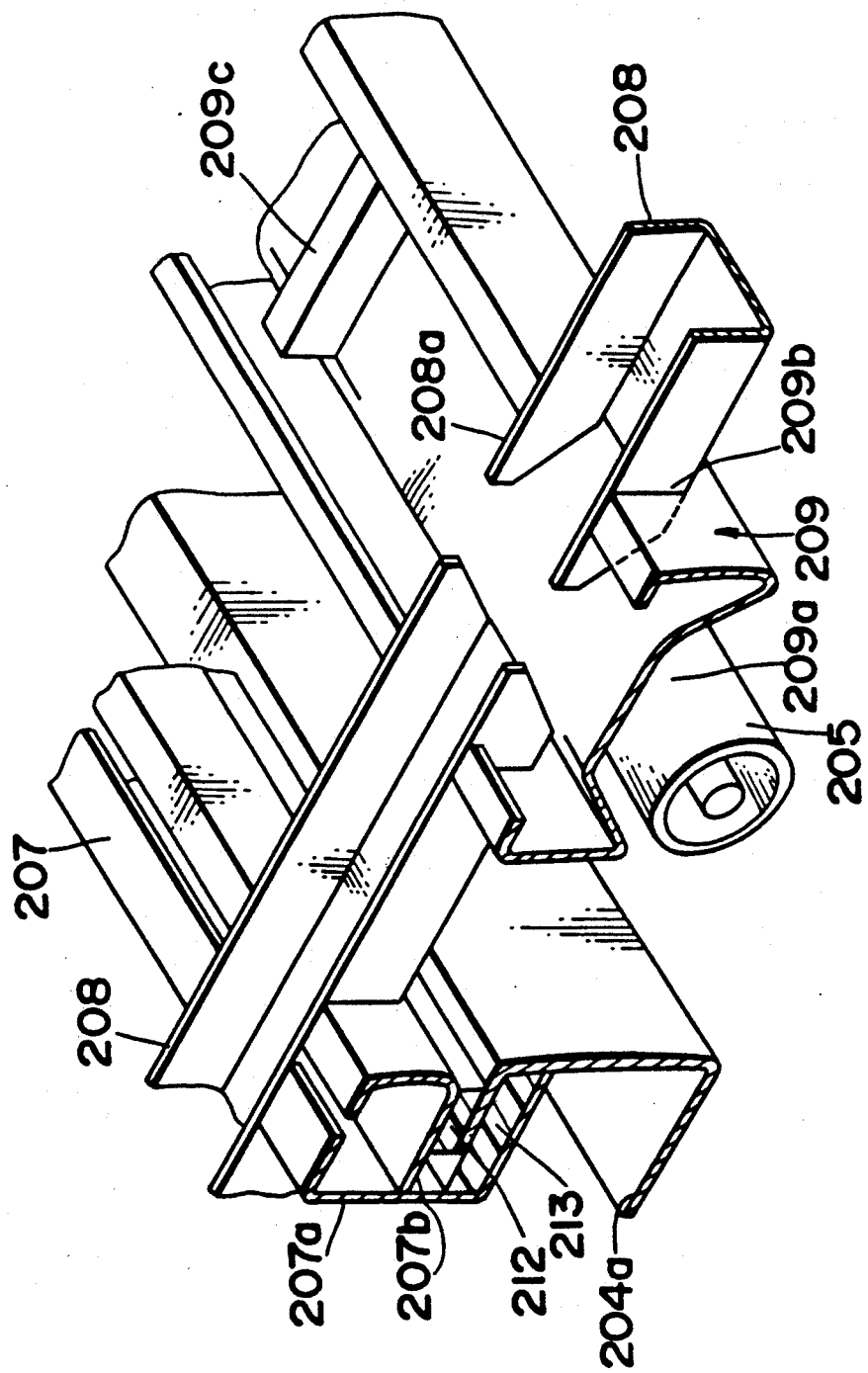
FIG. 8 is a perspective view of a portion of the second embodiment.

The main girder 207 is, as shown in FIGS. 4 and 8, constituted from large and small channel members 207a and 207b in combination. The gutter-shaped traverse girders 208 across the main girder 207 are disposed in notches formed in the main girder and integrally welded to the main girder. The recess 209a of the subsidiary girder 209 recedes, as shown in FIGS. 4 and 8, in a plateau shape. The subsidiary girder 209 is also provided with notches 209b so that the the traverse girders 208 on both sides enter in the notches 209b. The center-side end portions 208a of the traverse girders 208 are fitted in the notches 209b and integrated with the subsidiary girder by welding.

There is some gap between the upper surface of the central portion of the subsidiary girder 209 and a back surface of the load-carrying platform 206, and the subsidiary girder 209 is reinforced in the gap by a reinforcing member 209c. This reinforcing member 209c is not always necessary, and the gap can also be eliminated by deepening the recess 209a. The recess 209a may be in a shape other than a plateau.

On the dump frame 204, there are provided a pair of right and left main girders 204a extending in a longitudinal direction of the dump frame and corresponding to the main girders 207 of the load-carrying platform 206. The main girder 204a is formed of a channel member. A sliding pad 212 made of hard cloth or synthetic resin is disposed between an upper portion of the channel member 204a and the channel member 207b of the main girder 207. This sliding pad 212 is fixedly attached to the main girder 204a. A vertical dimension between the main girder 204a and the channel member 207b, namely a vertical position of the load-carrying platform 206 relative to the dump frame 204 is regulated by the sliding pad 212.

Furthermore, another sliding pad 213 of a similar material is disposed between the upper portion of the main girder 204a and the channel member 207a of the main girder 207 and fastened on the channel member 207a. The sliding pad 213 is for regulating a lateral position of the dump frame 204 relative to the load-carrying platform 206 so that a center line of the dump frame 204 agrees with that of the load-carrying platform 206. In this manner, the load-carrying platform 206 is supported so as to be slidable in the longitudinal direction relative to the dump frame 204.

A numeral 214 designates an outrigger provided on the chassis frame 202. The outrigger 214 can be bent forward as shown in FIG. 5 or stood upright on the ground. Particularly as shown in FIG. 6, when vehicles such as construction vehicles are loaded, the load-carrying platform 206 is moved backward and placed on the ground at its rear end. In this manner, the truck provides against the contact of the rear end of chassis frame 202 with the ground. Here, a reference numeral 215 designates a cab, a numeral 216 designates a front wheel, and a numeral 217 designates a rear wheel.

Third Embodiment

FIGS. 9 to 13 show a car carrier truck of a third embodiment according to the present invention.

Figure 9:
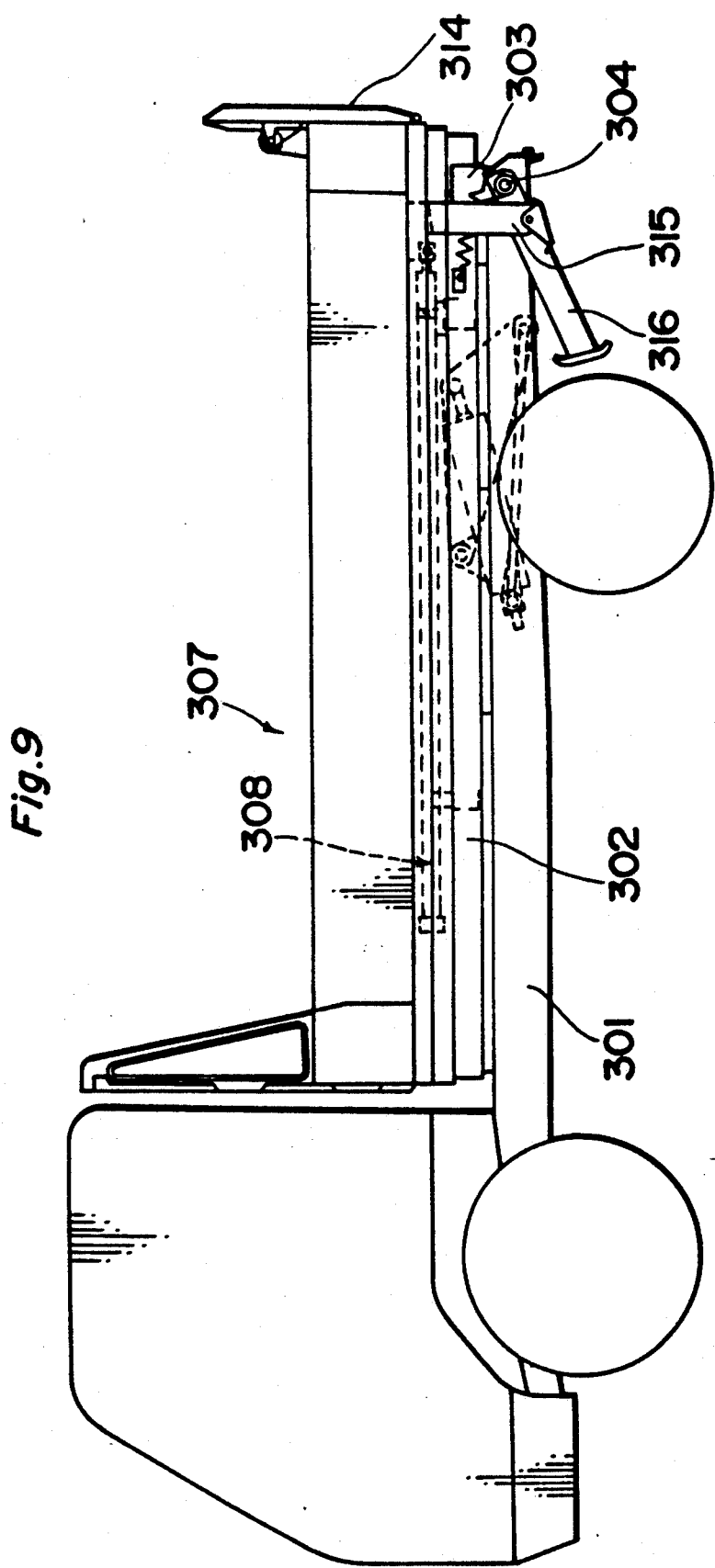
FIG. 9 is a general view of a car carrier truck of a third embodiment according to the present invention.
Figure 12:
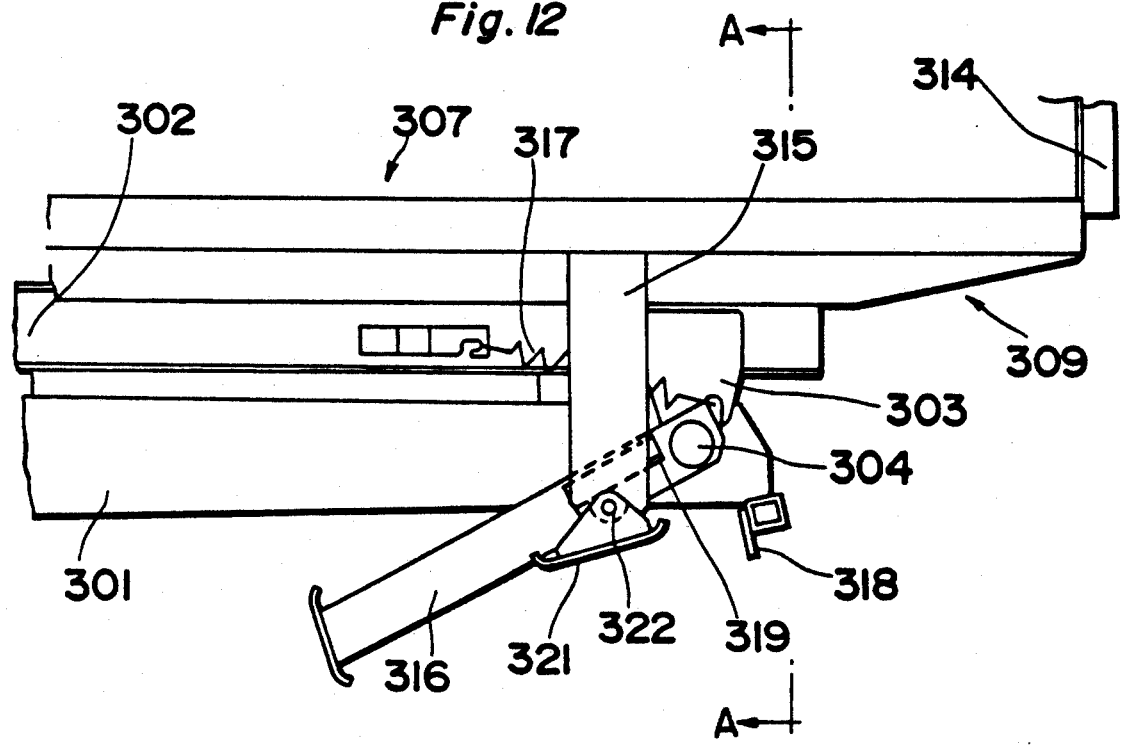
FIG. 12 is an enlarged view of a portion including a support leg device of the third embodiment.

Referring to FIG. 9, a reference numeral 301 designates a chassis on which a dump frame 302 is provided. Hinge brackets 303 are provided at a rear end of the dump frame 302 perpendicularly to the dump frame. By pivotably supporting the hinge brackets 303 on the chassis 301 through a hinge shaft 304 as shown in FIG. 12, the dump frame 302 can be tilted.

Figure 10:
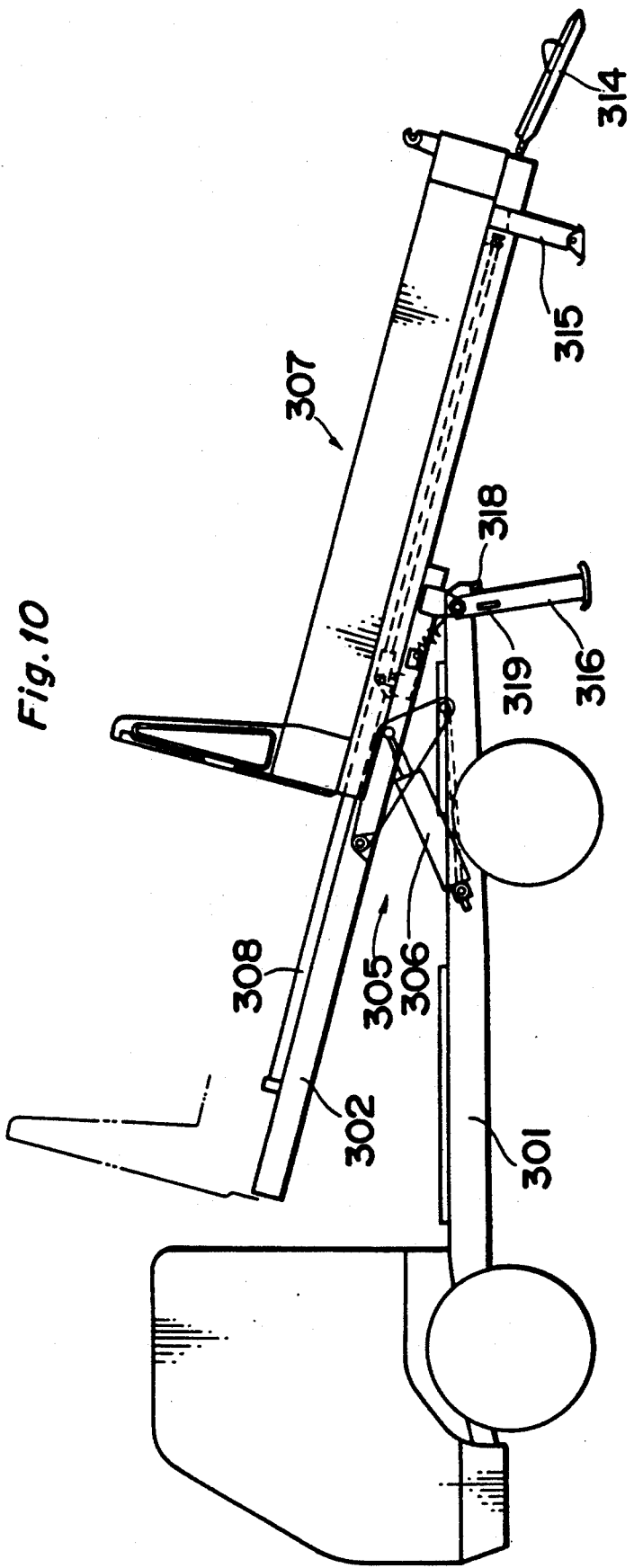
FIG. 10 is an illustration showing a vehicle unloading operation by the truck of the third embodiment.
Figure 11:
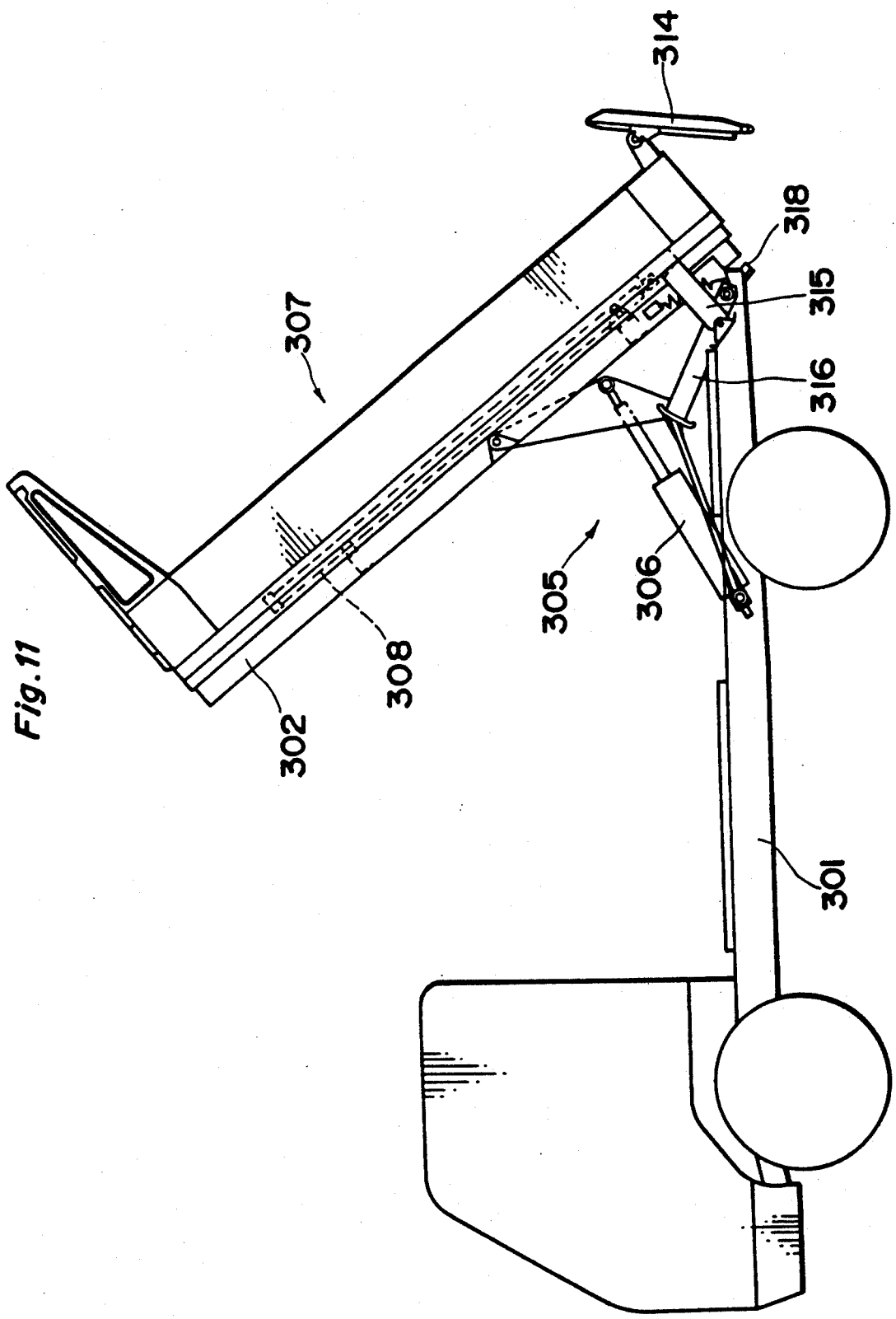
FIG. 11 is an illustration of the truck of the third embodiment in operation when the cargo container is tilted at a maximum angle.

Furthermore, as shown in FIGS. 10 and 11, there is provided a lifting device 305 between the chassis 301 and the dump frame 302. The dump frame 302 is tilted by extending a tilt cylinder 306, which is part of the lifting device 305.

A cargo container 307 for carrying vehicles is mounted on the dump frame 302. A slide cylinder 308 is disposed between the dump frame 302 and the cargo container 307, extending in the longitudinal direction. The cargo container 307 is adapted to move slidingly backward when the slide cylinder 308 extends.

Figure 13:
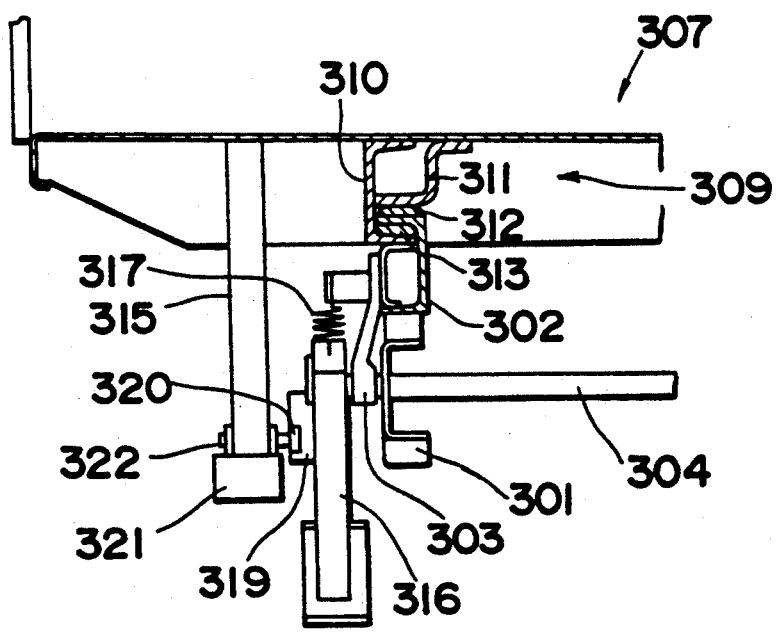
FIG. 13 is a sectional view taken along the line A—A in FIG. 12.

In order to prevent the cargo container 307 from being disengaged from the dump frame 302 at that time, as shown in FIG. 13, wherein a cross section of a main girder 309 provided on the back of the cargo container 307 is shown, the main girder 309 is constituted from a main frame 310 of U-shaped section and a subsidiary frame 311 provided inside of the main frame 310. An upper portion of the dump frame 302 is inserted between the subsidiary frame 311 and a lower portion of the main frame 310. Upper and lower support members 312 and 313 are provided on and under the upper portion of the dump frame 302, respectively. The subsidiary frame 311 is slidably supported by the upper support member 312, and the lower portion of the main frame 310 is in contact with the lower support member 313. In this way, the cargo container 307 is prevented from springing up.

The cargo container 307 is provided with a tailgate 314, and by locking the tailgate at upper and lower portions thereof, the rear of the cargo container 307 is closed.

When either of the upper and lower lockings is released, the tailgate 314 can be rotated to be opened, as shown in FIGS. 10 and 11. Particularly when the upper locking is released, the tailgate 314 serves as a footboard, as shown in FIG. 10.

Furthermore, there are provided cargo container support legs 315 at the rear and lower portion of the cargo container 307 perpendicularly to the cargo container. When the cargo container 307 is slid backward, the support legs 315 contact the ground so as to support the cargo container 307, as shown in FIGS. 10 and 11.

A reference numeral 316 indicates a chassis support leg provided at the rear portion of the chassis 301. The support legs 316 are pivotably attached to the hinge shaft 304 so as to be swung along the longitudinal direction.

As shown in FIGS. 12 and 13, there is provided a spring 317 as a resilient member between the upper portion of the support leg 316 and the dump frame 302. The support leg is at all times urged in a protruding direction of the leg by the spring 317, and brought into contact with a stopper member 318 on the chassis 301 at a predetermined protrusion position and held there.

Reference numeral 319 designates a guide piece which is projectingly mounted on an outer-side surface of the chassis support leg 316. The guide pieces 319 are planar.

In FIG. 13, reference numeral 320 designates a roller as a control member mounted on the inner side of a shaft 322 pivotably mounting a pedestal 321 of the cargo container support leg 315. When the cargo container 307 is slidingly moved forward, the roller 320 comes into contact with the guide piece 319 and turns the guide piece 319 and the chassis support leg 316 forward so as to retract the same.

In the present embodiment, the guide piece is mounted on the chassis support leg 316 and the roller on the cargo container support leg 315. However, a similar function and similar advantages are obtained if the guide piece is mounted on the cargo container support leg and the roller on the chassis support leg.

In addition, the spring can offer a similar function and advantage even when provided between the chassis and the chassis support leg.

The following describes how the car carrier truck with the above construction operates. When the truck is changed from a running state (see FIG. 9) to a vehicle loading or unloading state (see FIG. 10), the tilt cylinder 306 is extended so as to tilt the dump frame 302 at a predetermined angle. At this time, the chassis support legs 316 are supported by the cargo container support legs 315 and held in a retracted state.

After the dump frame 302 is tilted, the slide cylinder 308 is extended so as to slide the cargo container 307 until the cargo container support legs 315 are grounded. In this case, at an initial stage of the sliding movement, since the cargo container support legs 315 also move backward, the rollers 320 become separated from the respective guide pieces 319. Then, the chassis support legs 316 are urged by the springs 317 and turn backward until they contact the stopper member 318, so that the chassis support legs are brought into a protruding state.

After the cargo container support legs 315 are grounded, the upper locking of the tailgate 314 is released so that the tailgate is turned to be used as a footboard.

After the above state (FIG. 10) is reached, the loading and/or unloading of vehicles is carried out. In this case, because the cargo container 307 and chassis 301 are supported by the respective support legs 315 and 316, it is possible to carry out the loading and unloading operation of vehicles in a stable condition.

After completion of the loading or unloading operation of vehicles, the tailgate 314 is closed, the cargo container 307 is slid forward by contracting the slide cylinder 308, the dump frame 302 is lowered, and the cargo container 307 is retracted. In this case, because the rollers 320 come into contact with the guide pieces 319 in a final stage of the sliding movement, the protruding chassis support legs 316 are turned forward against the spring force, and retracted.

On the other hand, in case the truck is used for transportation of soil, sand or the like, the transport operation is made with the cargo container 307 being retracted as shown in FIG. 9. The tilt cylinder 306 is extended at maximum to a dump site, so that the dump frame 302 and the cargo container 307 are tilted at a maximum angle, as shown in FIG. 11. At the same time, the lower locking of the tailgate 314 is released, and thus, soil, sand or the like in the cargo container 307 can be discharged. In this case, the chassis support legs 316 are maintained retracted by the cargo container support legs 315.

Forth Embodiment

FIGS. 14 to 19 show a car carrier truck used also as a dump truck of a fourth embodiment according to the present invention.

Figure 14:
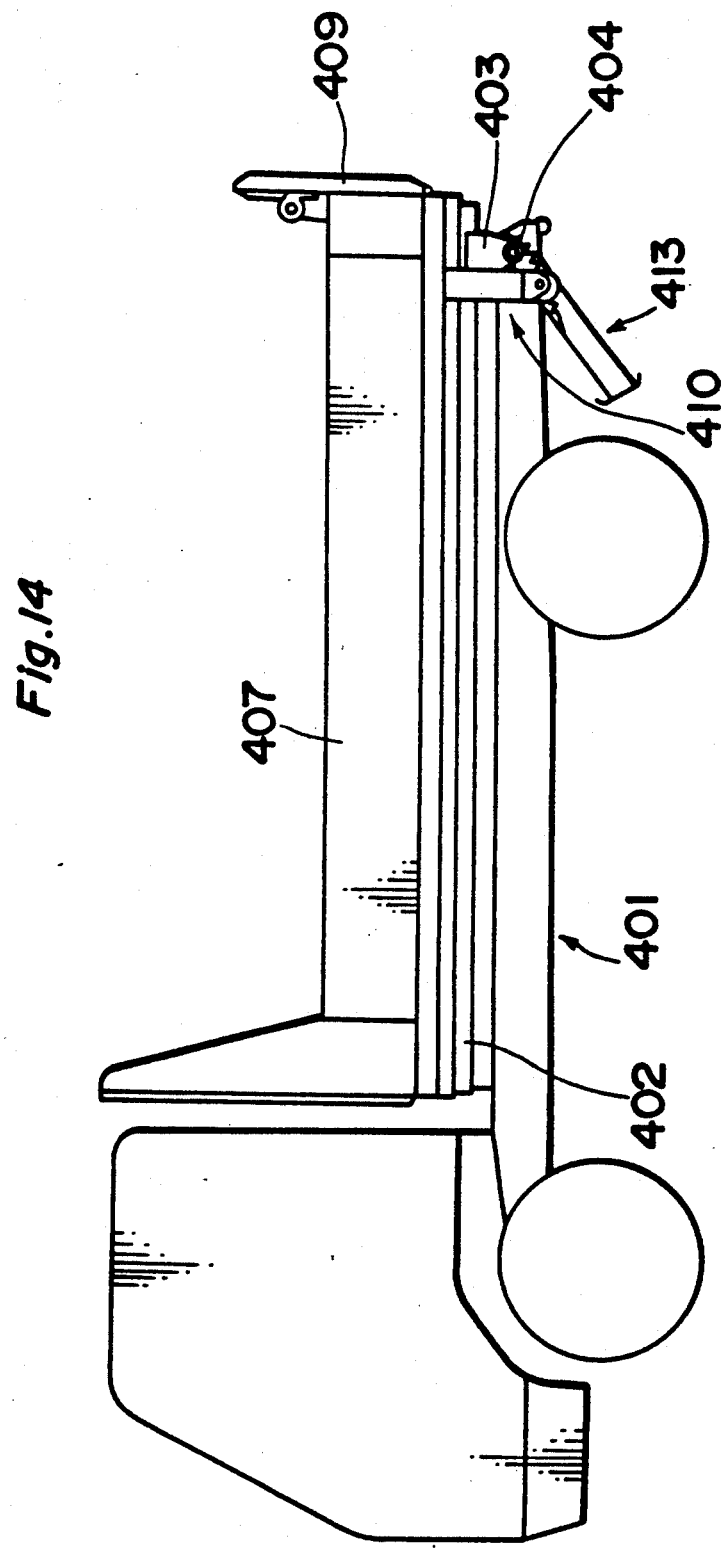
FIG. 14 is a general view of a car carrier truck used also as a dump truck according to a fourth embodiment of the present invention.

In the general view shown in FIG. 14, a reference numeral 401 indicates a chassis, and there is provided a dump frame 402 on the chassis 401.

There is vertically provided a bracket 403 at a rear end of the dump frame 402. The bracket 403 is pivotably supported on the chassis 401 by a hinge shaft 404, whereby the dump frame 402 is adapted to tilt.

Figure 15:
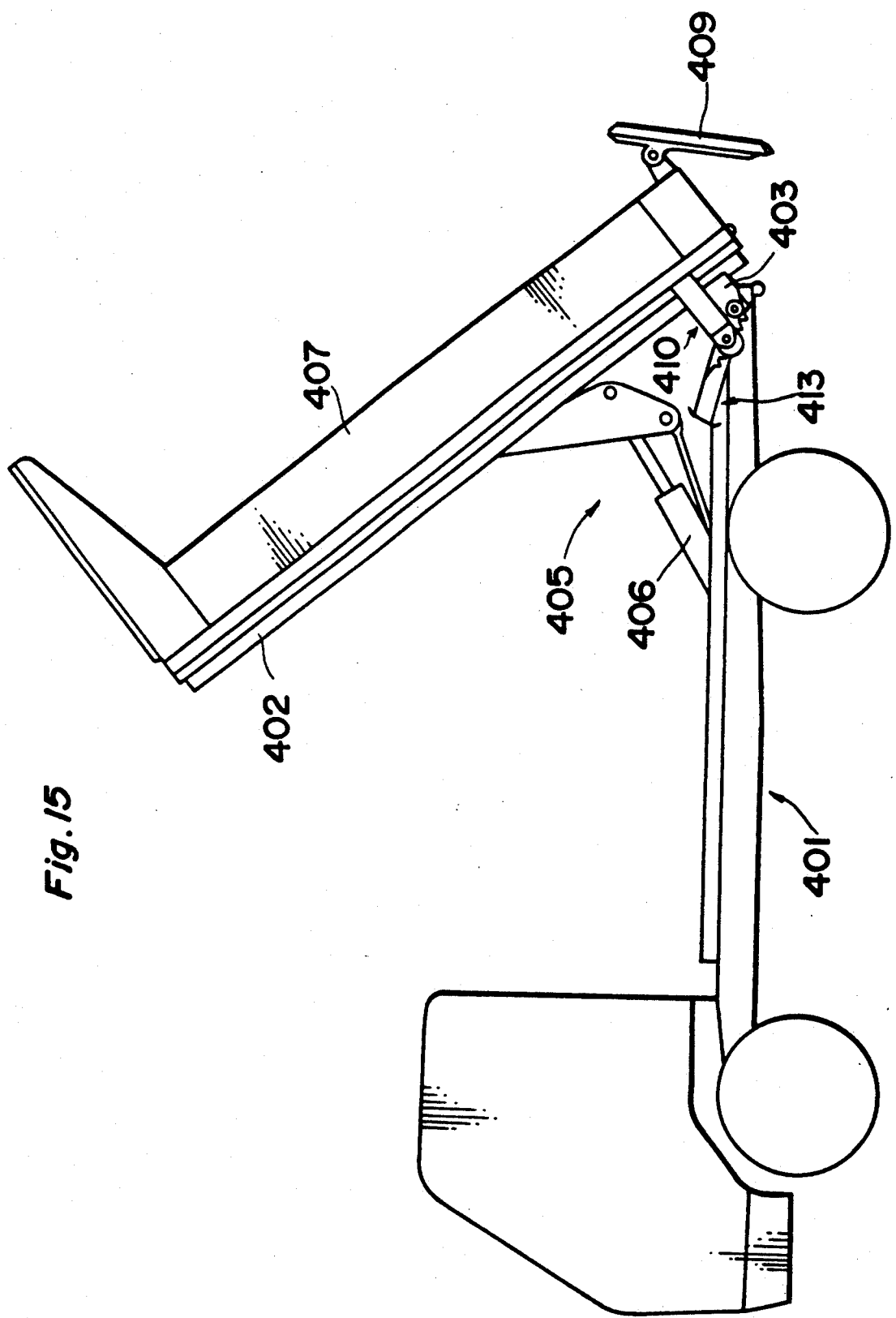
FIG. 15 is an illustration of the truck of FIG. 14 in operation when a dump frame is fully tilted.
Figure 16:
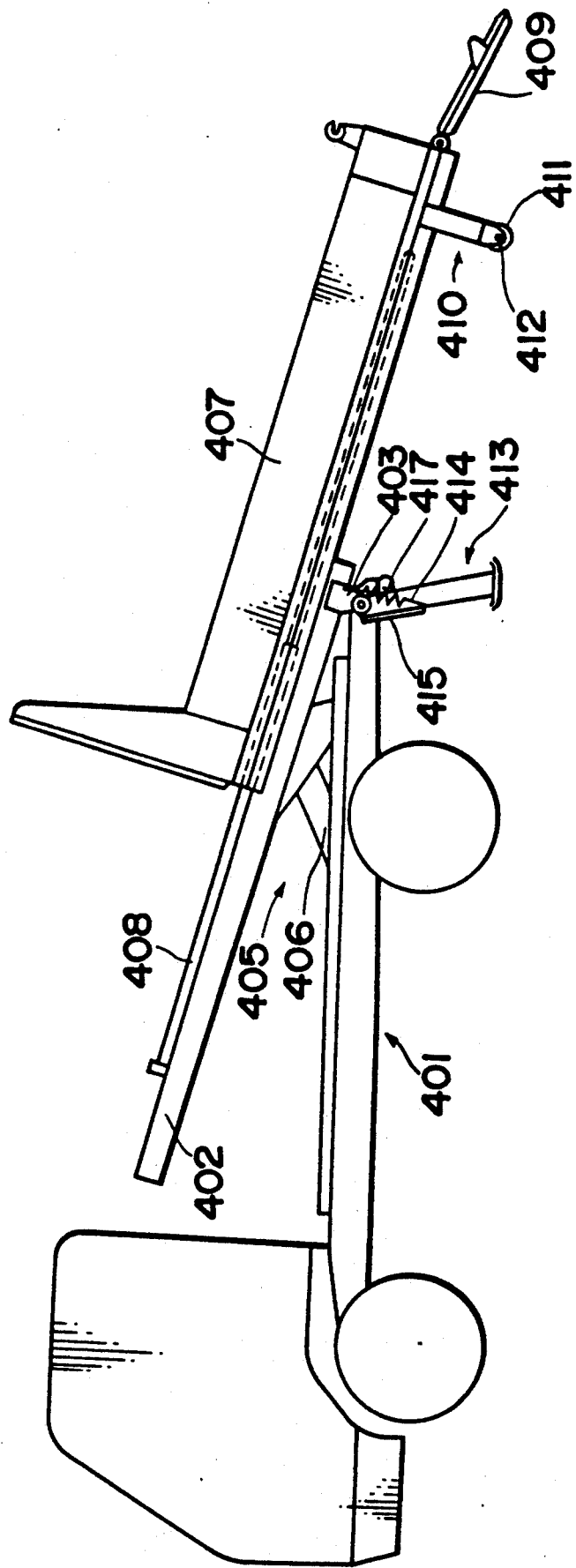
FIG. 16 is an illustration of the truck of the fourth embodiment in operation when loading or unloading of vehicles is carried out.

Furthermore, there is provided a tilting device 405 between the chassis 401 and the dump frame 402, as shown in FIGS. 15 and 16. By expanding a tilt cylinder 406 which is part of the tilting device 405, the dump frame 402 is tilted to its full-tilt position (about 50 to 60°).

A load-carrying platform 407 is mounted on the dump frame 402, and as shown in FIG. 16, a slide cylinder 408 is disposed, extending in a longitudinal direction, between the dump frame 402 and the load-carrying platform 407. The load-carrying platform is moved backward by expanding the cylinder 408.

The load-carrying platform 407 is provided with a tailgate 409, which has its upper and lower portions locked to close the rear of the load-carrying platform 407. When either of the upper and lower lockings is released, the tailgate 409 can be turned and opened. Particularly when the upper locking is released, the tailgate 409 serves as a footboard, as shown in FIG. 16.

A reference numeral 410 is a load-carrying platform support leg 410 vertically provided at a rear lower portion of the load-carrying platform 407. The load-carrying platform support legs 410 have respective rollers 411 pivotably supported by shafts 412 at their lower ends, as shown in FIGS. 16, 17, 18 and 19. The load-carrying platform support legs are adapted to support the load-carrying platform 407 when the rollers 411 are grounded. Moreover, the load-carrying platform support legs 410 are arranged to be located ahead of the hinge shaft 404 when load-carrying platform is at its most forward position (see FIG. 14).

A reference numeral 413 indicates a chassis support leg 413 pivoted on the hinge shaft 404. The support legs 413 are arranged to be rotated between their protruding position (indicated by a two-dot chain line in FIG. 17) and retracted position (indicated by a solid line in FIG. 17). The truck is adapted to support the chassis 401 when the support legs are at the protruding position, and run when the support legs are at the retracted position.

Furthermore, there is provided a spring 414 between the chassis support leg 413 and the hinge bracket 403. The spring 414 urges the chassis support leg 413 toward the protruding position.

A reference numeral 415 indicates a planar guide piece 415 provided on the chassis support leg 413. An engagement member 416 (FIG. 18) projecting from the shaft 412 of the load-carrying platform support leg 410 is engaged with the guide piece 415 when the load-carrying platform 407 moves forward, whereby the chassis support leg 413 is rotated from the protruding position to the retracted position against the spring 414.

A reference numeral 417 designates a stopper member 417 for supporting the chassis support leg 413 at the protruding position. The stopper member 417 is fixed to the rear of the chassis 401 and is also reinforced by a reinforcing shaft 418.

It is to be noted here that although the spring is fastened to the hinge bracket in the present embodiment, the same function and effect are obtained if the spring is fastened to the dump frame.

The truck of the present embodiment has a construction as aforementioned. The following describes the operation of the truck.

First, in the case of loading and/or unloading of vehicles, the tilt cylinder 408 is extended from the state shown in FIG. 14 and the load-carrying platform 406 is tilted up to a predetermined angle (about 15°).

Thereafter, the slide cylinder 408 is extended so that the load-carrying platform 407 is moved backward. Then, as shown in FIG. 16, the load-carrying platform support legs 410 are grounded and the tailgate 409 is opened. The loading or unloading of vehicles is then carried out. The chassis support legs 413, which are at first located in the retracted position indicated by a solid line in FIG. 17, are turned to the protruding position indicated in a two-dot chain line because of disengagement from the engagement member 416 and by force of the spring 414 to then support chassis 401.

After completion of the loading or unloading of vehicles, the tailgate 409 is closed, and the slide cylinder 408 is contracted so that the load-carrying platform 407 is moved forward. Thereafter, the dump frame 402 is lowered by contracting the tilt cylinder 406.

In this case, since the engagement member 416 gets ahead of the hinge shaft 404, the engagement member 416 engages with the guide piece 415 and turns the chassis support leg 413 from its protruding position to its retracted position against the force of the spring 414.

When the truck is used as a dump truck, the load-carrying platform 407 is kept fastened to the dump frame 402 by the slide cylinder 408, and the tilt cylinder 406 is extended from the state shown in FIG. 14, so that the dump frame 402 is fully tipped to discharge cargoes such as soil and sand.

Figure 19:
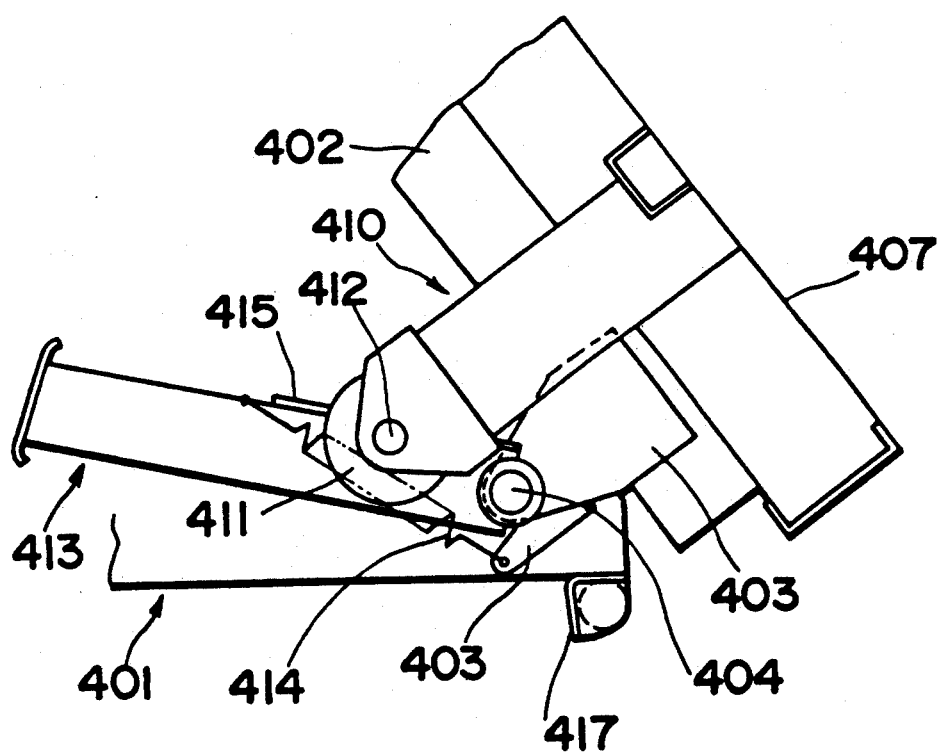
FIG. 19 is an enlarged view similar to FIG. 17 of a full tilting operation.

In this case, the chassis support legs 413 are turned further from the retracted position by the turn of the load-carrying platform support legs 410 as shown in FIG. 19. However, because the hinge brackets 403 are also turned together in the same direction, the springs are hardly expanded and therefore do not fail.

Fifth Embodiment

FIGS. 20 to 31 show a fifth embodiment of the present invention, wherein a reference numeral 501 indicates a chassis and a dump frame 502 is mounted on the chassis 501.

The dump frame 502 is provided at its rear end with hinge brackets 503 perpendicularly to the dump frame. The hinge brackets 503 are supported on the chassis 501 by hinge shafts 504 on which the hinge brackets pivot, whereby the dump frame 502 is made to tilt.

A lifting device 505 is disposed between the chassis 501 and the dump frame 502. The dump frame 502 is made to tilt by extension of a tilt cylinder 506, which is part of the lifting device 505.

Figure 27:
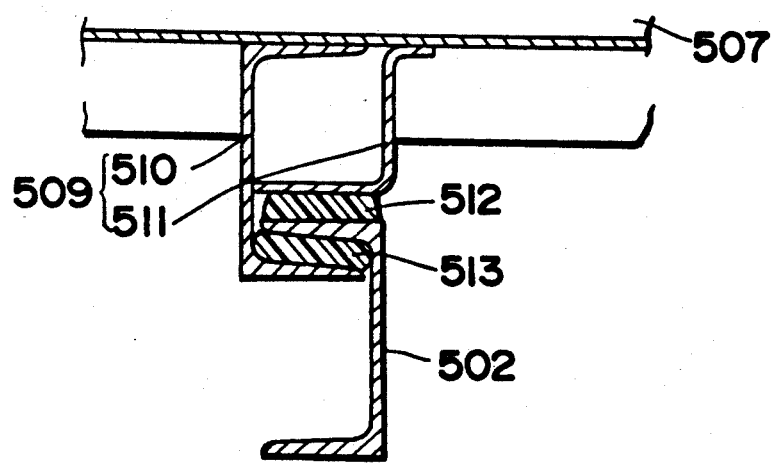
FIG. 27 is a sectional view taken along the line D—D in FIG. 23.

A cargo container 507 for carrying vehicles is mounted on the dump frame 502, and a slide cylinder 508 is disposed between the dump frame 502 and the cargo container 507, extending in a longitudinal direction, as shown in FIG. 27. The cargo container 507 is designed to move slidingly backward by extending the slide cylinder 508.

In order to prevent the cargo container 507 from being disengaged from the dump frame 502, as shown in FIG. 27, a cross sectional view, a main girder 509 is provided on the back of the cargo container 507, the main girder 509 being constituted by a main frame 510 of a U-shaped section and a subsidiary frame 511 provided on an inner side of the main frame 510. An upper portion of the dump frame 502 is inserted between the subsidiary frame 511 and a lower portion of the main frame 510. Upper and lower support members 512 and 513 are provided on and under the upper portion of the dump frame 502, respectively. The subsidiary frame 511 is slidably supported by the upper support member 512, and the lower portion of the main frame 510 is in contact with the lower support member 513. In this way, the cargo container 507 is prevented from springing up.

The cargo container 507 is provided with a tailgate 514 at its rear end. The cargo container 507 is closed at the rear end by locking upper and lower portions of the tailgate.

Figure 21:
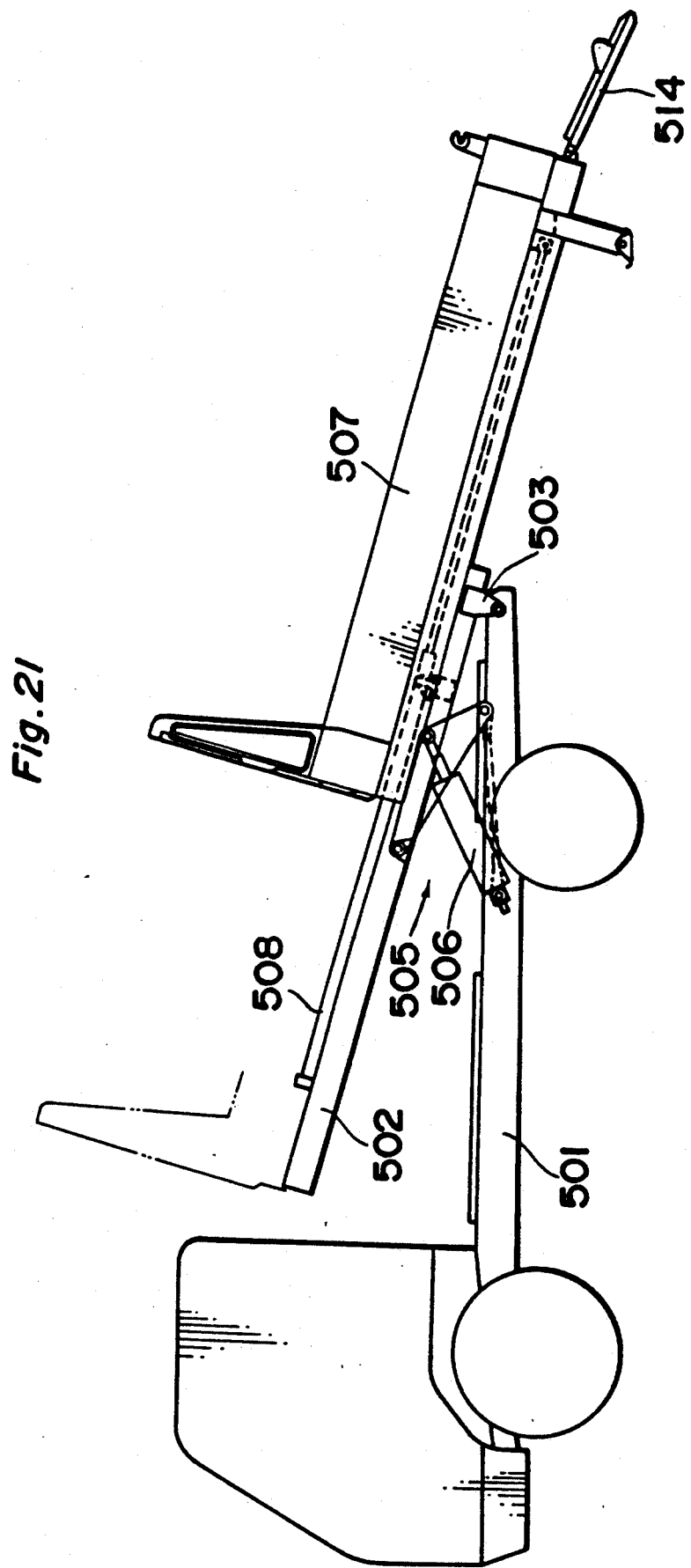
FIGS. 21 and 22 are views showing operational states of the truck of FIG. 20.
Figure 22:
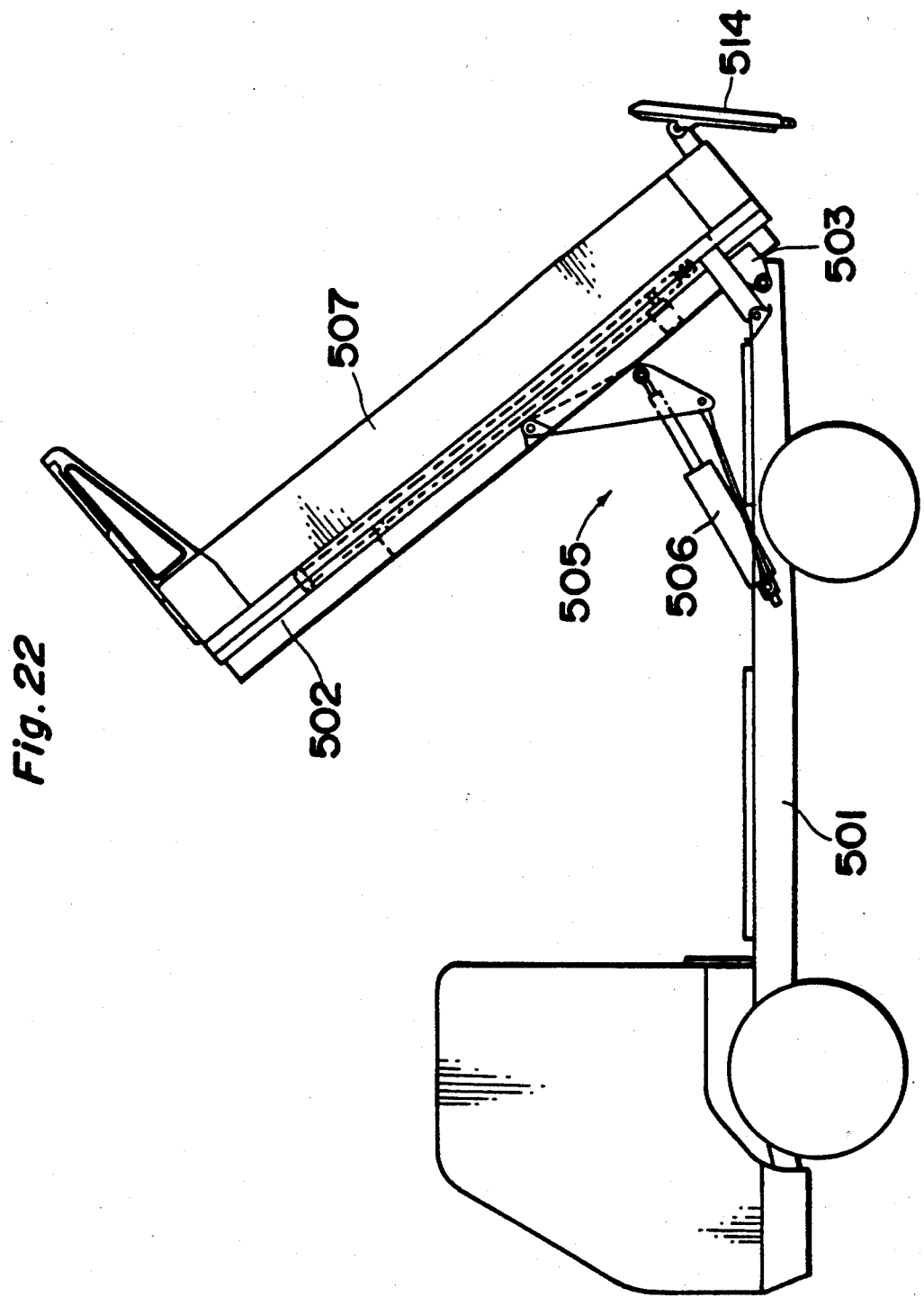

As shown in FIGS. 21 and 22, when either of the upper and lower lockings is released, the tailgate 514 can be turned to be opened. Particularly in the case of releasing the upper locking (FIG. 21), the tailgate 514 serves as a footboard.

Figure 23:
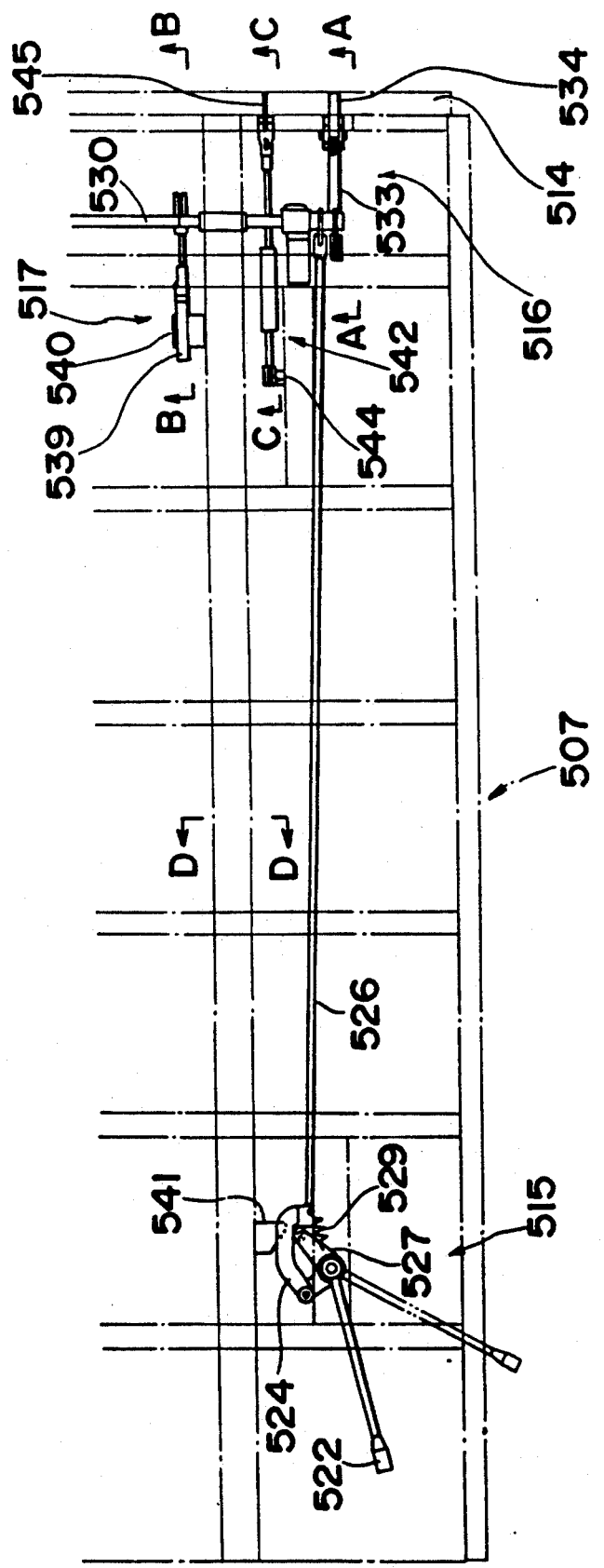
FIG. 23 is a fragmentary enlarged view showing a backward slide prevention means, a tailgate locking means and a control means of the fifth embodiment.

In FIG. 23, reference numeral 515 designates an operation device provided below the cargo container 507, which device is arranged to operate a tailgate locking device 516 and a backward slide prevention device 517 for the cargo container 507, the latter devices being provided below a rear part of the dump frame 507.

The following describes the operation device 515, with reference to FIGS. 23, 28, 29, and 30. A hanging shaft 518 is provided on the back of the cargo container 507, and a first short pipe 519 and a second short pipe 520 are fitted about the shaft 518. A pin 521 pierces the shaft 518 for preventing the short pipes 519 and 520 from falling off.

An operation lever 522 and an arm 523 are fixed to the first short pipe 519. A bell crank 524 is pivotably supported on a free end of the arm 23. A rod 526 extending backward is connected to the bell crank 524 through a spring tube 525.

A control arm 527 is fixed to the second short pipe 520, and a roller 528 is pivotably supported at a free end of the control arm 527.

Figure 30:
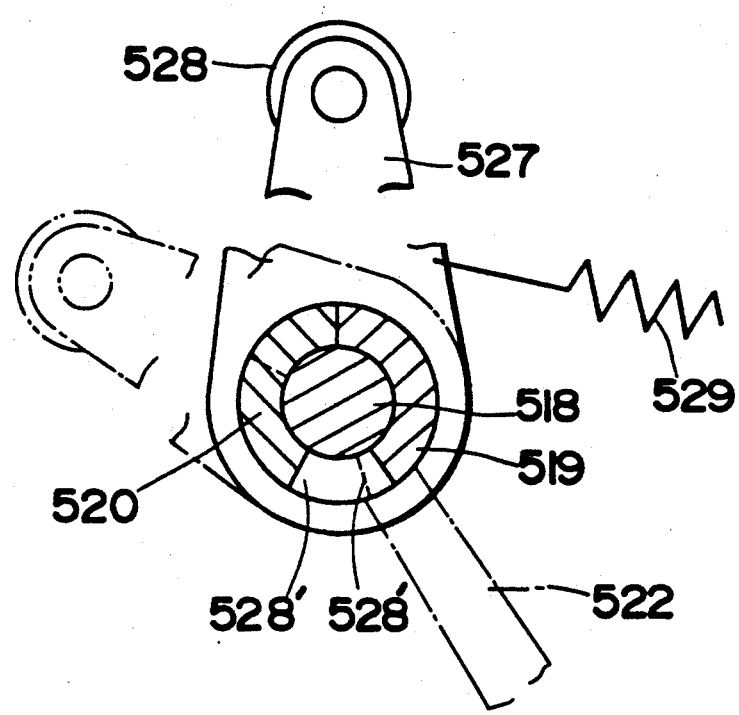
FIG. 30 is a sectional view taken along the line E—E in FIG. 29.

As shown in FIGS. 29 and 30, there are formed respective notches 528', at a lower end of the first short pipe 519 and an upper end of the second short pipe 520. Also, the control arm 527 is at all times forced backward by a spring 529 disposed on the spring tube 525. Thereby, when the control lever 522 is turned counterclockwise as shown in FIG. 23, the control arm 527 is turned counterclockwise, but even when the control arm 527 is turned counterclockwise, the control lever 522 is not turned counterclockwise.

Figure 24:
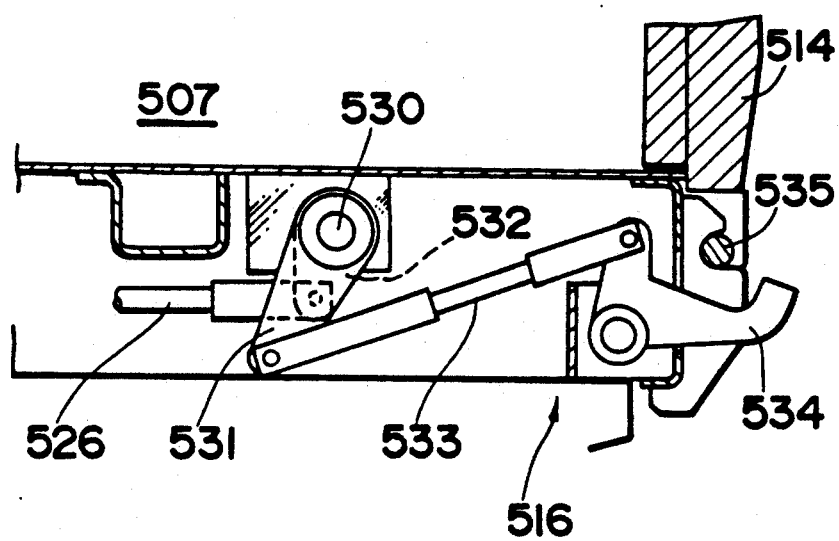
FIG. 24 is a sectional view taken along the line A—A in FIG. 23.

The following describes the tailgate locking device 516, referring to FIG. 24. A connecting shaft 530 extending in a lateral direction is provided on the cargo container 507. Two arms 531 and 532 are fastened to the connecting shaft 530. The rod 526 extending from the operation device 515 is connected to a free end of one arm 532, while a subsidiary rod 533 extending backward is connected with a free end of the other arm 531.

The subsidiary rod 533 is provided with a hook 534 so that when the control lever 522 is in a state as shown by the solid line in FIG. 23, the hook 534 becomes disengaged from a pin 535 of the tailgate 514 as shown in FIG. 24, and when the control lever 522 is turned backward (the state as shown by the two-dot chain line in FIG. 23), the hook becomes engaged with the pin 535 (FIG. 31(b)).

When the hook 534 is disengaged, the operation lever 522 is located inside the cargo container 507, and when the hook 534 is engaged, the operation lever 522 laterally projects outside the cargo container 507. Therefore, whether the hook 534 is engaged or not can be known by looking at the operation lever 522.

Figure 25:
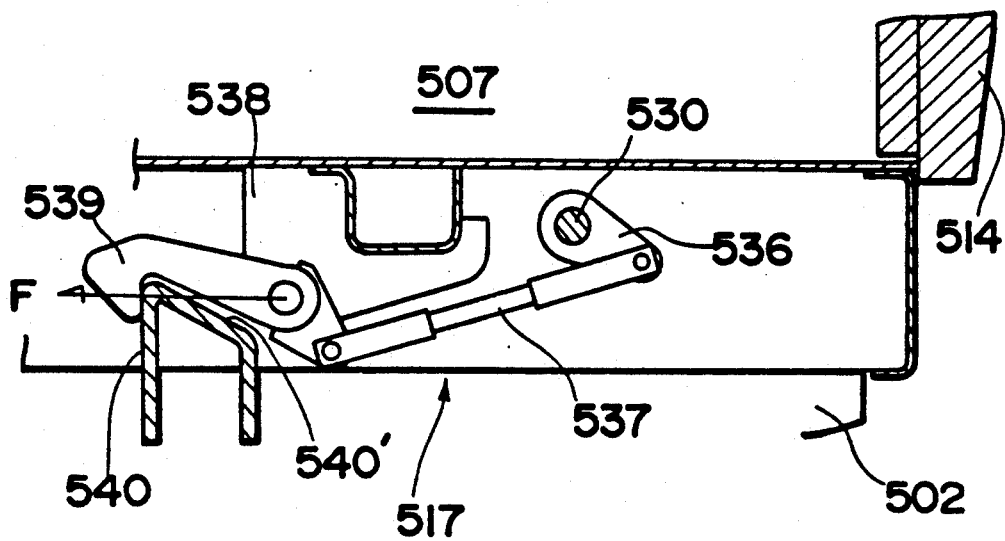
FIG. 25 is a sectional view taken along the line B—B in FIG. 23.

The backward slide prevention device 517 is now described referring to FIG. 25. An arm 536 is fastened on the connecting shaft 530, with its free end being connected with a subsidiary rod 537 extending forward. A hook 539, which is pivotably supported on a bracket 538, is connected to this subsidiary rod 537.

The hook 539 is arranged to become engaged with an engagement member 540 fixed to the dump frame 502 at the foremost slide position of the cargo container 507, and when the operation lever 522 is further turned backward from the position indicated by the solid line in FIG. 23, the engagement is released and the hook 539 is held disengaged by a dead point method of the operation device 515.

Furthermore, when the hook 539 is engaged, a shaft support point of the hook 539 is adapted to be positioned on a line extending in a direction F in which a force acts on the hook 539 so that the subsidiary rod 537, etc., are not subject to an external force.

In FIGS. 23, 28, 29, 30, and 31, a reference numeral 541 designates a control member fixed to the dump frame 502 close to the operation device 515. When the cargo container 507 is slid backward with the operation lever 522 placed in the position indicated by a solid line in FIG. 31(a) (in a state where the backward slide prevention means is released), the control arm 527 comes into contact with the control member 541 and is turned to the position indicated by the two-dot chain line, and when the control arm 527 passes the control member 541, the control arm 527 is caused to return to the solid line position by the spring 529.

In this case, because both short pipes 519 and 520 are provided with the notches 528', the operation lever 522 is held at the position indicated by a solid line.

Furthermore, when the cargo container 507 is slid forward while the control arm 527 is in the position as indicated by a solid line in FIG. 31(a), the control arm 527 comes into contact with the control member 541 and is turned clockwise. The operation lever 522 is also turned to return the hook 539 of the backward slide prevention means 517 to the engagement position.

At that time, the hook 539 returns before it reaches the engagement position with the engagement member 540, but since the hook 539 is guided to the engagement position by a slope 540' of the engagement member 540, it is securely engaged with the engagement member 540.

Figure 26:
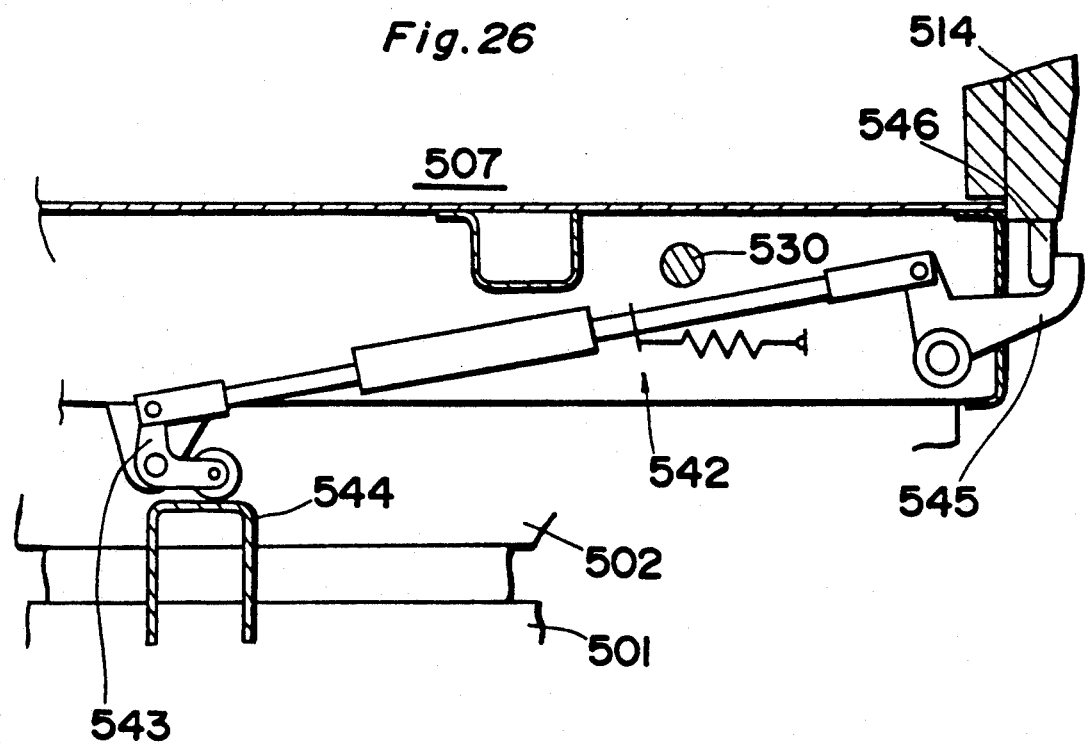
FIG. 26 is a sectional view taken along the line C—C in FIG. 23.

In FIGS. 23 and 26, a reference numeral 542 indicates an automatic opening & closing device for the tailgate 514. The device 542 is provided on the cargo container 507 as shown in FIG. 26. When the cargo container 507 is tilted about 8°, the bell crank 543 is detached from a contact member 544 on the chassis 501 so that a hook 545 can be released from engagement with an engagement piece 546 of the tailgate 514. When the cargo container 507 is retracted, the bell crank 543 is controlled by the contact member 544 so as to engage the hook 545 with the engagement piece 546.

The present invention being constructed as described above, the operation of the truck according to the present invention will be described below.

Figure 20:
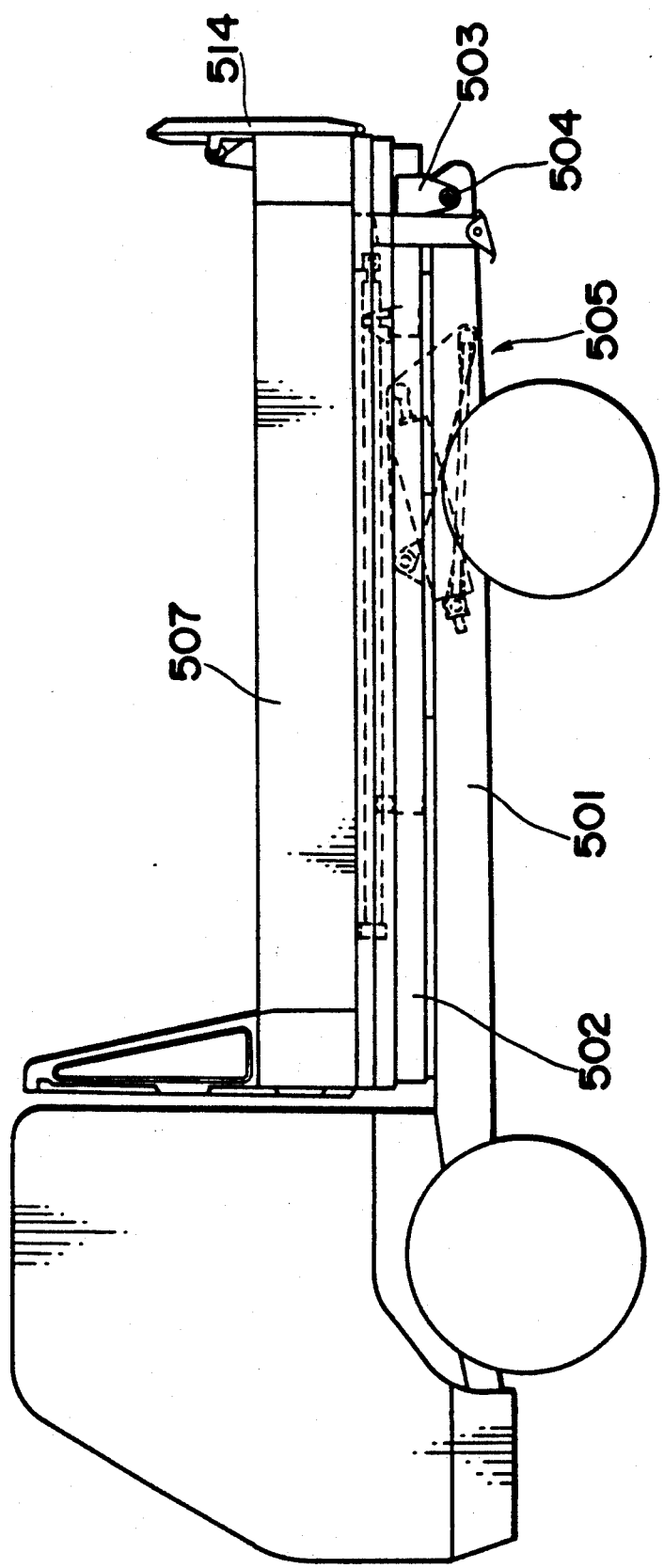
FIG. 20 is a general view of a car carrier truck used also as a dump truck according to a fifth embodiment of the present invention.

In the case of loading or unloading of vehicles, the operation lever 522 is turned backward (see FIG. 31(a)) from the state indicated by a solid line in FIG. 23 while the truck is in the state as shown in FIG. 20. Thereby, the tailgate locking device 516 locks the tailgate 514 (FIG. 31(b)) and the backward slide prevention device 517 is disengaged.

Then, the dump frame 502 is tilted about 14° by the lifting device 505. Thereafter, the cargo container 507 is slid backward by the slide cylinder 508. After completion of the backward sliding movement, the tailgate 514 is turned so as to serve as a footboard for the loading or the unloading of vehicles.

In this case the control arm 527 comes into contact with the control member 541 and is turned to a position indicated by a one-dot chain line in FIG. 31(a). After that, the control arm 527 is returned to the solid line position by the spring 529. During that period the operation lever 522 is not moved because of the presence of the notches 528'.

After completion of loading and/or unloading of vehicles, the tailgate 514 is retracted and then, by contracting the slide cylinder 508, the cargo container 507 is slid forward.

Figure 28:
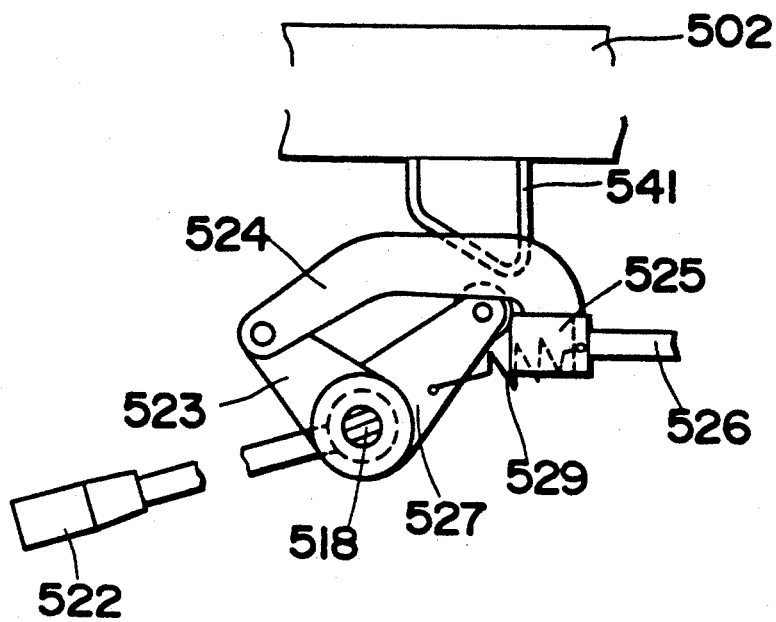
FIG. 28 is an enlarged top view of an operation means of the fifth embodiment.

Immediately before the cargo container 507 reaches the foremost position, the control arm 527 comes into contact with the control member 541 and is turned clockwise to the position shown in FIG. 28.

The first short pipe 519 is also turned clockwise by the turn of the control arm 527, and the hook 534 of the tailgate locking device 516 is disengaged as shown in FIG. 24, while the hook 539 of the backward slide prevention device 517 is returned to the engaged state as shown in FIG. 25.

After the cargo container 507 reaches the foremost position, the tilt cylinder 506 is contracted to retract the cargo container 507.

On the other hand, in the case of transporting earth, sand, or the like, if the dump frame 502 is tilted by the lifting device 505 without operating the operation lever 522, the cargo container 507 can be tilted in a state that it is securely fixed to the dump frame 502 by the backward slid prevention device 517. Furthermore, the tailgate locking device is released from locking, and when the inclination reaches 8°, the automatic opening & closing device 542 is also released from engagement, and thereby the tailgate is opened and earth, sand, etc. can be discharged.

Sixth Embodiment

FIGS. 32 to 36 show an embodiment of a dump truck having a piping protection device according to the present invention.

FIG. 32 is a general view of a car carrier truck also used as a dump truck, wherein reference numeral 601 designates a chassis having a pair of chassis frames 602 on opposite sides of the chassis and a cargo container 603 tiltably mounted on the chassis 601.

As shown in FIG. 35, a long bearer 604 is mounted on one of the pair of chassis frames 602, while two bearers, a front bearer 606 and a rear bearer 607, having a clearance 605 inbetween, is provided on the other of the chassis frames. A reference numeral 608 designates a dump frame constituting part of the cargo container 603. The dump frame 608 is pivoted on a rear portion of the chassis 601 so as to be tiltable. Also, the dump frame 608 is adapted to come into contact with upper surfaces of the bearers 604, 606 and 607 when lowered.

In FIGS. 32 to 34, a reference numeral 609 designates a cargo container body constituting part of the cargo container 603. The cargo container body 609 is adapted to tilt integrally with the dump frame 608 and also slide backward on the dump frame 608 by a slide cylinder 610 mounted on the dump frame 608.

When the cargo container body 609 is slid backward, support legs 611 provided in the rear portion of the cargo container body 609 are grounded. If the tailgate, serving as a footboard, is opened, the truck can be loaded with construction vehicles of a crawler type for example, shovel dozers.

A reference numeral 613 designates a tilting device 613 for tilting the cargo container 603. The tilting device 613 is comprises a cylinder 614 and a plurality of frames 615 and is arranged between the pair of chassis frames 602 (see FIG. 35).

In FIG. 35, a reference numeral 616 designates a drive device 616 for actuating the tilting device 613 and the slide cylinder 610. The drive device 616 is constituted by a pump 617 driven by a travel engine (not shown), a tank 618 for accommodating oil, and a valve 619 for changing over oil paths. The pump 617 is disposed between the chassis frames 602, and the tank 618 and the valve 619 are disposed outside of the chassis frames 602.

Piping 620 between the pump 617 and the tank 618 and piping 621 between the pump 617 and the valve 619 are disposed below the chassis frame 602 and connected. On the other hand, piping 622 between the valve 619 and the cylinder 614 of the tilting device 613 and piping 623 between the slide cylinder 610 and the valve 619 are passed through the clearance 605 between the front and rear bearers 606 and 607 in parallel and connected, as shown in FIGS. 35 and 36, because the pipings 622 and 623 have to be connected onto an upper surface of the valve 619. Here, a reference numeral 624 designates piping for communicating the oil tank 618 with the valve 619.

In FIG. 36, which shows a sectional view taken along line A—A in FIG. 35, a reference numeral 625 designates a stopper member for maintaining a clearance between the chassis frame 602 and the dump frame 608. The stopper member 625 is a little smaller in height than the bearer 607 and larger in diameter than the pipings 622 and 623. Also, the stopper member 625 is provided vertically on the back of the dump frame 608 so as to confront the upper surface of the chassis frame 602 between the front and rear bearers 606 and 607.

It is to be noted here that although description is made of a dump truck wherein the cargo container body is slidable in the present embodiment, even in the case of a dump truck wherein the cargo container is constructed from only a cargo container body, and has no dump frame, a similar effect can be obtained, with the stopper member being provided on the cargo container body.

Moreover, part of the drive device arranged outside the chassis frame is not limited to the present embodiment, but any part of the drive device may be arranged outside the chassis frame to offer a similar effect.

Furthermore, the installation position of the stopper member is not limited to the cargo container side. A similar effect can be obtained if the stopper member is installed on the chassis side.

Next, operation of the truck is described. First, in the case of dumping loaded earth and sand, the valve 619 is switched so that pressure oil in the pump 617 is supplied to the cylinder 614 through the piping 621, the valve 619, and the piping 622, whereby the tilting device 613 is actuated to cause the cargo container 603 to be fully tilted (about 50° to 60°), as shown in FIG. 33. After completion of dumping, the cargo container 603 is lowered by its own weight, etc. and stopped upon contact of the dump frame 608 with the bearers 604, 606 and 607.

On the other hand, in the case of loading construction vehicles, the valve 619 is changed over so that the cargo container 603 is tilted by a predetermined angle (about 15°). Then, the valve 619 is again changed over so that the slide cylinder 610 is extended to caused the cargo container body 609 to slidingly move backward as shown in FIG. 34. In this state, construction vehicles are loaded. After completion of a loading operation, an operation is carried out in the reverse order of the above operation so that the dump frame 608 is lowered until the dump frame 608 comes into contact with the bearers 604, 606 and 607, and stops.

Meanwhile, when the operations are repeated for a long time, there are instances where the bearers 606 and 607 are deformed, and may decrease in height. In such a case, a lower end of the stopper member 625 contacts the upper surface of the chassis to restrict further drop of the cargo container 603 and thereby prevent pipings 622 and 623 from being damaged.

Seventh Embodiment

The present embodiment relates to a rolling prevention device for a cargo container of a car carrier truck according to the present invention. FIG. 37 shows a car carrier truck implementing the present invention. In FIG. 37, a reference numeral 701 indicates a pair of dump frames provided on a chassis 702, and the dump frames 701 are adapted to be tilted by a tilting device 703 provided between the dump frames 701 and the chassis 702.

A load-carrying platform 704 for carrying vehicles such as backhoes and shovel dozers is mounted on the dump frames 701 in such a manner that the load-carrying platform 704 can be longitudinally moved. The load-carrying platform 704 is longitudinally moved by a cylinder 705, which is a sliding device provided between the dump frames and the load-carrying platform 704. Furthermore, the load-carrying platform 704 is provided with a tailgate 706 which serves also as a footboard, and is also provided with support legs 707 at its lower rear portion.

As shown in FIGS. 41 and 42, the dump frame 701 is made of beams of a U-shaped section having upper and lower horizontal portions 708 and 709 and a vertical portion 710. As shown in FIG. 40, a plurality of fixed pads 711 are fastened to the upper horizontal portion 708 of the dump frame 701 with bolts 712 at intervals.

The fixed pads 711 are formed of a synthetic resin having a small coefficient of friction. The fixed pads 711 consist of front fixed pads 713 and rear fixed pads 714. The rear fixed pads 714 support the load-carrying platform 704 when the load-carrying platform 704 has moved to a rearmost position (a position indicated by a two-dot line in FIGS. 39 and 40). The rear fixed pads 714 are shaped so as to project laterally outward from the upper horizontal portion 708 of the dump frame 701 (see FIG. 42). On the other hand, the front fixed pads 713, which are located in front of the rear fixed pads 714, are shaped so as not to project laterally outward from the upper horizontal portion 708 of the dump frame 708 (see FIG. 41). Because of this shape, when the load-carrying platform 704 is moved forward, the front fixed pads 713 do not hit the front ends of the main girders 715 provided on the back of the load-carrying platform 704 opposite to the dump frames 701.

The main girder 715 consists of, as shown in FIG. 41, a main girder body 716 of a U-shaped section and subsidiary girder 717 provided inside of the main girder body 716.

A moving pad 719 made of a synthetic resin having a small coefficient of friction is fixed to a front upper surface of the lower horizontal portion 718 of the main girder body 716. The moving pad 719 is adapted to slidingly contact the vertical portion 710 of the dump frame 701 to prevent a front portion of the load-carrying platform 704 from rolling. An upper surface of the moving pad 719 is adapted to contact with a lower surface of the upper horizontal portion 708 of the dump frame 701 to prevent the load-carrying platform 704 from rising. A horizontal portion 720 of the subsidiary girder 717 is adapted to slide on the fixed pads 713 and support the load-carrying platform 704.

Furthermore, the rear fixed pads 714 are adapted to slidingly contact with a side surface of the main girder body 716, as shown in FIG. 42, so as to prevent the load-carrying platform 704 from rolling.

It is to be noted that although the truck of the present embodiment has been described as a car carrier truck, if the load-carrying platform is fastened onto the dump frame by a sliding device or any other fixing means, the truck can also be used as a dump truck.

Next, operation of the truck will be described. The tilting device 703 is operated when in a state as shown in FIG. 37, so that the dump frames 701 are tilted by a predetermined angle (about 15°). Then, the cylinder 705 is extended so that the load-carrying platform 704 is moved to the rearmost position and the support legs 707 are grounded. After the grounding of the support legs 707, the tailgate 706 serving also as a footboard is turned as shown in FIG. 38. In the state shown in FIG. 38, vehicles are driven onto the load-carrying platform 704 so that they are loaded on the load-carrying platform 704. After loading of the vehicles, the tailgate 706 is closed from the state shown in FIG. 38 and the load-carrying platform 704 is moved forward by the cylinder 705.

After the load-carrying platform reaches the foremost position, the dump frames 701 are lowered and returned to the state sown in FIG. 37. The truck is driven to the destination in that state. In the case of unloading vehicles, a similar operation is carried out.

Meanwhile, there are instances where the load-carrying platform 704 is going to roll during the operation. But, because the lateral movement of the load-carrying platform 704 is restricted by the moving pads 719 and the rear fixed pads 714, rolling of the load-carrying platform 704 can be prevented at all times.

Eighth Embodiment

FIGS. 43 to 49 show a car carrier truck used also as a dump truck according to an eighth embodiment of the present invention.

FIG. 43 is a general view of the truck of the present embodiment. A reference numeral 801 designates a chassis. A dump frame 802 is mounted on the chassis 801, and the dump frame 802 is tiltably supported through a hinge shaft 803 fastened on the chassis 801 and a hinge bracket 804 fastened on the dump frame 802.

There is provided a tilting device 806 having a tilt cylinder 805 between the chassis 801 and the dump frame 802. The dump frame 802 is caused to tilt by the tilting device 806.

A load-carrying platform 807 is provided on the dump frame 802 in such a manner that the load-carrying platform 807 can be longitudinally moved. A sliding device 809 having a slide cylinder 808 provided between the dump frame 802 and the load-carrying platform 807 is adapted to make the load-carrying platform 807 slide longitudinally.

The load-carrying platform 807 is provided at its rear with a tailgate 810 serving also as a footboard. The load-carrying platform 807 is also provided with load-carrying platform support legs 811 at its rear.

A reference numeral 812 designates a locking device for locking the load-carrying platform 807 onto the dump frame 802 when the truck is used as a dump truck. The locking device 812 includes, as shown in FIGS. 46 and 47, an engagement piece 813 fastened on the dump frame 802, a hook 814 pivotably supported on the load-carrying platform 807 so as to engage with the engagement piece 813, and an operation lever 815 rotatably provided on the load-carrying platform 807. The operation lever 815 is connected to the hook 814 through arms 816, rods 817 and a shaft 818 supported on the load-carrying platform 807 so that when the operation lever 815 is turned forward relative to the load-carrying platform 807, the hook 814 becomes engaged with the engagement piece 813 to lock the load-carrying platform 807 onto the dump frame 802, and when the operation lever 815 is turned backward, the locking is released.

The following describes various detectors, referring to FIGS. 46 and 47. A reference numeral 819 designates a first detector for detecting a locking state of the locking device 812. The first detector 819 is mounted on the engagement piece 813 through a bracket 820 and is adapted to be turned "on" at the locking state and "off" at the unlocking state by means of a regulating plate 821 projecting from the hook 814.

Reference numerals 822 and 823 are second and third detectors for detecting a tilting angle of the dump frame 802. The second and third detectors are mounted on a mounting member 824 fixed to the hinge shaft 803 so as to detect the tilting angle by contacting the dump frame 802. Particularly, the second detector 822 is adapted to be turned "on" when the dump frame tilts above a lower limit angle (about 8°) wherein the load-carrying platform 807 is slidable, and the third detector 823 is adapted to become "off" when an upper limit angle (about 20°) is exceeded.

A reference numeral 825 designates a fourth detector mounted on the dump frame 802 for detecting a tilting state of the dump frame by contacting a bracket 825 provided on the side of the chassis 801. The fourth detector 825 is adapted to become "off" only when the dump frame 802 is not tilted (at 0°).

The following describes a hydraulic circuit, referring to FIG. 48. Hydraulic oil is supplied from an oil pump 827 to a tilt cylinder 805 and a slide cylinder 808. The slide cylinder 808 is extended by the operation of a first change-over valve 828 and the tilt cylinder 805 is contracted by the operation of a second change-over valve 829.

The first change-over valve 828 is switched by solenoids SOL A1 and SOL B1 so that when the solenoid SOL A1 is energized, the slide cylinder 808 is extended, while the solenoid SOL B1 is energized, it is contracted.

The second change-over valve 829 is switched by solenoids SOL A2 and SOL B2 so that the tilt cylinder 805 is extended when the solenoid SOL A2 is energized, and contracted when the solenoid SOL B2 is energized.

Next, an electric circuit will be described with reference to FIG. 49. A main switch 831 and a selection switch 832 are provided on a main circuit 830.

The main switch 831 is provided in a cab 833 and can also be used as an engine switch.

The selection switch 832 is also provided in the cab 833. Either a dump operation circuit 834 or a slide operation circuit 835 can be selected by the selection switch.

The dump operation circuit 834 has the first detector 819 and a tilt switch 837, which is a switch device 836 installed within the cab 833 for the dump operation. The tilt switch 837 is connected to the solenoid SOL A2, thus constituting a lifting circuit 838. On the other hand, the tilt switch 837 is also connected to the solenoid SOL B2 through the fourth detector 825, thus constituting a lowering circuit 839.

The slide operation circuit 835 has a switch device 840 provided on the side of the chassis 801 for the slide operation. A tilt switch 841, which is part of the switch device 840, is connected to the lifting circuit 838 through the third detector 823, thus constituting a subsidiary lifting circuit 842.

Also, a subsidiary lowering circuit 843, wherein the first detector 819 and the second detector 822 are connected in parallel is connected to the lowering circuit 839.

The switch device 840 has another slide switch 844. An extending circuit 845 is connected between the slide switch 844 and the solenoid SOL A1 and a contracting circuit 846 is connected between the slide switch 844 and the solenoid SOL B1.

Furthermore, the second detector 822 is provided, and a warning circuit 848 with a buzzer 847 branches, upstream of the slide switch 844.

It is to be noted here that although the locking device is arranged to be manually operated in the present embodiment, it is also possible to adapt the locking device so that when the load-carrying platform reaches the foremost position, the control member on the dump frame is contacted so that an automatic locking is effected.

The present embodiment being constituted as described above, the operation thereof will be described below.

First, when the truck is used as a dump truck, the operation lever 815 of the locking device 812 is turned forward as indicated by a one-dot chain line in FIG. 47 so as to lock the load-carrying platform 807 onto the dump frame 802.

The above operation may be performed after use of the truck as a car carrier truck.

Thereafter, after the main switch 831 is turned on in the cab 833, the selection switch 832 is turned to the dump operation circuit 834 side, and the tilt switch 837 is turned to the lifting circuit 838 side.

Because the first detector 819 is "on", the solenoid SOL A2 is energized, whereby the second change-over valve 829 is changed over so that the tilt cylinder 805 is extended and the load-carrying platform 807 is tilted integrally with the dump frame 802.

In this case, when the locking device 812 is not in the locking state, the solenoid SOL A2 is not energized because of the "off" state of the first detector 819, whereby the load-carrying platform 807 is prohibited from tilting.

In the case of lowering the load-carrying platform 807, when the tilt switch 836 is switched to the lowering circuit 839 side, the solenoid SOL B2 is energized, whereby the tilt cylinder 805 is contracted to lower the load-carrying platform 807. When the load-carrying platform 807 has been retracted, the fourth detector is turned off and the solenoid SOL B2 is deenergized.

Next, when the truck is used as a car carrier truck, first the selection switch 832 is operated in the cab to be switched to the slide operation circuit 835 side. Then, the operation lever 815 of the locking device 812 is turned backward as indicated by a solid line in FIG. 47 on the outside of the cab so as to release the locking device 812 from the locking operation.

Thereafter, the tilt switch 841 of the slide operation switch device 840 is turned to the subsidiary lifting circuit 842 side.

Because the third detector 823 on the subsidiary lifting circuit 842 is "on", the solenoid SOL A2 is energized to change over the second change-over valve 829 whereby the tilt cylinder 805 is extended so as to tilt the load-carrying platform 807.

The operator turns the tilt switch 841 off to stop the load-carrying platform 807 from tilting when the operator presumes by an eye-measurement that the load-carrying platform has tilted almost up to the upper limit angle (about 20°).

In this case, even if the tilt switch 841 is left in an "on" state due to a wrong eye measurement by the operator, when the dump frame 802 reaches the upper limit angle, the third detector 823 is turned off and the solenoid SOL A2 is deenergized, and thereby the tilting of the load-carrying platform 807 is automatically stopped.

After the tilting is stopped, the slide switch 844 is switched to the extending circuit 845 side.

By switching to the extending circuit 845, the solenoid SOL A1 is energized so as to change over the first change-over valve 828, whereby the slide cylinder 808 is extended so as to move the load-carrying platform 807 backward on the dump frame 802.

It is to be noted that the above operations relate to the case where the tilting angle is above the predetermined lower limit angle (about 8°). In the case that the tilting angle is below the lower limit angle, because the second detector is "off", the solenoid SOL A1 is not energized and the backward movement of the load-carrying platform 807 is restricted.

By this arrangement, a state wherein the support legs 811 do not contact the ground when the load-carrying platform 807 is at its rearmost position can be avoided.

After the load-carrying platform 807 is moved to the rearmost position, the tailgate 810 is opened as shown in FIG. 44 so that vehicles can be loaded.

It is to be noted here that when the load-carrying platform 807 is tilted over the lower limit angle, the warning circuit is also energized to sound the buzzer 847 to notify the surroundings that loading or unloading of vehicles is going to start and call their attention.

After completion of the loading or unloading operation, the tailgate 810 is closed from the state shown in FIG. 44. Then, the slide switch 844 is switched to the contracting circuit 846 side to energize the solenoid SOL B1, whereby the first change-over valve 828 is switched so that the slide cylinder 808 is contracted to move the load-carrying platform 807 forward.

After the load-carrying platform 807 has moved to the foremost position (a position indicated by a two-dot line in FIG. 44), the operation lever 815 of the locking device 812 is turned forward relative to the load-carrying platform 807 so that the load-carrying platform 807 is locked onto the dump frame 802. The first detector 819 is turned on.

In this state, if the tilt switch 841 is switched to the subsidiary circuit 843 side, the solenoid valve SOL B2 is energized, whereby the tilt cylinder 805 is contracted so as to lower the load-carrying platform 807 till the state shown in FIG. 43 is reached.

In this case, when the tilting angle of the load-carrying platform 807 reaches below the lower limit angle, the second detector 822 is turned "off", but because the first detector 819 is "on", the energization of the solenoid SOL B2 can be maintained by changing over the selection switch and the tilt switch.

INDUSTRIAL UTILITY

According to the present invention, in a truck having a dumping function and a vehicle carrying function, when the truck is used as a dump truck, the load-carrying platform is securely locked to the dump frame, and this locking is associated with unlocking of the tailgate, whereby accidents such as turnover of the truck are prevented. On the other hand, when the truck is used as a car carrier truck, rolling of the load-carrying platform during the loading or unloading of vehicles is prevented. Moreover, the load-carrying platform is locked so as not to be fully tilted, and the sliding operation of the load-carrying platform is regulated in accordance with the tilting angle of the load-carrying platform. The truck of the present invention is provided with such a safety mechanism and therefore offers a very high safety.

Furthermore, according to the present invention, since the piping and chassis support legs are prevented from being damaged, the truck can be used safely and economically for a long period.

Moreover, according to the present invention, the change-over between the tilting operation and the slide operation can be automatically made by a switch provided in the cab, and the truck can be used with a high operation efficiency.

We claim:
1. A car carrier truck, comprising:
    a truck body having a chassis;
    a dump frame pivotably disposed on said chassis, said dump frame comprising longitudinally extending beams having top and bottom surfaces;
    a tilting device connected between said chassis and said dump frame;
    a load carrying platform slidably mounted on said dump frame, said load carrying platform including longitudinally extending main girders having upper, lower and side surfaces and said main girders being slidably engaged with said beams of said dump frame;
    a slide device connected between said dump frame and said load carrying platform for sliding said load carrying platform on said dump frame;
    moving pads slidable on said beams of said dump frame fixed to said main girders at longitudinally forward positions on said main girders, said moving pads slidably engaging said beams of said dump frame; and
    a plurality of fixed pads longitudinally aligned on and fixed to said top surfaces of said beams of said dump frame at intervals along said beams, said main girders being slidably disposed on said fixed pads, and one of said fixed pads at a longitudinally rearward position on each said beam having a side surface projecting laterally from said dump frame and contacting a said side surface of a said main girder.

2. The car carrier truck of claim 1, wherein said moving pads are fixed to said lower surfaces of said main girders and slidably engage said bottom surfaces of said beams.

3. The car carrier truck of claim 2, wherein said moving pads extend beyond edges of said main girders and slidably engage said surfaces of said beams.

4. The car carrier truck of claim 1, wherein said beams each comprise a web having a flange extending therefrom, said top and bottom surfaces of said beams being defined by said flange.

5. The car carrier truck of claim 4, wherein said flange of each said beam is received between said upper and lower surfaces of a respective said main girder, with said side surface of each said main girder extending between said upper and lower surfaces thereof.

6. The car carrier of claim 5, wherein said beams are laterally spaced apart with their respective said flanges extending outwardly therefrom, and said side surfaces of said main girders extending longitudinally and laterally spaced from each other outward of said flanges.

* * * * *